(12) United States Patent
Kasatani

(10) Patent No.: US 11,733,830 B2
(45) Date of Patent: Aug. 22, 2023

(54) DISPLAY APPARATUS FOR DISPLAYING HANDWRITTEN DATA WITH DISPLAYED OPERATION MENU

(71) Applicant: Kiyoshi Kasatani, Kanagawa (JP)

(72) Inventor: Kiyoshi Kasatani, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/952,479

(22) Filed: Nov. 19, 2020

(65) Prior Publication Data

US 2021/0149531 A1 May 20, 2021

(30) Foreign Application Priority Data

Nov. 20, 2019 (JP) .................................. 2019-209914
Nov. 19, 2020 (JP) .................................. 2020-192210

(51) Int. Cl.
| | |
|---|---|
| *G06F 3/0482* | (2013.01) |
| *G06F 3/04883* | (2022.01) |
| *G06F 3/0354* | (2013.01) |
| *G06F 3/0338* | (2013.01) |
| *G06V 30/32* | (2022.01) |

(52) U.S. Cl.
CPC .......... *G06F 3/0482* (2013.01); *G06F 3/0338* (2013.01); *G06F 3/03545* (2013.01); *G06F 3/04883* (2013.01); *G06V 30/32* (2022.01)

(58) Field of Classification Search
None
See application file for complete search history.

(56) References Cited

U.S. PATENT DOCUMENTS

| | | | |
|---|---|---|---|
| 5,389,745 A | 2/1995 | Sakamoto | |
| 9,237,246 B2 | 1/2016 | Kemmochi et al. | |
| 10,397,638 B2 | 8/2019 | Kanematsu et al. | |
| 10,419,618 B2 | 9/2019 | Kato et al. | |
| 10,572,779 B2 | 2/2020 | Kemmochi et al. | |
| 10,645,234 B2 | 5/2020 | Kemmochi et al. | |
| 10,705,724 B2 | 7/2020 | Kanematsu et al. | |
| 2003/0233237 A1* | 12/2003 | Garside .................. | G10L 15/26 704/270 |
| 2004/0104942 A1* | 6/2004 | Weigel ................ | G06F 3/04886 715/773 |
| 2005/0251755 A1* | 11/2005 | Mullins ................. | G06F 3/0482 715/779 |
| 2014/0362002 A1* | 12/2014 | Nakasu ................. | G06F 3/0416 345/173 |

(Continued)

FOREIGN PATENT DOCUMENTS

| | | |
|---|---|---|
| JP | 2015-230497 | 12/2015 |
| JP | 2018-026185 | 2/2018 |

OTHER PUBLICATIONS

Extended European Search Report for EP20208639.3 dated Apr. 12, 2021.
Chinese Office Action for 202011316681.4 dated Jun. 12, 2023.

*Primary Examiner* — Amare Mengistu
*Assistant Examiner* — Sarvesh J Nadkarni
(74) *Attorney, Agent, or Firm* — IPUSA, PLLC

(57) ABSTRACT

Provided is a display apparatus for displaying an operation menu associated with a data processing performed on handwritten data, wherein the operation menu includes information related to the data processing according to a display position of the operation menu.

21 Claims, 54 Drawing Sheets

(56) References Cited

U.S. PATENT DOCUMENTS

| | | | |
|---|---|---|---|
| 2015/0227493 A1* | 8/2015 | Ishida | H04W 4/203 |
| | | | 715/273 |
| 2019/0265946 A1 | 8/2019 | Bae et al. | |
| 2019/0286245 A1* | 9/2019 | Ikeda | G09G 5/36 |
| 2019/0286303 A1* | 9/2019 | Hewitt | G06F 3/167 |
| 2020/0019255 A1* | 1/2020 | Gilbert | G06F 3/0383 |

* cited by examiner

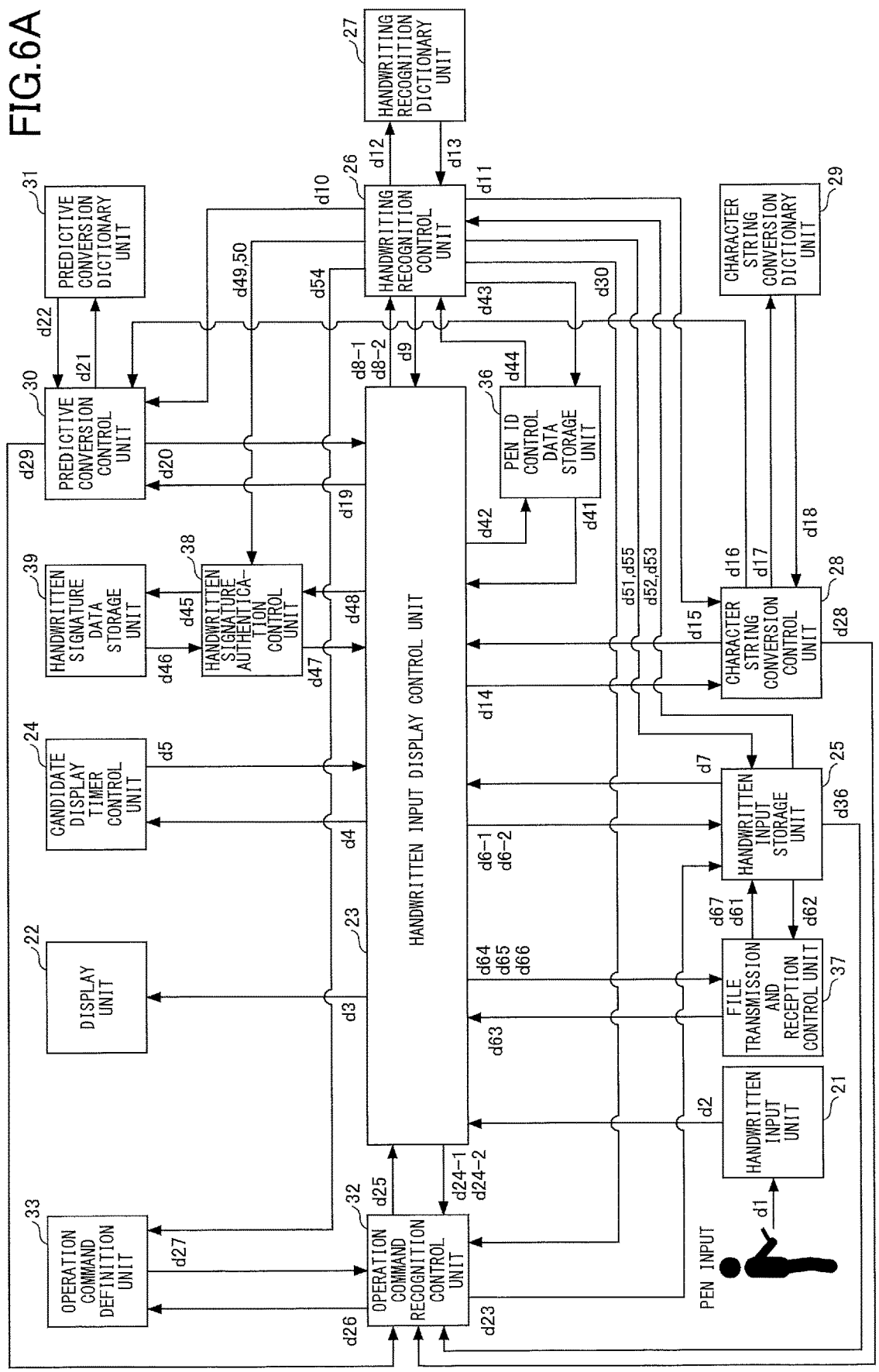

FIG.7

| DEFINED CONTROL ITEM EXAMPLE | DEFINED CONTROL DATA EXAMPLE |
|---|---|
| SELECTABLE CANDIDATE DISPLAY TIMER | TimerValue="500 ms" |
| SELECTABLE CANDIDATE DELETE TIMER | TimerValue="5000 ms" |
| HANDWRITTEN OBJECT NEIGHBORING RECTANGULAR AREA | Horizontal="50%" Vertical="80%" |
| ESTIMATED WRITING CHARACTER DIRECTION/CHARACTER SIZE DETERMINATION CONDITION | MinDiff="10 mm" MinTime="1000 ms" DefDir="Horizontal" |
| SMALL-SIZE CHARACTER | FontStyle="明朝体" FontSize="25 mm" |
| MIDDLE-SIZE CHARACTER | FontStyle="明朝体" FontSize="50 mm" |
| LARGE-SIZE CHARACTER | FontStyle="ゴシック体" FontSize="100 mm" |
| EXTENDING-OVER LINE DETERMINATION CONDITION | MinLenLongSide="100 mm" MaxLenShortSide="50 mm" MinOverlapRate="80%" |
| ENCLOSING LINE DETERMINATION CONDITION | MinOverLapRate="100%" |

401 SELECTABLE CANDIDATE DISPLAY TIMER
402 SELECTABLE CANDIDATE DELETE TIMER
403 HANDWRITTEN OBJECT NEIGHBORING RECTANGULAR AREA
404 ESTIMATED WRITING CHARACTER DIRECTION/CHARACTER SIZE DETERMINATION CONDITION
405a SMALL-SIZE CHARACTER
405b MIDDLE-SIZE CHARACTER
405c LARGE-SIZE CHARACTER
405 { 405a, 405b, 405c }
406 EXTENDING-OVER LINE DETERMINATION CONDITION
407 ENCLOSING LINE DETERMINATION CONDITION

FIG.8

HANDWRITING RECOGNITION DICTIONARY
DATA EXAMPLE

| | BEFORE CONVERSION | AFTER CONVERSION | PROBABILITY |
|---|---|---|---|
| 604 | ぎ | 議 | 0.55 |
| | ぎ | 技 | 0.45 |
| 605 | ぎし | 技士 | 0.55 |
| | ぎし | 技師 | 0.45 |
| 606 | ぎじ | 疑似 | 0.30 |
| | ぎじ | 議事 | 0.25 |
| | ぎじ | 擬似 | 0.20 |
| | ぎじ | ギジ | 0.15 |

FIG.9

CHARACTER STRING CONVERSION DICTIONARY DATA EXAMPLE

| | BEFORE CONVERSION | AFTER CONVERSION | PROBABILITY |
|---|---|---|---|
| 607 { | 議 | 議事録 | 0.95 |
| | 技 | 技量試 | 0.85 |
| 608 { | 技士 | 技士会 | 0.65 |
| | 技師 | 技師長 | 0.75 |
| 609 { | ぎじ | 議事録 | 0.95 |
| | ぎじ | 技術士 | 0.85 |
| | ぎじ | 技術 | 0.75 |
| 610 { | 擬似 | 擬似相関 | 0.55 |
| | 擬似 | 擬似的 | 0.50 |
| | 擬似 | 擬似乱数 | 0.40 |

FIG.10

PREDICTIVE CONVERSION DICTIONARY DATA EXAMPLE

| BEFORE CONVERSION | AFTER CONVERSION | PROBABILITY |
|---|---|---|
| 議事録 | 議事録の送付先 | 0.65 |
| 技量試 | 技量試を決裁 | 0.75 |
| 技士 | 技士会連合会 | 0.95 |
| 技術 | 技師エンジニア | 0.85 |
| 技術 | 技術雑誌社 | 0.65 |
| 擬似 | 擬似体験 | 0.45 |
| 擬似 | 擬似逆行列 | 0.35 |

611 { rows 1–2
612 { rows 3–4
613 ↙ row 5
614 { rows 6–7

FIG.11A

| OPERATION COMMAND DEFINITION DATA EXAMPLE (IN A CASE WHERE THERE IS NO SELECTED OBJECT) |
|---|
| Name="議事録テンプレートを読み込む" String="議事録" String="テンプレート" Command="ReadFile https://%username%:%password%@server.com/template/minutes.pdf" |
| Name="議事録フォルダーに保存する" String="議事録" String="保存" Command="WriteFile https://%username%:%password%@server.com/minutes/%machinename%_%yyyy-mm-dd%.pdf" |
| Name="印刷する" String="印刷" String="プリント" Command="PrintFile https://%username%:%password%@server.com/print/%machinename%-%yyyy-mm-dd%.pdf" |
| Name="黒ペン" String="黒" String="くろ" String="ペン" Command="ChangePen Black" |
| Name="赤ペン" String="赤" String="あか" String="ペン" Command="ChangePen Red" |
| Name="青ペン" String="青" String="あお" String="ペン" Command="ChangePen Blue" |
| Name="緑ペン" String="緑" String="みどり" String="ペン" Command="ChangePen Green" |
| Name="マゼンタペン" String="マゼンタ" String="ませんた" String="ペン" Command="ChangePen Magenta" |
| Name="シアンペン" String="シアン" String="しあん" String="ペン" Command="ChangePen Cyan" |
| Name="黒細ペン" String="黒" String="細" String="ペン" Command="ChengePen ThinBlack" |
| Name="赤細ペン" String="赤" String="細" String="ペン" Command="ChengePen ThinRed" |
| Name="青細ペン" String="青" String="細" String="ペン" Command="ChengePen ThinBlue" |
| Name="緑細ペン" String="緑" String="細" String="ペン" Command="ChengePen ThinGreen" |
| Name="ファイルを読み込む" String="ファイル" String="読み込む" String="読み込み" Command="ReadFile https://%username%:%password%@server.com/files/" |
| Name="テキスト方向を揃える" String="テキスト" String="方向" Command="AlignTextDirection" |
| Name="手書きサイン登録する" String="サイン" String="登録" Command="RegistSignature" |
| Name="手書きサインインする" String=%signature% Command="Signin" |
| Name="手書きサインアウトする" String="サイン" String="アウト" Command="Signout" |
| Name="設定変更する" String="設定" String="変更" Command="ConfigSettings" |

| SYSTEM DEFINITION DATA EXAMPLE |
|---|
| username="taro.tokkyo" |
| password="x2PDHTyS" |
| machinename="My-Machine" |

704 — username="taro.tokkyo"
705 — password="x2PDHTyS"
706 — machinename="My-Machine"

FIG.12

| USER DEFINED DATA EXAMPLE |
|---|
| AccountId="1" AccountUsername="鈴木" AccountPassword="" SignatureId="1" username="ichiro.suzuki" password="DG9wEvda" machinename="whiteboard" |
| Name="名前" Data=%AccountName% |
| Name="パスワード" Data=%AccountPassword% |
| Name="フォルダーユーザー名" Data=%username% |
| Name="フォルダーパスワード" Data=%password% |
| Name="フォルダーファイル名" Data=%machinename% |

717 — (brace around first data row)
718 — (brace around Name= rows)

FIG.13

| HANDWRITTEN SIGNATURE DATA EXAMPLE |
|---|
| SignatureId="1" Data="xx,xx,xx,xx,...,xx" |
| SignatureId="2" Data="xx,xx,xx,xx,...,xx" |

FIG.14

| HANDWRITTEN INPUT RETAINED DATA EXAMPLE |
|---|
| DataId="1" Type="Stroke" PenId="1" ColorId="Black" Angle="0 dig" StartPoint="x1,y1" StartTime="yyyy-mm-ddThh:mm:ss.sss+09:00" EndPoint="xn,yn" EndTime="yyyy-mm-ddThh:mm:ss.sss+09:00" Pressure="p1,p2,p3,...pn" Point="x1,y1,x2,y2,x3,y3,...,yn,yn" |
| DataId="2" Type="Stroke" PenId="1" ColorId="Red" Angle="0 dig" StartPoint="x1,y1" StartTime="yyyy-mm-ddThh:mm:ss.sss+09:00" EndPoint="xn,yn" EndTime="yyyy-mm-ddThh:mm:ss.sss+09:00" Pressure="p1,p2,p3,...pn" Point="x1,y1,x2,y2,x3,y3,...,yn,yn" |
| DataId="3" Type="Group" PenId="2" StartPoint="x1,y1" StartTime="yyyy-mm-ddThh:mm:ss.sss+09:00" EndPoint="xn,yn" EndTime="yyyy-mm-ddThh:mm:ss.sss+09:00" DataId="1" DataId="2" |
| DataId="4" Type="Text" PenId="2" ColorId="Red" Angle="180 dig" StartPoint="x1,y1" StartTime="yyyy-mm-ddThh:mm:ss.sss+09:00" EndPoint="xn,yn" EndTime="yyyy-mm-ddThh:mm:ss.sss+09:00" FontName="ポップ体" FontSize="50.0 pt" Text="What you dream" |
| DataId="5" Type="Text" PenId="3" ColorId="Blue" Angle="270 dig" StartPoint="x1,y1" StartTime="yyyy-mm-ddThh:mm:ss.sss+09:00" EndPoint="xn,yn" EndTime="yyyy-mm-ddThh:mm:ss.sss+09:00" FontName="ゴシック体" FontSize="10.0 pt" Text="I want to be an innovator" |
| DataId="6" Type="Text" PenId="1" ColorId="#e6001200" Angle="0 dig" StartPoint="x1,y1" StartTime="yyyy-mm-ddThh:mm:ss.sss+09:00" EndPoint="xn,yn" EndTime="yyyy-mm-ddThh:mm:ss.sss+09:00" FontName="メイリオ" FontSize="50.0 pt" Text="Original Text" |
| DataId="7" Type="Image" PenId="1" FileId="xxxxxxxx-xxxx-xxxx-xxxx-xxxxxxxxxxxx" FileName="image.jpg" Angle="0 dig" StartPoint="x1,y1" StartTime="yyyy-mm-ddThh:mm:ss.sss+09:00" EndPoint="xn,yn" EndTime="yyyy-mm-ddThh:mm:ss.sss+09:00" |

| PEN ID CONTROL DATA |
|---|
| PenId="1" ColorId="Black" Angle="0 dig" AccountId="1" |
| PenId="2" ColorId="Red" Angle="90 dig" FontName="ポップ体" |
| PenId="3" ColorId="Blue" Angle="180 dig" RecommendMenuOff="True" |
| PenId="4" ColorId="Green" Angle="270 dig" |

| COLOR DEFINITION DATA EXAMPLE |
|---|
| ColorId="Black" Pattern="SolidBlack 5 px" Edged="None" Color="#00000000" Width="5 px" |
| ColorId="Red" Pattern="SolidBlack 3 px" Edged="Black 1 px, White 2 px" Color="#e6001200" Width="5 px" |
| ColodId="Blue" Pattern="SolidWhite 4 px" Edged="Black 1 px" Color="#1d208800" Width="5 px" |
| ColorId="Green" Pattern="BlackDotPattern 4 px" Edged="Black 1 px" Color="#00994400" Width="5 px" |
| ColorId="Magenta" Pattern="AlphaBlackUpDiagonalPattern 5 px" Edged="None" Color="#e4007f99" Width="5 px" |
| ColorId="Cyan" Pattern="AlphaBlackHorizontalPattern 5 px" Edged="None" Color="#00a0e999" Width="5 px" |
| ColorId="ThinBlack" Pattern="SolidBlack 3 px" Edged="None" Color="#00000000" Width="3 px" |
| ColorId="ThinRed" Pattern="SolidBlack 1 px" Edged="Black 1 px, White 1 px" Color="#e6001200" Width="3 px" |
| ColodId="ThinBlue" Pattern="SolidWhite 2 px" Edged="Black 1 px" Color="#1d208800" Width="3 px" |
| ColorId="ThinGreen" Pattern="BlackDotPattern 2 px" Edged="Black 1 px" Color="#00994400" Width="3 px" |

| PEN SELECTION BUTTON DEFINITION DATA EXAMPLE |
|---|
| PenButtonId="1" Icon="pen_black.png" ColorId="Black" FontName="明朝体" |
| PenButtonId="2" Icon="pen_red.png" ColorId="Red" FontName="ポップ体" |
| PenButtonId="3" Icon="pen_blue.png" ColorId="Blue" FontName="ゴシック体" |
| PenButtonId="4" Icon="pen_green.png" ColorId="Green" FontName="隷書体" |
| PenButtonId="5" Icon="pen_magenta.png" ColorId="Magenta" FontName="楷書体" |
| PenButtonId="6" Icon="pen_cyan.png" ColorId="Cyan" FontName="行書体" |

1101, 1102, 1103, 1104, 1105, 1106

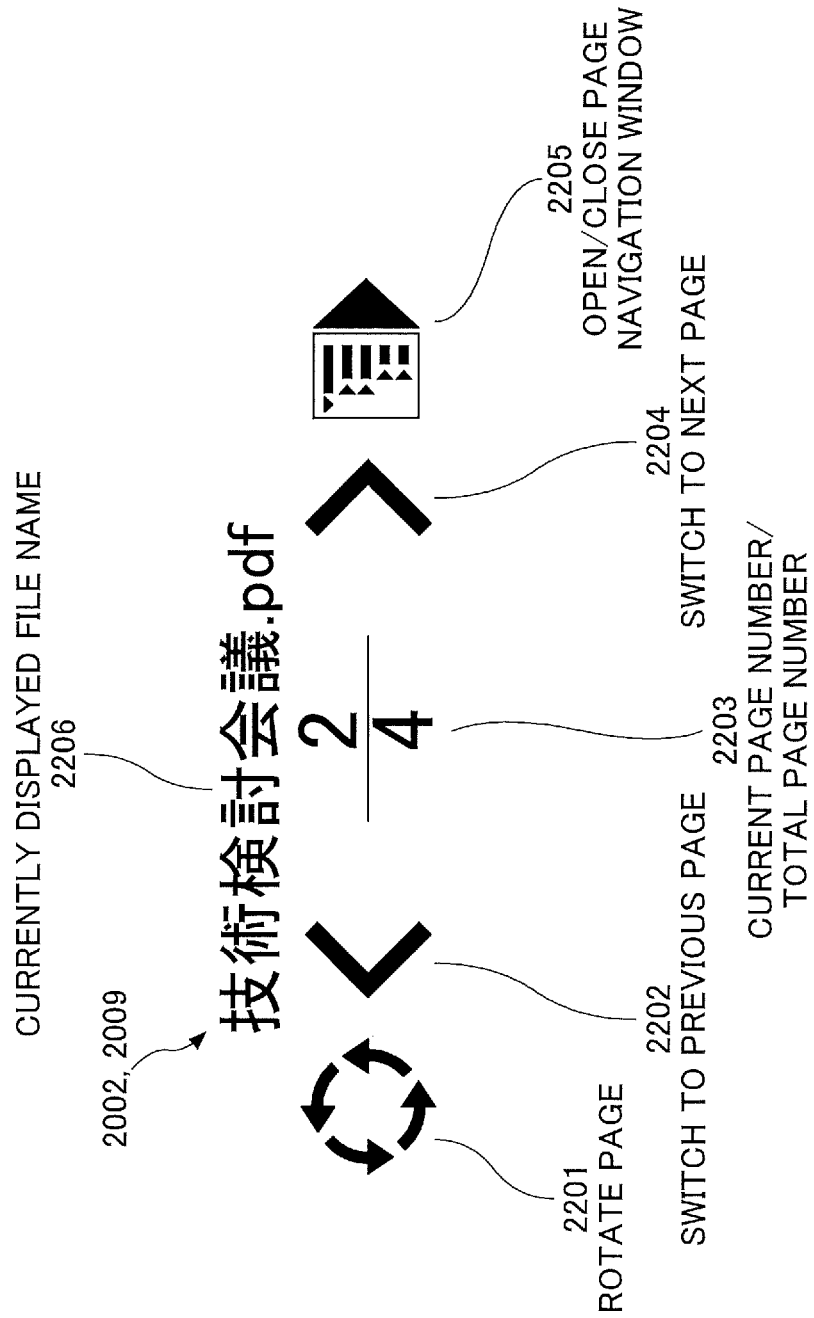

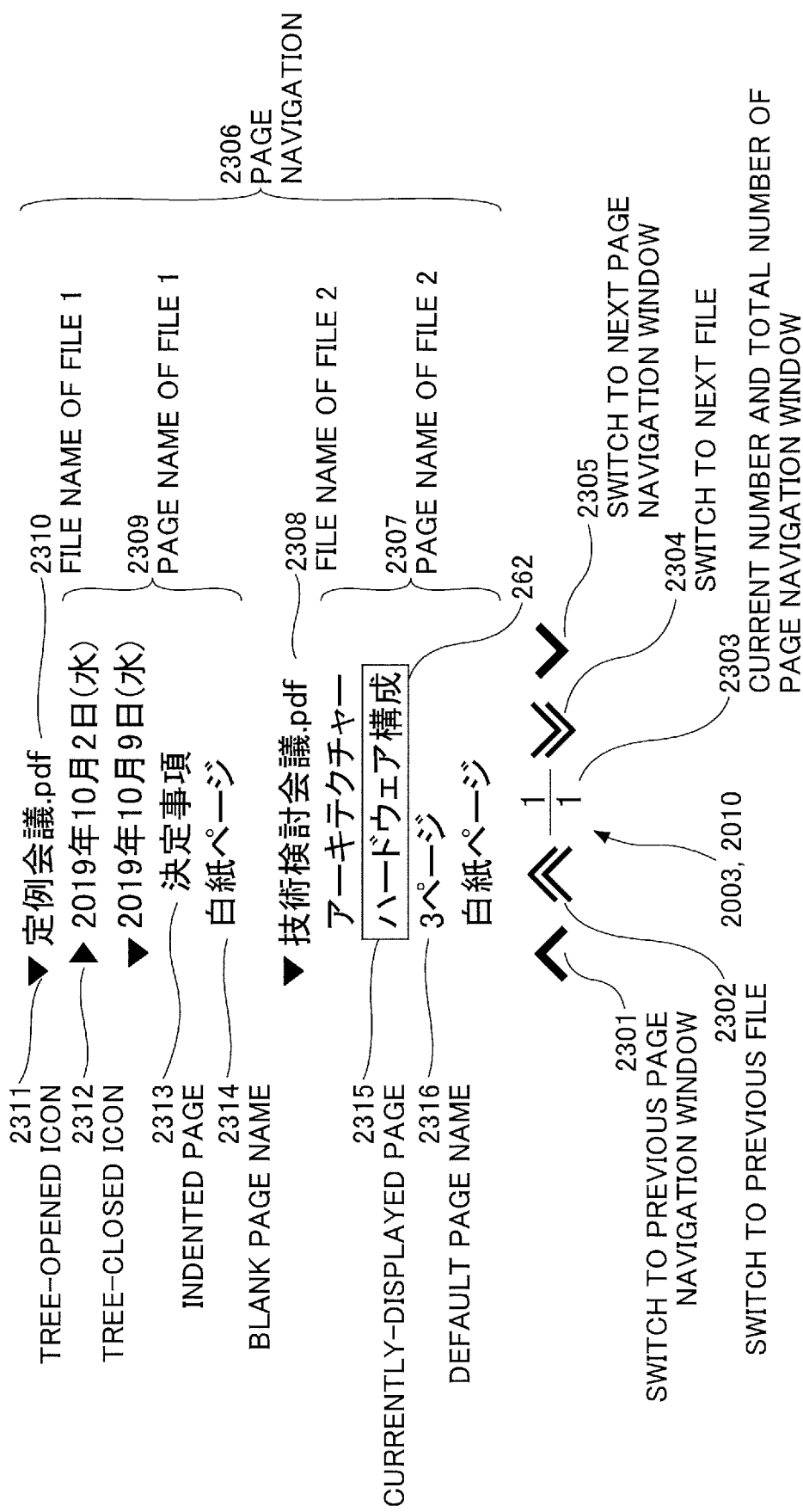

FIG.27

| BUTTON DEFINITION DATA EXAMPLE |
|---|
| ButtonId="1" Position="x1,y1,x2,y2" Icon="pen_thin_black.png" Angle="0 dig" Command="ChangePen ThinBlack" |
| ButtonId="2" Position="x1,y1,x2,y2" Icon="pen_thin_red.png" Angle="0 dig" Command="ChangePen ThinRed" |
| ButtonId="3" Position="x1,y1,x2,y2" Icon="pen_thin_blue.png" Angle="0 dig" Command="ChangePen ThinBlue" |
| ButtonId="4" Position="x1,y1,x2,y2" Icon="pen_thin_green.png" Angle="0 dig" Command="ChangePen ThinGreen" |
| ButtonId="5" Position="x1,y1,x2,y2" Icon="pen_black.png" Angle="0 dig" Command="ChangePen Black" |
| ButtonId="6" Position="x1,y1,x2,y2" Icon="pen_red.png" Angle="0 dig" Command="ChangePen Red" |
| ButtonId="7" Position="x1,y1,x2,y2" Icon="pen_blue.png" Angle="0 dig" Command="ChangePen Blue" |
| ButtonId="8" Position="x1,y1,x2,y2" Icon="pen_green.png" Angle="0 dig" Command="ChangePen Green" |
| ButtonId="9" Position="x1,y1,x2,y2" Icon="pen_magenta.png" Angle="0 dig" Command="ChangePen Magenta" |
| ButtonId="10" Position="x1,y1,x2,y2" Icon="pen_cyan.png" Angle="0 dig" Command="ChangePen Cyan" |
| ButtonId="11" Position="x1,y1,x2,y2" Icon="undo.png" Angle="0 dig" Command="Undo" |
| ButtonId="12" Position="x1,y1,x2,y2" Icon="redo.png" Angle="0 dig" Command="Redo" |
| ButtonId="13" Position="x1,y1,x2,y2" Icon="erase_page.png" Angle="0 dig" Command="ErasePage" |
| ButtonId="14" Position="x1,y1,x2,y2" Icon="sweep.png" Angle="0 dig" Command="SweepPage" |
| ButtonId="15" Position="x1,y1,x2,y2" IconOn="recommend_on.png" IconOff="recommend_off.png" Angle="0 dig" Command="ToggleRecommendMenu" |

| BUTTON DEFINITION DATA EXAMPLE |
|---|
| ButtonId="16" Position="x1,y1,x2,y2" Icon="rotate_page.png" Angle="0 dig" Command="RotatePage" |
| ButtonId="17" Position="x1,y1,x2,y2" Icon="page_back.png" Angle="0 dig" Command="PageBack" |
| ButtonId="18" Position="x1,y1,x2,y2" Icon="page_next.png" Angle="0 dig" Command="PageNext" |
| ButtonId="19" Position="x1,y1,x2,y2" IconOn="page_navi_on.png" IconOff="page_navi_off.png" Angle="0 dig" Command="TogglePageNavi" |
| ButtonId="20" Position="x1,y1,x2,y2" Icon="page_navi_win_back.png" Angle="0 dig" Command="PageNaviWinBack" |
| ButtonId="21" Position="x1,y1,x2,y2" Icon="page_navi_doc_back.png" Angle="0 dig" Command="PageNaviFileBack" |
| ButtonId="22" Position="x1,y1,x2,y2" Icon="page_navi_doc_next.png" Angle="0 dig" Command="PageNaviFileNext" |
| ButtonId="23" Position="x1,y1,x2,y2" Icon="pen_navi_win_next.png" Angle="0 dig" Command="PageNaviWinNext" |
| ButtonId="24" Position="x1,y1,x2,y2" Angle="0 dig" |

| BUTTON DEFINITION DATA EXAMPLE |
|---|
| ButtonId="25" Position="x1,y1,x2,y2" Icon="pen_thin_black.png" Angle="180 dig" Command="ChangePen ThinBlack" |
| ButtonId="26" Position="x1,y1,x2,y2" Icon="pen_thin_red.png" Angle="180 dig" Command="ChangePen ThinRed" |
| ButtonId="27" Position="x1,y1,x2,y2" Icon="pen_thin_blue.png" Angle="180 dig" Command="ChangePen ThinBlue" |
| ButtonId="28" Position="x1,y1,x2,y2" Icon="pen_thin_green.png" Angle="180 dig" Command="ChangePen ThinGreen" |
| ButtonId="29" Position="x1,y1,x2,y2" Icon="pen_black.png" Angle="180 dig" Command="ChangePen Black" |
| ButtonId="30" Position="x1,y1,x2,y2" Icon="pen_red.png" Angle="180 dig" Command="ChangePen Red" |
| ButtonId="31" Position="x1,y1,x2,y2" Icon="pen_blue.png" Angle="180 dig" Command="ChangePen Blue" |
| ButtonId="32" Position="x1,y1,x2,y2" Icon="pen_green.png" Angle="180 dig" Command="ChangePen Green" |
| ButtonId="33" Position="x1,y1,x2,y2" Icon="pen_magenta.png" Angle="180 dig" Command="ChangePen Magenta" |
| ButtonId="34" Position="x1,y1,x2,y2" Icon="pen_cyan.png" Angle="180 dig" Command="ChangePen Cyan" |
| ButtonId="35" Position="x1,y1,x2,y2" Icon="undo.png" Angle="180 dig" Command="Undo" |
| ButtonId="36" Position="x1,y1,x2,y2" Icon="redo.png" Angle="180 dig" Command="Redo" |
| ButtonId="37" Position="x1,y1,x2,y2" Icon="erase_page.png" Angle="180 dig" Command="ErasePage" |
| ButtonId="38" Position="x1,y1,x2,y2" Icon="sweep.png" Angle="180 dig" Command="SweepPage" |
| ButtonId="39" Position="x1,y1,x2,y2" IconOn="recommend_on.png" IconOff="recommend_off.png" Angle="180 dig" Command="ToggleRecommendMenu" |

FIG.30

| BUTTON DEFINITION DATA EXAMPLE |
|---|
| ButtonId="40" Position="x1,y1,x2,y2" Icon="rotate_page.png" Angle="180 dig" Command="RotatePage" |
| ButtonId="41" Position="x1,y1,x2,y2" Icon="page_back.png" Angle="180 dig" Command="PageBack" |
| ButtonId="42" Position="x1,y1,x2,y2" Icon="page_next.png" Angle="180 dig" Command="PageNext" |
| ButtonId="43" Position="x1,y1,x2,y2" IconOn="page_navi_on.png" IconOff="page_navi_off.png" Angle="180 dig" Command="TogglePageNavi" |
| ButtonId="44" Position="x1,y1,x2,y2" Icon="page_navi_win_back.png" Angle="180 dig" Command="PageNaviWinBack" |
| ButtonId="45" Position="x1,y1,x2,y2" Icon="page_navi_doc_back.png" Angle="180 dig" Command="PageNaviFileBack" |
| ButtonId="46" Position="x1,y1,x2,y2" Icon="page_navi_doc_next.png" Angle="180 dig" Command="PageNaviFileNext" |
| ButtonId="47" Position="x1,y1,x2,y2" Icon="pen_navi_win_next.png" Angle="180 dig" Command="PageNaviWinNext" |
| ButtonId="48" Position="x1,y1,x2,y2" Angle="180 dig" |

PAGE NAVIGATION DATA EXAMPLE

| | |
|---|---|
| 2501 | FileName="定例会議.pdf" Page="0" Level="0" Tree="Opened" |
| 2502 | FileName="定例会議.pdf" Page="1" Level="1" PageName="2019年10月2日(水)" AutoName="True" Tree="Closed" |
| 2503 | FileName="定例会議.pdf" Page="2" Level="2" PageName="2ページ" |
| 2504 | FileName="定例会議.pdf" Page="3" Level="1" PageName="2019年10月9日(水)" AutoName="True" Tree="Opened" |
| 2505 | FileName="定例会議.pdf" Page="4" Level="2" PageName="決定事項" AutoName="False" |
| 2506 | FileName="定例会議.pdf" Page="5" Level="1" PageName="白紙ページ" |
| 2507 | FileName="技術検討会議.pdf" Page="0" Level="0" Tree="Opened" |
| 2508 | FileName="技術検討会議.pdf" Page="1" Level="1" PageName="アーキテクチャー" AutoName="True" |
| 2509 | FileName="技術検討会議.pdf" Page="2" Level="1" PageName="ハードウェア構成" CurrentPage="True" |
| 2510 | FileName="技術検討会議.pdf" Page="3" Level="1" PageName="3ページ" |
| 2511 | FileName="技術検討会議.pdf" Page="4" Level="1" PageName="白紙ページ" |

DISPLAY APPARATUS FOR DISPLAYING HANDWRITTEN DATA WITH DISPLAYED OPERATION MENU

FIELD OF THE INVENTION

The present invention relates to a display apparatus, a display method, and a medium.

BACKGROUND OF THE INVENTION

A display apparatus for displaying handwritten data on a touch panel with a pen or a finger is known. A display apparatus with a relatively large touch panel is located in a conference room, etc., and is used by multiple users as an electronic black board, or the like.

A display apparatus (display device) may display a menu for a user to select a pen color, or the like (see, for example, Patent Document 1). Patent Document 1 discloses a handwritten input device in which menus of color setting, transparency setting, thickness setting, line type setting, stamp setting, and operation setting are displayed by pressing the pen button.

CITATION LIST

Patent Document

[Patent Document 1] Japanese Unexamined Patent Application Publication No. 2018-026185

SUMMARY OF THE INVENTION

Technical Problem

However, there has been a problem with conventional display devices in that the data processing information is the same even though the display positions of the operation menus are different. For example, if a user handwrites to a display device, each user operates his or her nearest operation menu. However, regardless of the operation menu operated by the user, the data processing performed by the display device on the handwritten data is the same.

In view of the above-described problems, the present invention is intended to provide a display device capable of performing data processing according to a display position of an operation menu.

Solution to Problem

In view of the foregoing problems, the present invention provides a display apparatus for displaying an operation menu associated with a data processing performed on handwritten data, wherein the operation menu includes information related to the data processing according to a display position of the operation menu.

Advantageous Effects of Invention

A display apparatus capable of data processing according to the display position of the operation menu can be provided.

BRIEF DESCRIPTION OF THE DRAWINGS

FIG. 6A is a drawing illustrating functions of a display apparatus and a pen.

FIG. 7 is a drawing illustrating examples of defined control data.

FIG. 8 is a drawing illustrating an example of dictionary data of a handwriting recognition dictionary unit.

FIG. 9 is a drawing illustrating an example of dictionary data of a character string conversion dictionary unit.

FIG. 10 is a drawing illustrating an example of dictionary data of a predictive conversion dictionary unit.

FIG. 11A is a drawing illustrating examples of operation command definition data and system definition data retained by an operation command definition unit.

FIG. 11B is a drawing illustrating examples of operation command definition data and system definition data retained by an operation command definition unit.

FIG. 12 is a drawing illustrating an example of user defined data retained by an operation command definition unit.

FIG. 13 is a drawing illustrating an example of handwritten signature data retained by a handwritten signature data storage unit.

FIG. 14 is a drawing illustrating an example of handwritten input storage data stored in a handwritten input storage unit.

FIG. 15A is a drawing illustrating pen ID control data stored in a pen ID control data storage unit.

FIG. 16 is a drawing illustrating an example of color definition data.

FIG. 17 is a drawing illustrating an example of pen color selection button definition data.

FIG. 25 is a drawing illustrating an example of a page operation panel.

FIG. 26 is a drawing illustrating an example of a page navigation operation panel.

FIG. 27 is a drawing illustrating an example of operation button definition data in an operation menu operated by a lower side user (Part 1).

FIG. 28 is a drawing illustrating an example of operation button definition data in an operation menu operated by a lower side user (Part 2).

FIG. 29 is a drawing illustrating an example of operation button definition data in an operation menu operated by an upper side user (Part 1).

FIG. 30 is a drawing illustrating an example of operation button definition data in an operation menu operated by an upper side user (Part 2).

FIG. 31 is a drawing illustrating an example of page navigation data.

DETAILED DESCRIPTION OF THE PREFERRED EMBODIMENTS

Hereinafter, as an example of an embodiment of the present invention, a display apparatus and a display method performed by the display apparatus will be described with reference to the drawings.

Embodiment 1

The input unit may be a unit that allows handwriting by specifying the coordinates on the touch panel. For example, a pen, a human finger, a hand, a rod-like member, or the like, is included. Further, a sight input device may be included. Handwritten data is data that shows, as a trajectory, a sequence of coordinate points on a touch panel in which the user has continuously moved the input unit. Further, a stroke is a series of operations in which the user presses the input unit on the touch panel, moves it continuously, and then releases it from the touch panel. Data handwritten by the stroke is referred to as stroke data. The handwritten data includes one or more stroke data items. Handwritten input indicates that handwritten data is entered by the user.

<Compared Example of Display Apparatus>

In describing the display apparatus according to an embodiment, a display example of an operation menu of the display apparatus will be briefly described.

Figure 1:
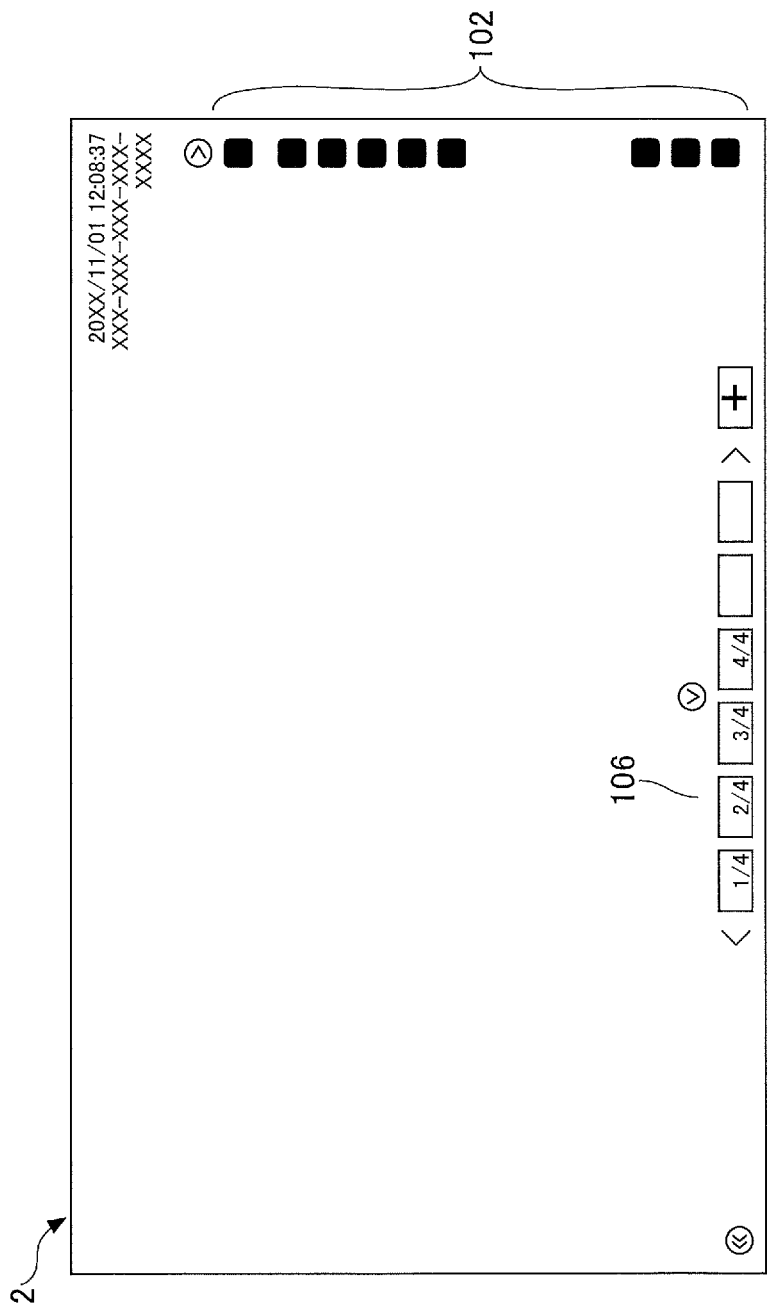
FIG. 1 is a diagram showing an example of an operation menu displayed by a display apparatus.

FIG. 1 shows an example of an operation menu displayed by a display apparatus. Because the display apparatus 2 is mounted vertically, an operation menu 102 is displayed on the right side of the display. The user may move the operation menu 102 to the left of the display, but conventionally, only one operation menu 102 is displayed at the same time. Thus, for example, even if there is a user on the left side toward the display, it is difficult for the user to press the operation menu 102.

Figure 2:
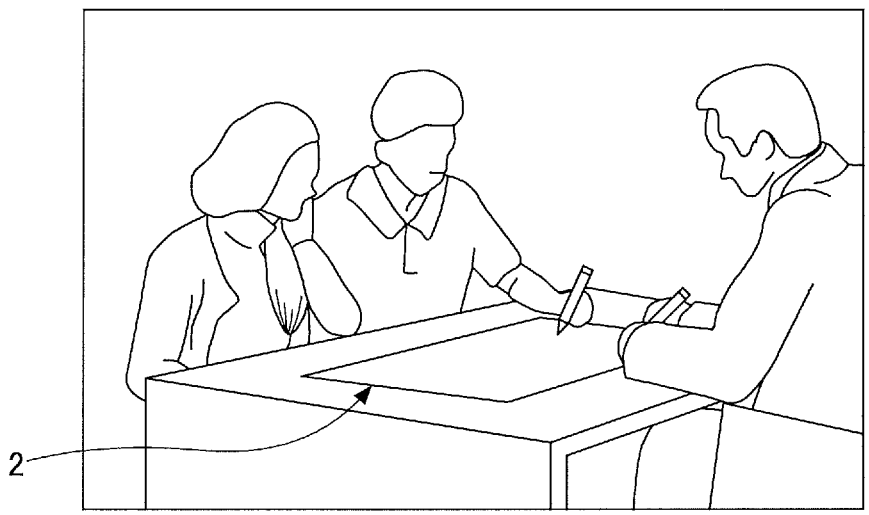
FIG. 2 is an example of a display apparatus positioned (placed) flat.

Next, FIG. 2 is an example of a display apparatus 2 positioned flat. In FIG. 2, users face each other, but in this case, operations are not easy if there is only one operation menu. Therefore, it may be proposed that the display apparatus 2 displays operation menus, respectively. The operation menu does not contain information related to data processing according to the display position.

In this case, a user can press an operation menu displayed close to the user, but the operation menu does not contain information related to data processing according to the display position, and even if the user presses the operation menu, it is difficult for the data processing to be performed according to the display position. For example, in a case where the display apparatus 2 recognizes handwritten characters, it is difficult to recognize the handwritten characters correctly unless the handwritten data is rotated according to the orientation of the characters. However, conventionally, contents of the data processing are not changed according to the pressed operation menu.

Accordingly, in an embodiment of the present invention, a display apparatus for displaying an operation menu having information related to data processing according to a display position will be described.

Further, as illustrated in FIG. 1, the display apparatus stores page data including handwritten data and displays a thumbnail 106 of each page at the bottom of the display. However, there is a disadvantage that the thumbnail 106 is too small for understanding the contents. In addition, there is an upper limit on the number of pages that can be displayed in the thumbnail 106, and it is not possible to display all the contents of each page.

Accordingly, according to an embodiment of the present invention, a character string selected by a user or a character string automatically selected by a display apparatus is extracted for each page, and a page navigation is displayed in which the extracted character string for each page is displayed.

Terminology

Handwritten data is data that shows, as a trajectory, a sequence of coordinate points on a display on which a user has continuously moved an input unit. Further, a series of operations in which the user presses the input unit on the display, moves it continuously, and then moves it away from the display is called a stroke, and the data handwritten by the stroke is called stroke data. The handwritten data includes one or more stroke data items.

The information related to the data processing is the content with which the handwritten data displayed by the display apparatus 2 or the handwritten input originated data is processed. Examples include rotation of handwritten data for handwriting recognition and rotation after character recognition. The display apparatus 2 can rotate handwritten data according to the display position of the operation menu. Also, if the display apparatus 2 is a color display, the display apparatus 2 can control whether to display in color or monochrome or in which color. It is also possible for the display apparatus 2 to control which font is used for displaying.

Black-and-white supporting apparatus: an apparatus that can only output white or black or gray scale data. For example, an electronic paper, a monochrome printer, etc., are included. The black-and-white supporting apparatus may be an apparatus that does not support color.

Note that an electronic paper is also called an E-paper. An electronic paper is a general term for displays that are as thin as ¹/₁₀ of a millimeter and can display and erase data by electrical means. A typical technique for realizing an electronic paper is microcapsule electrophoresis, referred to as E ink (registered trademark). Each microcapsule contains white particles and black particles, the white particles being positively charged and the black particles being negatively charged.

Color supporting apparatus: a color supporting apparatus is an apparatus that can output color data as well as black and white data. An apparatus with liquid crystal or an organic EL display, a color printer, etc., are included. A color supporting apparatus is also a black-and-white supporting apparatus.

Black-and-white highlighting supporting apparatus: a black-and-white highlighting supporting apparatus is an apparatus that can output only white or black or gray scale data, but is an apparatus that performs black-and-white highlighting, with respect to the handwritten input originated data, based on color information associated with the handwritten data. A display apparatus according to an embodiment of the present invention can be listed as a black-and-white highlighting supporting apparatus. It should be noted that the display apparatus is capable of receiving a handwritten input, and may be referred to as an input apparatus, or a handwritten input apparatus.

Handwritten input originated data refers to data entered through handwriting on a touch panel. The handwritten input originated data includes the data that remains as handwritten data after it is entered, and includes the data that is converted to text data. In addition, when data is obtained from an external apparatus, information indicating that the data is handwritten input originated data is not lost. The handwritten input originated data may include text data converted by character recognition, as well as data converted based on user operations such as stamps displayed as fixed characters or marks such as "completed" or "confidential", shapes such as circles and stars, straight lines, etc.

Data, which is not handwritten input originated data, refers to data other than those entered through handwriting on the touch panel. For example, it refers to image data, handwritten data or text data that is entered through an apparatus other than a black-and-white highlighting supporting apparatus.

<Example of an Appearance of a Pen>

Figure 3:
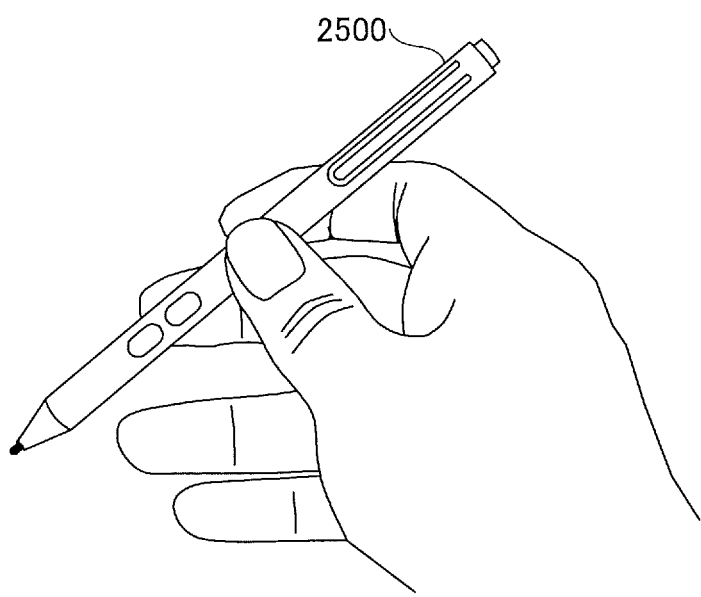
FIG. 3 is a drawing illustrating an example of a perspective view of a pen.

FIG. 3 is a drawing illustrating an example of a perspective view of a pen 2500. FIG. 3 illustrates an example of a multi-functional pen 2500. The pen 2500, which has a built-in power supply and can send instructions to a display apparatus 2, is called an active pen (a pen without a built-in power supply is called a passive pen). The pen 2500 of FIG. 3 has one physical switch on the tip of the pen, one physical switch on the bottom of the pen, and two physical switches on the side of the pen. The switch on the tip of the pen is for writing, the switch on the bottom of the pen is for erasing, and the switches on the side of the pen are for assigning user functions. In an embodiment of the present invention, the pen 2500 further includes a non-volatile memory that stores a pen ID that is unique to the other pens.

The operation procedure of the display apparatus 2 by the user can be reduced by using a pen with a switch. The pen with a switch mainly refers to an active pen. However, a passive pen with electromagnetic induction, which does not have a built-in power supply but generates power using LC circuit, may also be included as the pen with a switch. An optical pen with a switch, an infrared pen with a switch, and a capacitance pen with a switch, are active pens.

It should be noted that it is assumed that the hardware configuration of the pen 2500 is the same as that of a general control method including a communication function and a microcomputer. The pen 2500 may be an electromagnetic induction type, an active electrostatic coupling type, or the like. In addition, the pen 2500 may have functions such as pen pressure detection, tilt detection, and hover function (indicating the cursor before the pen touches a touch panel).

<Overall Configuration of Apparatus>

Figure 4:
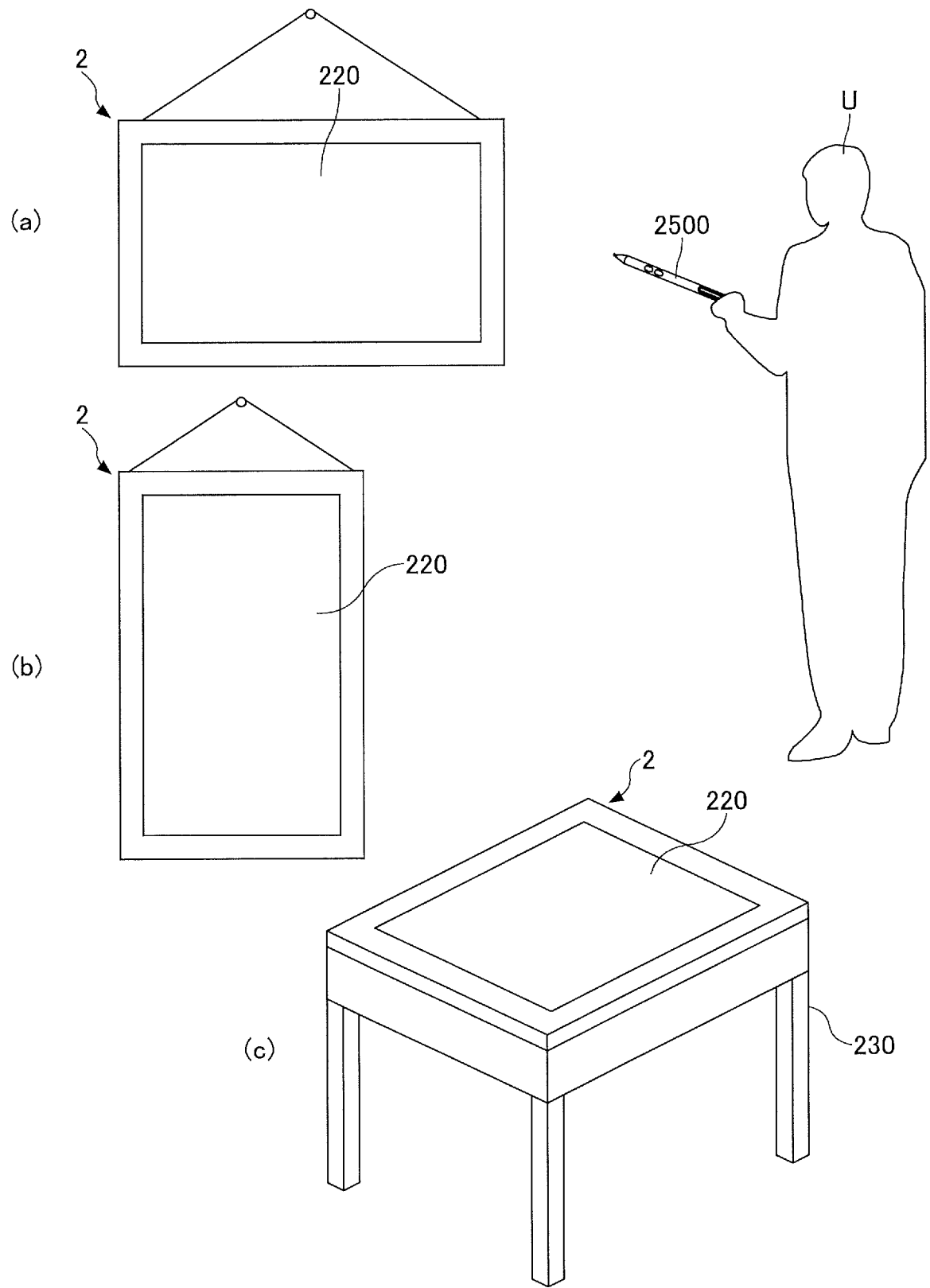
FIG. 4 is a drawing illustrating an example of an overall configuration diagram of a display apparatus.

An overall configuration of the display apparatus 2 according to an embodiment of the present invention will be described with reference to FIG. 4. FIG. 4 is a drawing illustrating an overall configuration diagram of a display apparatus 2. FIG. 4(a) illustrates a display apparatus 2 used as a horizontal electronic blackboard suspended on a wall as an example of a display apparatus 2.

As illustrated in FIG. 4 (a), a display 220 as an example of a display apparatus is provided on top of the display apparatus 2. A user U can handwrite (also referred to as input or draw) a character, or the like, on the display 220 using the pen 2500.

FIG. 4(a) illustrates a display apparatus 2 used as a horizontal electronic blackboard suspended on a wall.

FIG. 4(c) shows a display apparatus 2 positioned (placed) flat on a table 230. Because the thickness of the display apparatus 2 is about 1 cm, it is not necessary to adjust the height of the desk even if it is placed flat on an ordinary desk. Also, the user can easily move the display apparatus 2.

It should be noted that the tilt sensor automatically detects the position in which the display apparatus 2 is used.

<Hardware Configuration of Apparatus>

Figure 5:
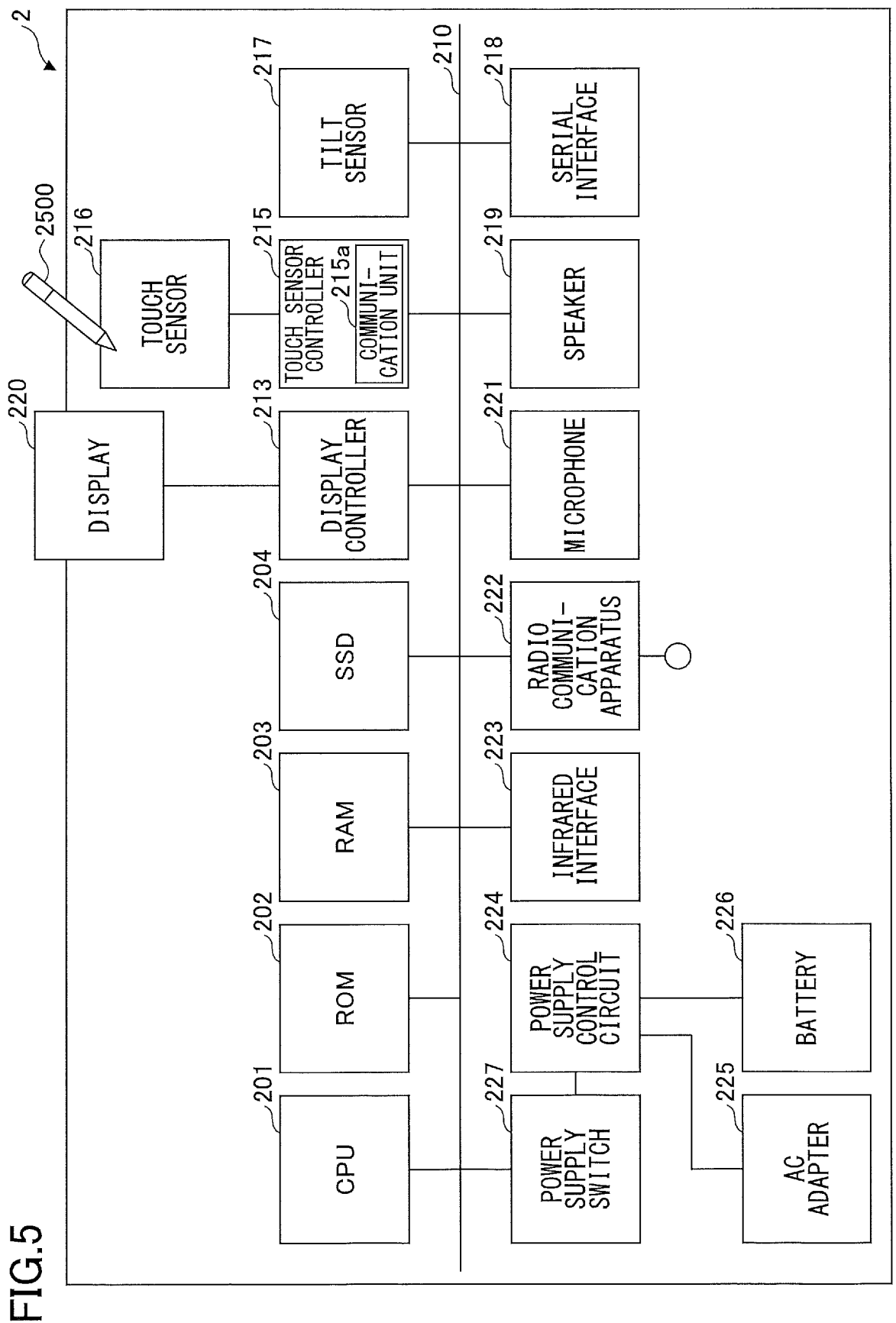
FIG. 5 is a drawing illustrating an example of a hardware structure of a display apparatus.

Next, the hardware configuration of the display apparatus 2 will be described with reference to FIG. 5. The display apparatus 2 has a configuration of an information processing apparatus or a computer as illustrated in the figure. FIG. 5 is a drawing illustrating an example of a hardware configuration of a display apparatus 2. As illustrated in FIG. 5, the display apparatus 2 includes a CPU (Central Processing Unit) 201, a ROM (Read Only Memory) 202, a RAM (Random Access Memory) 203, and an SSD (Solid State Drive) 204.

The CPU 201 controls overall operations of the display apparatus 2. The ROM 202 stores programs used to drive the CPU 201, such as the CPU 201 and the IPL (Initial Program Loader). The RAM 203 is used as a work area of the CPU 201. The SSD 204 stores various data items such as a program for the display apparatus 2.

Further, the display apparatus 2 includes a display controller 213, a touch sensor controller 215, a touch sensor 216, a display 220, a power switch 227, a tilt sensor 217, a serial interface 218, a speaker 219, a microphone 221, a wireless communication apparatus 222, an infrared I/F 223, a power control circuit 224, an AC adapter 225, and a battery 226.

The display controller 213 controls and manages the screen display to output an output image to the display 220, etc. The touch sensor 216 detects that a pen 2500, a hand of a user, or the like (the pen or the hand of a user serves as an input unit) is in contact with the display 220. Further, the touch sensor 216 receives a pen ID.

The touch sensor controller 215 controls the processing of the touch sensor 216. The touch sensor 216 inputs and detects coordinates. An example of a method for inputting and detecting the coordinates will be described. For example, optically, two light emitting and receiving apparatuses, which are located at both ends on an upper side of the display 220, emit a plurality of infrared rays in parallel to the display 220. A reflective member disposed around the display 220 reflects the plurality of infrared rays and the light receiving element receives light that is returned on the same optical path as the emitted light. The touch sensor 216 outputs position information of the infrared rays emitted by the two light emitting and receiving apparatuses blocked by an object to the touch sensor controller 215, and the touch sensor controller 215 identifies a coordinate position that is a contact position of the object. Further, the touch sensor controller 215 includes a communication unit 215a, and is capable of communicating with the pen 2500 via radio (wirelessly). For example, a commercial pen may be used when communicating in a standard such as Bluetooth (registered trademark). When one or more pens 2500 are registered in the communication unit 215a in advance, the user can communicate without performing the connection setting that causes the pen 2500 to communicate with the display apparatus 2.

The power switch 227 is a switch for switching ON/OFF of the power of the display apparatus 2. The tilt sensor 217 is a sensor that detects a tilt angle of the display apparatus 2. The tilt sensor 217 is mainly used to detect whether the display apparatus 2 is used in which installation state of FIG. 4(a), FIG. 4(b), and FIG. 4(c), and thus, the thickness of characters, etc., can be automatically changed depending on the installation state.

The serial interface 218 is a communication interface with external apparatuses, such as a USB interface, a LAN interface, or the like. The serial interface 218 is used, for example, to input information from an external source. The speaker 219 is used for audio output, and the microphone 221 is used for audio input. The wireless communication apparatus 222 communicates with a terminal carried by a user and relays, for example, a connection to the Internet. The wireless communication apparatus 222 communicates via Wi-Fi, Bluetooth (registered trademark), or the like, but the communication standard may be any standard. The wireless communication apparatus 222 forms an access point. The terminal carried by the user can be connected to the access point when the user sets the SSID (Service Set Identifier) and password, which are obtained by the user, to the terminal.

It should be noted that it is preferable that the wireless communication apparatus 222 is provided with two access points.

(a) access point→Internet
(b) access point→internal network→Internet

The access point (a) is for external users, and the external users cannot access the internal network but can use the Internet. The access point (b) is for internal users, and the internal users can use the internal network the Internet.

The infrared I/F 223 detects an adjacent display apparatus 2. The infrared I/F 223 is capable of detecting only the adjacent display apparatus 2 by taking advantage of the straightness of the infrared rays. Preferably, the infrared I/F 223 is provided on each side of the display apparatus 2, and it is possible to detect in which direction of the display apparatus 2 the other display apparatus 2 is located. The adjacent display apparatus 2 can display handwritten information that has been handwritten in the past (handwritten information on another page, assuming that the size of the display 220 corresponds to one page).

The power control circuit 224 controls the AC adapter 225 and the battery 226 that are power sources for the display apparatus 2. The AC adapter 225 converts the alternating current shared by the commercial power supply to DC.

In the case where the display 220 is a so-called electronic paper, the display 220 consumes little or no power to maintain the image after it has been rendered, and thus, the display 220 can be driven by the battery 226. As a result, it is possible to use the display apparatus 2 for an application such as a digital signage even in a place where it is difficult to connect a power source, such as in an outdoor place.

Further, the display apparatus 2 includes a bus line 210. The bus line 210 is an address bus, a data bus, or the like for electrically connecting components such as the CPU 201 illustrated in FIG. 5.

It should be noted that the touch sensor 216 may be not limited to an optical type, but may be a touch panel having an electrostatic capacitance method in which a contact position is identified by detecting a change in capacitance. The touch sensor 216 may be a resistive film type touch panel that identifies a contact position by a voltage change of two resistive films facing each other. The touch sensor 216 may use a variety of detection means, such as an electromagnetic induction type touch panel that detects an electromagnetic induction caused by the contact of a contact object to the display unit, and that identifies a contact position. The touch sensor 216 may be of a method that does not require an electronic pen to detect the presence or absence of a touch by the tip of the pen. In this case, a fingertip or a pen-shaped bar can be used for touch operations. It should be noted that it is not required that the pen 2500 is a thin and long pen.

<Function of Apparatus>

Figure 6B:
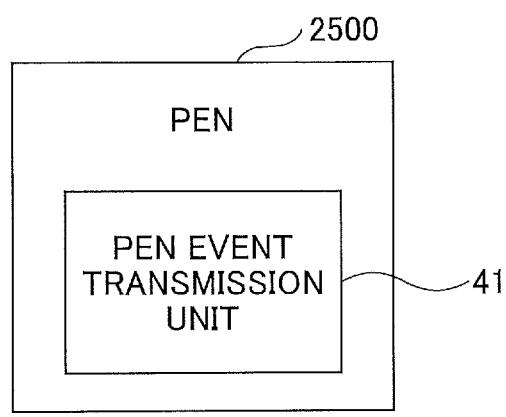
FIG. 6B is a drawing illustrating functions of a display apparatus and a pen.

Next, functions of the display apparatus 2 and the pen 2500 will be described with reference to FIGS. 6A and 6B. FIG. 6A is an example of a functional block diagram illustrating functions of the display apparatus 2 in a block shape. The display apparatus 2 includes a handwritten input unit 21, a display unit 22, a handwritten input display control unit 23, a candidate display timer control unit 24, a handwritten input storage unit 25, a handwriting recognition control unit 26, a handwriting recognition dictionary unit 27, a character string conversion control unit 28, a character string conversion dictionary unit 29, a predictive conversion control unit 30, a predictive conversion dictionary unit 31, an operation command recognition control unit 32, an operation command definition unit 33, a pen ID control data storage unit 36, a file transmission and reception control unit 37, a handwritten signature authentication control unit 38, and a handwritten signature data storage unit 39. Each function of the display apparatus 2 is a function or means implemented in which one of the components illustrated in FIG. 5 is operated by instructions from the CPU 201 according to a program read from the SSD 204 to the RAM 203.

The handwritten input unit 21 is implemented by a touch sensor 216 or the like and receives handwriting input from a user and receives a pen ID from the pen 2500. The handwritten input unit converts a pen input d1 of the user into pen operation data d2 (pen-up, pen-down, or pen-coordinate data) with the pen ID, and transmits the converted data to the handwritten input display control unit 23. The pen coordinate data is transmitted periodically as discrete values, and coordinates between discrete values are calculated by complementary calculation.

The display unit 22 is implemented by a display 220 or the like to display a handwritten object, an operation menu, and the like. The display unit 22 converts drawing data d3, which is written in the video memory by the handwritten input display control unit 23, into data corresponding to the characteristics of the display 220 and transmits the converted data to the display 220.

The handwritten input display control unit 23 performs overall control of handwritten input and display. The handwritten input display control unit 23 processes pen operation data d2 from the handwritten input unit 21 and displays the processed data by transmitting it to the display unit 22. The processing of the pen operation data d2 and the display of strokes will be described in detail with reference to FIG. 32 to FIG. 39 below. The handwritten input display control unit 23 retains operation button definition data, detects an operated operation menu (button) based on the pen operation data d2 from the handwritten input unit 21, and performs control according to the operation menu.

The candidate display timer control unit 24 is a display control timer of selectable candidates. The candidate display timer control unit 24 generates a timing for starting or stopping the timer to start the display of the selectable candidates and to erase the display. The selectable candidates are handwriting recognition character string/language-wise character string candidates, converted character string candidates, character string/predictive conversion candidates, and operation command candidates, which are selectably displayed in an operation guide (see FIG. 19) that will be described later. The candidate display timer control unit 24 receives a timer start request d4 (or a timer stop request) from the handwritten input display control unit 23 and transmits a timeout event d5 to the handwritten input display control unit 23.

The handwritten input storage unit 25 has a storage function for storing user data (handwritten object/character string object). The handwritten input storage unit 25 receives and retains user data d6-1 from the handwritten input display control unit 23. The handwritten input storage unit receives an acquisition request d6-2 from the handwritten input display control unit 23 and transmits the user data d7 stored in the handwritten input storage unit 25. The handwritten input storage unit 25 transmits the position information d36 of the determined object (the character string object that has already been recognized or the handwritten object that has been determined not to be converted) to the operation command recognition control unit 32.

The handwriting recognition control unit 26 is a recognition engine for performing on-line handwriting recognition. Unlike a typical OCR (Optical Character Reader), in parallel with pen operations by the user, characters (not only in Japanese but also in English and in other languages), numbers, symbols (%, $, &, etc.), and graphics (lines, circles, triangles, etc.) are recognized. Various algorithms have been devised for recognizing methods, but in an embodiment of the present invention, details are omitted as well known techniques are available.

The handwriting recognition control unit 26 receives pen operation data d8-1 from the handwritten input display control unit 23 and performs handwriting recognition to retain handwriting recognition character string candidates. Further, the handwriting recognition control unit 26 retains language-wise character string candidates converted from handwriting recognition character string candidates d12 using the handwriting recognition dictionary unit 27. Separately, when an acquisition request d8-2 is received from the handwritten input display control unit 23, the handwriting recognition control unit 26 transmits the retained handwriting recognition character string candidates and the language-wise character string candidates d9 to the handwritten input display control unit 23.

The handwriting recognition dictionary unit 27 is dictionary data for the language conversion of the handwriting recognition. The handwriting recognition dictionary unit 27 receives handwriting recognition character string candidates d12 from the handwriting recognition control unit 26, converts the handwriting recognition character string candidates into language character string candidates d13 that are linguistically appropriate, and transmits the converted candidates to the handwriting recognition control unit 26. For example, in the case of Japanese, a "hiragana" character is converted into a "kanji" character or a "katakana" character.

The character string conversion control unit 28 controls the conversion of the converted character string candidates into character strings. The converted character strings are character strings that are likely to be generated including handwriting recognition character strings or language-wise character strings. The character string conversion control unit 28 receives the handwriting recognition character strings and the language-wise character string candidates d11 from the handwriting recognition control unit 26, converts them into converted character string candidates using the character string conversion dictionary unit 29, and retains the converted candidates. Separately, when the character string conversion control unit 28 receives the acquisition request d14 from the handwritten input display control unit 23, the retained converted character string candidate d15 is transmitted to the handwritten input display control unit 23.

The character string conversion dictionary unit 29 is dictionary data for character string conversion. The character string conversion dictionary unit 29 receives the handwriting recognition character strings and the language-wise character string candidates d17 from the character string conversion control unit 28 and transmits the converted character string candidates d18 to the character string conversion control unit 28.

The predictive conversion control unit 30 receives the handwriting recognition character strings and the language-wise character string candidates d10 from the handwriting recognition control unit 26, and receives the converted character string candidates d16 from the character string conversion control unit 28. The predictive conversion control unit 30 converts each of the handwriting recognition character strings, the language-wise character string candidates, and the converted character string candidates into predictive character string candidates using the predictive conversion dictionary unit 31. The predictive converted character strings are character strings that are likely to be generated including the handwriting recognition character strings, the language-wise character strings or converted character strings. When the predictive conversion control unit 30 receives the acquisition request d19 from the handwritten input display control unit 23 separately, the predictive character string candidate d20 is transmitted to the handwritten input display control unit 23.

The predictive conversion dictionary unit 31 is dictionary data for the predictive conversion. The predictive conversion dictionary unit 31 receives the handwriting recognition character strings, the language-wise character string candidate, and the converted character string candidates d21 from the predictive conversion control unit 30 and transmits the predictive character string candidates d22 to the predictive conversion control unit 30.

The operation command recognition control unit 32 receives the handwriting recognition character strings and the language-wise character string candidates d30 from the handwriting recognition control unit 26 and receives the converted character string candidates d28 from the character string conversion control unit 28. The operation command recognition control unit 32 receives the predictive character string candidates d29 from the predictive conversion control unit 30. Further, the operation command recognition control unit 32 transmits an operation command conversion request d26 to the operation command definition unit 33 for each of the handwriting recognition character strings, the language-wise character string candidates, the converted character string candidate, and the predictive character string candidates d29, and receives operation command candidates d27 from the operation command definition unit 33. The operation command recognition control unit 32 retains the operation command candidates d27.

When the operation command conversion request d26 is partially matched with operation command definitions, the operation command definition unit 33 transmits the operation command candidates d27 to the operation command recognition control unit 32.

The operation command recognition control unit 32 receives pen operation data d24-1 from the handwritten input display control unit 23. The operation command recognition control unit 32 transmits the position information acquisition request d23 of the determined object that has been input and determined in the past to the handwritten input storage unit 25 and retains the determined object specified by the pen operation data as a selected object (including position information). The operation command recognition control unit 32 identifies: a position of the pen operation data d24-1; and a selected object that satisfies a predetermined criteria. Separately, when the acquisition request d24-2 is received from the handwritten input display control unit 23, the operation command recognition control unit 32 transmits the retained operation command candidate and the identified selected object d25 to the handwritten input display control unit 23.

The pen ID control data storage unit 36 retains the pen ID control data (may be referred to as a storage unit). Before the handwritten input display control unit 23 transmits the display data to the display unit 22, the pen ID control data storage unit 36 transmits the pen ID control data d41 to the handwritten input display control unit 23. The handwritten input display control unit 23 draws display data under the operating conditions stored in association with the pen ID. Further, before the handwriting recognition control unit 26 performs the handwriting recognition, the pen ID control data storage unit 36 transmits angle information d44 of the pen ID control data to the handwriting recognition control unit 26, and the handwriting recognition control unit 26 rotates the stroke with the angle information stored in association with the pen ID to perform the handwriting recognition.

Further, after recognizing a straight line for setting the angle information that is used when the user handwrites a character or the like, the handwriting recognition control unit 26 transmits the angle information d43 of the pen ID control data to the pen ID control data storage unit 36. The handwriting recognition control unit 26 stores the angle information d43 corresponding to the pen ID. Further, after the operation command for setting the angle information is executed by the handwritten input display control unit 23, the handwritten input display control unit 23 transmits the pen ID control data d42 to the pen ID control data storage unit 36. The handwritten input display control unit 23 stores the execution result (the angle information set by the user) of the operation command corresponding to the pen ID. Thereafter, the stroke of the pen ID is rotated with the set angle information, and handwriting recognition is performed.

Further, the handwriting recognition control unit 26 transmits stroke data d49, which is rotated clockwise with the angle information of the pen ID control data, to the handwritten signature authentication control unit 38. According to the above, it becomes possible to perform authentication of handwritten signature regardless of the user's operation position (from which direction the signature is handwritten with reference to the display apparatus 2).

The handwritten signature data storage unit 39 retains handwritten signature data. When the handwritten signature data storage unit 39 receives a handwritten signature data acquisition request d45 from the handwritten signature authentication control unit 38, the handwritten signature data storage unit 39 transmits the handwritten signature data d46 to the handwritten signature authentication control unit 38. It is assumed that the format of the handwritten signature data depends on the algorithm for handwritten signature authentication of the handwritten signature authentication control unit 38. Data of the handwritten signature data storage unit 39 will be described with reference to FIG. 13.

In response to receiving stroke data d49, which is rotated clockwise, from the handwriting recognition control unit 26, the handwritten signature authentication control unit 38 transmits a handwritten signature data acquisition request d45 to the handwritten signature data storage unit 39. The handwritten signature data storage unit 39 transmits the handwriting signature data d46 to the handwritten signature authentication control unit 38.

The handwritten signature authentication control unit 38 authenticates the user based on the handwritten signature data. Various algorithms have been devised for user authentication based on handwritten signature data, but in an embodiment of the present invention, techniques, which can achieve a recognition rate that does not hinder practical use, are used. For example, the handwritten signature authentication control unit 38 generates a feature vector comprising coordinates constituting the handwritten signature data, writing pressure, time for writing strokes, and the like. The handwritten signature authentication control unit 38 compares a feature vector of the registered handwritten signature data with a feature vector of a user name or the like handwritten by a user at signin, with appropriate weighting of the elements. When the matching degree is equal to or more than the threshold value, the handwritten signature authentication control unit 38 determines that the authentication is successful, and when the matching degree is less than the threshold value, the handwritten signature authentication control unit 38 determines that the authentication is failed.

The handwritten signature authentication control unit 38 retains the authentication result of the handwritten signature which is the comparison result of the stroke data d49 and the handwritten signature data d46. Separately, when the acquisition request d48 is received from the handwritten input display control unit 23, the handwritten signature authentication control unit 38 transmits the retained authentication result d47 of the handwritten signature to the handwritten input display control unit 23. The authentication result of the handwritten signature includes: whether or not the stroke data d49 and the handwritten signature data d46 are considered to be matched; and if they appear to be matched, a SignatureId described later, which is associated with the matched handwritten signature data d46.

When the result of the handwriting recognition of the handwriting recognition control unit 26 conforms to the operation command indicating the execution of the handwritten signature registration, the handwriting recognition control unit 26 acquires the data d52 input to the handwritten signature registration form (a frame in which the handwritten signature data is input, as described below) from the handwritten input storage unit 25. The handwriting recognition control unit 26 transmits the handwritten signature data d50 among the data d52 to the handwritten signature authentication control unit 38. The handwritten signature authentication control unit 38 transmits the received handwritten signature data d50 to the handwritten signature data storage unit 39 to register.

When the handwriting recognition result of the handwriting recognition control unit 26 is an instruction to cancel the handwritten signature, the handwriting recognition control unit 26 transmits a deletion request d51 of the handwritten signature registration form to the handwritten input storage unit 25 and deletes the handwritten signature registration form from the handwritten input storage unit 25.

When the handwriting recognition result of the handwriting recognition control unit 26 is an instruction to execute the user-defined data change, the handwriting recognition control unit 26 acquires the data d53, which is input to the user-defined data change form, from the handwritten input storage unit 25. The handwriting recognition control unit 26 transmits a change value d54 of the data d53 to the operation command definition unit 33 to change the user-defined data. The user-defined data will be described in FIG. 12.

When the handwriting recognition result of the handwriting recognition control unit 26 an instruction to cancel the user-defined data change form, the handwriting recognition control unit 26 transmits a deletion request d55 of the user-defined data change form to the handwritten input storage unit 25 and deletes the user-defined data change form from the handwritten input storage unit 25.

The file transmission and reception control unit 37 stores in a storage medium and acquires: handwritten input originated data; or data that is not the handwritten input originated data, and communicates with external apparatuses (print request, display request, etc.). The file transmission and reception control unit 37 receives an execution request d64 for transmitting and receiving a file, from the handwritten input display control unit 23. At the time of storing or printing of a file, the handwritten input display control unit 23 transmits a file transmission request to the file transmission and reception control unit 37, and the file transmission and reception control unit 37 transmits an acquisition request of the handwritten input storage data d61 to the handwritten input storage unit 25.

In the case where the data is not handwriting originated data, the handwritten input storage unit 25 transmits the color information retained by the data as it is.

In the case where the data is handwriting originated data, the handwritten input storage unit 25 transmits the handwritten input storage data d62, which is converted to color data, to the file transmission and reception control unit 37 when the transmission destination is a color supporting apparatus (for example, a color printer).

In the case where the data is handwriting originated data, the handwritten input storage unit 25 transmits the handwritten input storage data d62, which is converted to black-and-white data, to the file transmission and reception control unit 37 when the transmission destination is a black-and-white supporting apparatus (for example, a monochrome printer). In some cases, the black-and-white supporting apparatus is capable of converting color data into gray-scale data, and thus, the data may be converted to color data to be transmitted.

In the case where the transmission destination is a black-and-white highlighting supporting apparatus, the handwritten input storage data, which will be described later, is transmitted to the file transmission and reception control unit 37.

Further, in the case where the handwritten input storage unit 25 stores the handwriting originated data in a file, the handwritten input storage unit 25 converts the handwritten input storage data d62 to color data according to the file format and attaches the handwritten input storage data as meta-data of the file. When storing data that is not handwriting originated data in a file, the handwritten input storage data d62 is converted to color data according to the file format.

Information indicating the color supporting apparatus or the black-and-white supporting apparatus is stored in, for example, a MIB (Management Information Base) retained by a network apparatus, and the file transmission and reception control unit 37 can perform determination by acquiring the MIB. Similarly, it is possible to determine whether the apparatus is a black-and-white highlighting supporting apparatus based on the model name disclosed by the MIB.

At the time of reading the file, the handwritten input display control unit 23 transmits the file list acquisition request d65 to the file transmission and reception control unit 37. The file transmission and reception control unit 37 transmits the file list acquisition request to the external device, acquires the file list d63, and transmits the file list to the handwritten input display control unit 23. The handwritten input display control unit 23 displays a file list on the display unit 22, the handwritten input unit 21 transmits a display position of a selected file to the handwritten input display control unit 23, and the handwritten input display control unit 23 transmits a file reception request d66 to the file transmission and reception control unit 37. The file transmission and reception control unit acquires a file from an external apparatus and transmits the file d67 to the handwritten input storage unit 25. The handwritten input storage unit 25 analyzes meta-data of the file to determine whether or not the data is handwriting originated data. If the data is handwriting originated data, the handwritten input storage unit 25 retrieves the handwritten input storage data (black-and-white highlighting/color conversion enabled data, which will be described below). The file transmission and reception control unit 37 converts the handwritten input originated data into a black-and-white highlighting display and transmits the data to the handwritten input display control unit 23, and transmits data to the handwritten input display control unit 23 without converting the data when the data is not handwritten input originated data (which is displayed in gray scale). The handwritten input display control unit 23 transmits the display data of a handwritten object to the display unit 22.

FIG. 6B is a functional block diagram illustrating a function of the pen 2500 in a block shape. The pen 2500 includes a pen event transmission unit 41. The pen event transmission unit 41 transmits event data items of pen-up, pen-down, and pen-coordinate, with a pen-ID, to the display apparatus 2.

<Defined Control Data>

Next, defined control data used for various processes of the display apparatus 2 will be described with reference to FIG. 7. FIG. 7 illustrates an example of the defined control data. The defined control data in FIG. 7 shows the control data for each control item.

The selectable candidate display timer 401 defines the time until the selectable candidates are displayed. This is because the display apparatus 2 does not display the selectable candidate during handwriting. In FIG. 7, it is meant that the selectable candidates are displayed if a pen-down event does not occur within a TimerValue of 500 ms from a pen-up event. The selectable candidate display timer 401 is retained by the candidate display timer control unit 24. The selectable candidate display timer 401 is used at the start of the selectable candidate display timer in step S18-2 of FIG. 34 below.

The selectable candidate erase timer 402 defines the time until the displayed selectable candidates are erased. This is used for erasing the selectable candidates in the case where the user does not select the selectable candidates. In FIG. 7, it is meant that the selectable candidate display data is deleted if the selectable candidates are not selected within a TimerValue of 5000 ms from the display of the selectable candidates. The selectable candidate erase timer 402 is retained by the candidate display timer control unit 24. The selectable candidate erase timer 402 is used at the start of the selectable candidate erase timer in step S64 of FIG. 36.

A handwritten object neighboring rectangular area 403 defines a rectangular area considered to be near the handwritten object. In an example of FIG. 7, the handwritten object neighboring rectangular area 403 is a rectangular area in which the rectangular area of the handwritten object is expanded horizontally by 50% of the estimated character size, and is expanded vertically by 80% of the estimated character size. In an example illustrated in FIG. 7, ratios with respect to the estimated character size are defined (in %). However, if the unit of "mm", or the like, is used, fixed lengths may be defined. The handwritten object neighboring rectangular area 403 is retained by the handwritten input storage unit 25. The font data 405 is used in step S10 of FIG. 33 to determine the overlap status of the rectangular area near the handwritten object and the stroke rectangular area.

Estimated writing character direction;/character size determination condition 404 defines constants for determining a writing character direction and a character size measurement direction. In an example of FIG. 7, in a case:

where the difference between the time when the first stroke is added in the handwritten object rectangular area and the time when the last stroke is added is equal to or greater than MinTime=1000 [ms];

where the difference between the horizontal distance (width) and vertical distance (height) in the handwritten object rectangular area is equal to or greater than MinDiff=10 [mm]; and where the horizontal distance is greater than the vertical distance, the estimated writing character direction is determined to be "horizontal writing" and the estimated character size is determined to be vertical distance. If the horizontal distance is shorter than the vertical distance, the estimated writing character direction is determined to be "vertical" and the estimated character size is determined to be the horizontal distance. If the above-described conditions are not met, the estimated writing character direction is determined to be "horizontal" (DefaultDir="Horizontal") and the estimated character size is determined to be the longer distance between the horizontal distance and the vertical distance. The estimated writing character direction/character size determination condition 404 is retained by the handwritten input storage unit 25. The estimated writing character direction/character size determination condition 404 is used in the estimated writing character direction acquisition in step S59 of FIG. 36 and in the character string object font acquisition in step S81 of FIG. 38.

Font data 405 defines data for estimating a size of a character, etc. In an example of FIG. 7, it is illustrated that the estimated character size determined by the estimated writing character direction/character size determination condition 404 is compared to the smaller character 405a (hereinafter referred to as the minimum font size) and the larger character 405c (hereinafter referred to as the maximum font size) of the font data 405. If the estimated character size is smaller than the minimum font size, the estimated character size is determined to be the minimum font size. If the estimated character size is larger than the maximum font size, the estimated character size is determined to be the maximum font size. Otherwise, the estimated character size is determined to be a character size of the medium character 405b. The font data 405 is retained by the handwritten input storage unit 25. The font data 405 is used in the character string object font acquisition in step S81 of FIG. 38.

Specifically, the handwritten input storage unit 25 uses the font of the closest size obtained by comparing the estimated character size determined by the estimated writing character direction/character size determination condition 404 with the Fontsize of the font data 405. For example, when the estimated character size is equal to or less than 25 [mm] (FontSize of the small-size character), the handwritten input storage unit 25 determines "the small-size character." When the estimated character size is greater than 25 mm, and equal to or less than 50 mm (FontSize of the medium-size character), the handwritten input storage unit 25 determines "medium-size character." When the estimated character size exceeds 100 mm (FontSize of the large-size character), the handwritten input storage unit 25 determines "large-size character." The Mincho typeface 25 mm font is used for "small-size character" 405a (FontStyle="明朝体" FontSize="25 mm"), Mincho typeface 50 mm font is used for "medium-size character" 405b (FontStyle="明朝体" FontSize="50 mm"), and Gothic typeface 100 mm font is used for "large-size character"405c (FontStyle="ゴシック体" FontSize="100 mm"). In response to the need to increase the sizes or types of font, the provider of the display apparatus may increase the types of font data 405.

An extending-over line determination condition 406 defines the data used to determine whether multiple objects have been selected. A handwritten object is a single stroke. In an example of FIG. 7, in a case:

where the length of the longer side of the handwritten object is greater than or equal to 100 mm (MinLenLongSide="100 mm"); to 100 mm (MinLenLongSide="100 mm");

where the length of the shorter side is 50 [mm] or less (MaxLenShortSide="50 mm"); and where the overlap rate between the longer side and shorter side of the handwritten object is equal to or greater than 80% (MinOverLapRate="80%), it is determined that multiple objects are selected (selected objects). The extending-over line determination condition 406 is retained by the operation command recognition control unit 32. The extending-over line determination condition 406 is used in the determination of the selected object in step S50 of FIG. 35.

An enclosing line determination condition 407 defines the data used to determine whether an object is an enclosing line. In an example of FIG. 7, the operation command recognition control unit 32 determines, as a selected object, a determined object whose overlap rates with the handwritten object in the long side direction and the short side direction are equal to or greater than 100% (MinOverLapRate="100%"). The enclosing line determination condition 407 is retained by the operation command recognition control unit 32. The enclosing line determination condition 407 is used in the enclosing line determination of the determination of the selected object in step S50 of FIG. 35.

It should be noted that anyone of the determination using the extending-over line determination condition 406 and the determination using the enclosing line determination condition 407 may be performed with priority. For example, when the extending-over line determination condition 406 is relaxed (when it is made easier to select the extending-over line) and the enclosing line determination condition 407 is strictly made (when condition values are set in such a way that only enclosing lines can be selected), the operation command recognition control unit 32 may give priority to the determination using the enclosing line determination condition 407.

<Example of Dictionary Data>

Dictionary data will be described with reference to FIGS. 8 to 10. FIG. 8 is an example of dictionary data of the handwriting recognition dictionary unit 27. FIG. 9 is an example of dictionary data of the character string conversion dictionary unit 29. FIG. 10 is an example of dictionary data of the predictive conversion dictionary unit 31. It should be noted that each of these dictionary data sets is used in steps S33 to S41 of FIG. 35.

In an embodiment of the present invention, a conversion result of the dictionary data of the handwriting recognition dictionary unit 27 of FIG. 8 is called language-wise character string candidates, a conversion result of the dictionary data of the character string conversion dictionary unit 29 of FIG. 9 is called converted character string candidates, and a conversion result of the dictionary data of the predictive conversion dictionary unit 31 of FIG. 10 is called predictive character string candidates. "Before conversion" of each dictionary data indicates the character string to be searched for in the dictionary data, "after conversion" indicates the character string after conversion corresponding to the character string to be searched for, and "probability" indicates the probability with which the converted character string is selected by the user. The probability is calculated from the result of the user selecting each character string in the past. Therefore, the probability may be calculated for each user. Various algorithms have been devised to calculate the probability, but the probability may be calculated in an appropriate way, and the details will be omitted. According to an embodiment of the present invention, character string candidates are displayed in the descending order of the selection probability according to the estimated writing character direction.

In the dictionary data illustrated in the handwriting recognition dictionary unit 27 of FIG. 8, the handwritten "ぎ" is converted to "議" with a probability of 0.55 and converted to "技" with a probability of 0.4. The handwritten "ぎ し" is converted to "技 士" with a probability of 0.5 and converted to "技 師" a probability of 0.45. The same applies to other character strings of "before conversion". In FIG. 8, the character strings of "before conversion" are handwritten "hiragana" characters. However, it is permissible to register a string other than "hiragana" characters as "before conversion".

In the dictionary data of the character string conversion dictionary unit 29 of FIG. 9, the character string "議" is converted to "議事録" with a probability of 0.95, and the character string "技" is converted to "技量試" with a probability of 0.85. The same applies to other character strings of "before conversion".

In the dictionary data of the predictive conversion dictionary unit 31 of FIG. 10, the character string "議事録" is converted to "議事録の送付先" with a probability of 0.65, and the character string "技量試" is converted to "技量試を決裁" with a probability of 0.75. In an example of FIG. 10, all of the character strings before conversion are "kanji" characters (Chinese characters), but a character other than the "kanji" characters may be registered.

It should be noted that the dictionary data is language independent, and any character string may be registered as "before conversion" and "after conversion".

<Operation Command Definition Data Retained by Operation Command Definition Unit>

Next, the operation command definition data used by the operation command recognition control unit 32 will be described with reference to FIGS. 11A and 11B. FIGS. 11A and 11B illustrate examples of the operation command definition data and system definition data retained by the operation command definition unit 33.

FIG. 11A illustrates an example of operation command definition data. The operation command definition data shown in FIG. 11A is an example of the operation command definition data when there is no selected object selected by the handwritten object, and all operation commands that can be executed by the display apparatus 2 are targeted (included). The operation commands of FIG. 11A include operation command names (Name), character strings that partially match character string candidates (String), and operation command character strings (Command) to be executed. "%~%" in the operation command character strings is a variable and is associated with the system definition data as illustrated in FIG. 11B. In other words, "%-%" is replaced by the system definition data illustrated in FIG. 11B.

First, the operation command definition data 701 indicates that the name of the operation command is "議事録テンプレートを読み込む" (Read the minutes template), the character string that partially matches the character string candidates is "議事録" (Meeting minutes) or "テンプレート" (Template), and the operation command character string to be executed is "ReadFile https://%username%:%password%@server.com/templates/minutes.pdf". In this example, system definition data "%~%" is included in the operation command character string to be executed, and "% username %" and "% password %" are replaced by system definition data items 704 and 705, respectively. Therefore, the final operation command character string is "ReadFile https://taro.tokkyo: x2PDHTyS@server.com/template/minutes.pdf", indicating that the file "https://taro.tokkyo: x2PDHTyS@server.com/minutes.pdf" is read (ReadFile).

The operation command definition data 702 indicates that the name of the operation command is "議事録フォルダーに保存する" (save in the minutes folder), that the character string that partially matches the character string candidates is "議事録" (minutes) or "保存" (save), and that the operation command character string to be executed is "WriteFile https://%username%:%password%@server.com/minutes/%machinename%_%yyyyy-mm-dd.pdf". Similar to the operation command definition data 701, "% username %", % password %", and "% machinename %" in the operation command character string are replaced by system definition data items 704-706, respectively. It should be noted that "% yyyy-mm-dd %" is to be replaced by the current date. For example, if the current date is Sep. 26, 2018, it will be replaced by "2018-09-26". The final operating command to be executed is "WriteFile https://taro.tokkyo: x2PDHTyS@server.com/minutes/% My-Machine_2018-09-26.pdf" and indicates that the minutes are to be saved in the file "https://taro.tokkyo:x2PDHTyS@server.com/%Minutes/%My-Machine2018-09-26.pdf" (WriteFile).

The operation command definition data 703 indicates that the name of the operation command is "印刷する" (print), the character string that partially matches the character string candidates is "印刷" (print) or "プリント" (print), and that the operation command character string to be executed is "Print File https://%username%:%password%@server.com/print/%machiname%-%yyyy-mm-dd%.pdf". When the operation command character strings are replaced as in operation command definition data 702, the final operation command to be executed is "PrintFile https://taro.tokkyo: x2PDHTyS@server.com/print/%My-Machine_2018-09-26.p df", indicating that the file "https://taro.tokkyo: x2PDHTyS@server.com/print/%My-Machine_2018-09-26.p df" is printed (PrintFile). That is, the file is transmitted to the server. The user allows the printer to communicate with the server, and the printer prints the contents of the file on the paper when the file is specified.

As described above, because the operation command definition data sets 701 to 703 can be identified from the character string candidates, the operation command can be displayed based on the handwriting of the user. Further, in the case where the user authentication is successful, "% username %", % password %", etc., in the operation command definition data, are replaced by the user information, and thus, the input and output of the file can be performed in association with the user.

In the case where the user's authentication is not performed (including the case of authentication failure if the user can still use the display apparatus 2 after the authentication failure), the display apparatus 2 uses preset "% username %", % password%", etc., data of the display apparatus 2. Accordingly, even without user authentication, the input and output of the file can be performed in association with the display apparatus 2.

Figure 15B:
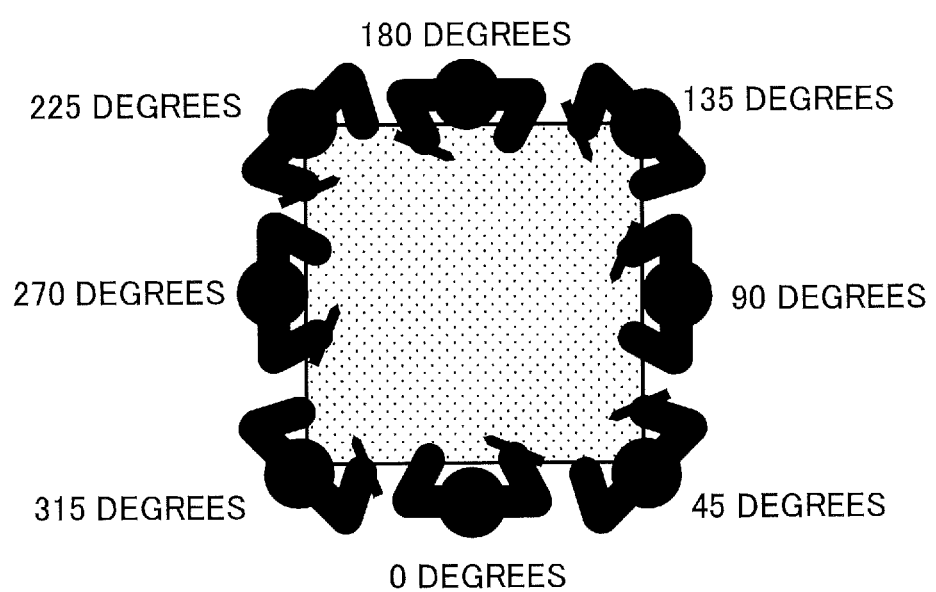
FIG. 15B is a drawing illustrating pen ID control data stored in a pen ID control data storage unit.

Operation command definition data items 709, 710, 711, 720, 721, 722, 723, 724, 725, and 726 are operation commands to change the pen color. The pen color is the color of handwritten data entered with the pen used by the user. The operation command names of the operation command definition data items 709, 710, 711, 720, 721, 722, 723, 724, 725, and 726 are "黒ペン" (black pen), "黒ペン" (red pen), "青ペン" (blue pen), "緑ペン" (green pen), "マゼンタペン" (magenta pen), and "シアンペン" (cyan pen), "黒細ペン" (thin black pen), "赤細ペン" (thin red pen), "青細ペン" (thin blue pen), "緑細ペン" (thin green pen). For example, in the case of the "黒ペン" (black pen) or "黒細ペン" (thin black pen), the character string that is partially matched to the character string candidates is "くろ" ("kuro", black in Japanese) or "ペン" (pen), and if the user writes "くろ" (kuro), only the "黒ペン" (black pen) and "黒細ペン" (thin black pen) are displayed in the operation command candidates. On the other hand, because the "ペン" (pen) corresponds to a character string (String) that partially matches the character string candidates in "黒ペン" (red pen), etc., if the user writes "ペン" (pen), the "黒ペン" (black pen) to "シアンペン" (cyan pen), and "黒細ペン" (thin black pen) to "黒細ペン" (thin green pen) are displayed in the operation command candidates. When these operation commands are executed, as illustrated in FIGS. 15A and 15B, the control data associated with the pen ID of the pen 2500 used by the user is updated, and the pen color of this pen ID is set to ColorId of the pen ID control data (e.g., the "Black" in Command="ChangePen Black" becomes ColorId).

The operation command definition data 719 indicates that the name of the operation command is "ファイルを読み込む" (Read a file); the character string (String) that matches the character string candidates is "ファイル" (File), "読み込む" (Read), "読み込み" (Read), and the operation command to be executed is "ReadFile https://%username%:%password%@server.com/files/". When the handwritten input display control unit 23 performs replacing using the system definition data in a same way as in the operation command definition data 702, the operation command becomes "ReadFile https://taro.tokkyo:x2PDHTyS@server.com/files/", which indicates that the file of this address (folder) is read (ReadFile). When this operation command is executed, the file selection window is displayed by the display apparatus 2.

The operation command definition data 712 is an operation command for aligning the orientation of the text data in a constant direction. The operation command name of the operation command definition data 712 is "テキスト方向を揃える" (align the text direction), the character string that partially matches the character string candidates is "テキスト" (Text), "向き" (Direction), or "方向" (Direction), and the operation command character string is "AlignTextDirection". Directions of the text data items written by a user in a direction other than vertical direction are various directions so that it is difficult to read everything from one direction. When the user executes the operation command definition data 712, the display apparatus 2 aligns the handwriting recognized character strings in the same direction (for example, in a vertical direction). In this case, aligning means rotating the text data with angular information.

The operation command definition data 713 indicates that the name of the operation command is "手書きサイン登録する" (register a handwritten signature)," that the character strings that partially match the character string candidates are "サイン" (signature) and "登録" (register), and that the operation command character string is "RegisterSignature." When the RegisterSignature command is executed, a handwritten signature registration form is added to the handwritten input storage unit 25 and the handwritten signature registration form for the user to register the handwritten signature is displayed on an operation screen 101.

The operation command definition data 714 indicates that the operation command name is "手書きサイン インする" (sign-in with handwriting), that the character string that partially matches the character string candidates is "% signature %", and that the operation command is "Signin". Here, "% signature %" is a reserved word of system definition data and represents the fact that the registered handwritten signature data and the stroke data such as the user name are conformed (matched). In other words, when conformed (matched), the operation command 512 based on the operation command definition data 714 is displayed in an operation guide 500 (see FIG. 22).

When the Signin command is executed, AccountId of the user with a SignatureID of the conformed (matched) handwritten signature data is saved in the pen ID control data of the pen 2500 that is used for handwriting the stroke data, such as the user name. According to the above, the pen ID is associated with the AccountId, and the user defined data identified by the AccountId can be used by the display apparatus 2 (see FIG. 15A).

The operation command definition data 715 indicates that the operation command name is "手書きサイン アウトする" (handwritten signing out), that the character string that partially matches the character string candidate is "サイン" (signature) or "アウト" (out), and that the operation command is "Signout". When the Signout command is executed, the AccountId is deleted from the pen ID control data of the pen 2500 that is operated for the handwritten signout. According to the above, the association between the pen ID and the AccountId is released, and the pen 2500 can be used by any user.

The operation command definition data 716 indicates that the name of the operation command is "設定変更する" (changes the setting), that the character string that partially matches the character string candidate is "設定" (set) or "変更" (change), and that the operation command is "ConfigSettings". When the ConfigSettings command is executed, the user defined data change form is added to the handwritten input storage unit 25 and the user defined data change form is displayed on the operation screen 101.

Figure 20A:
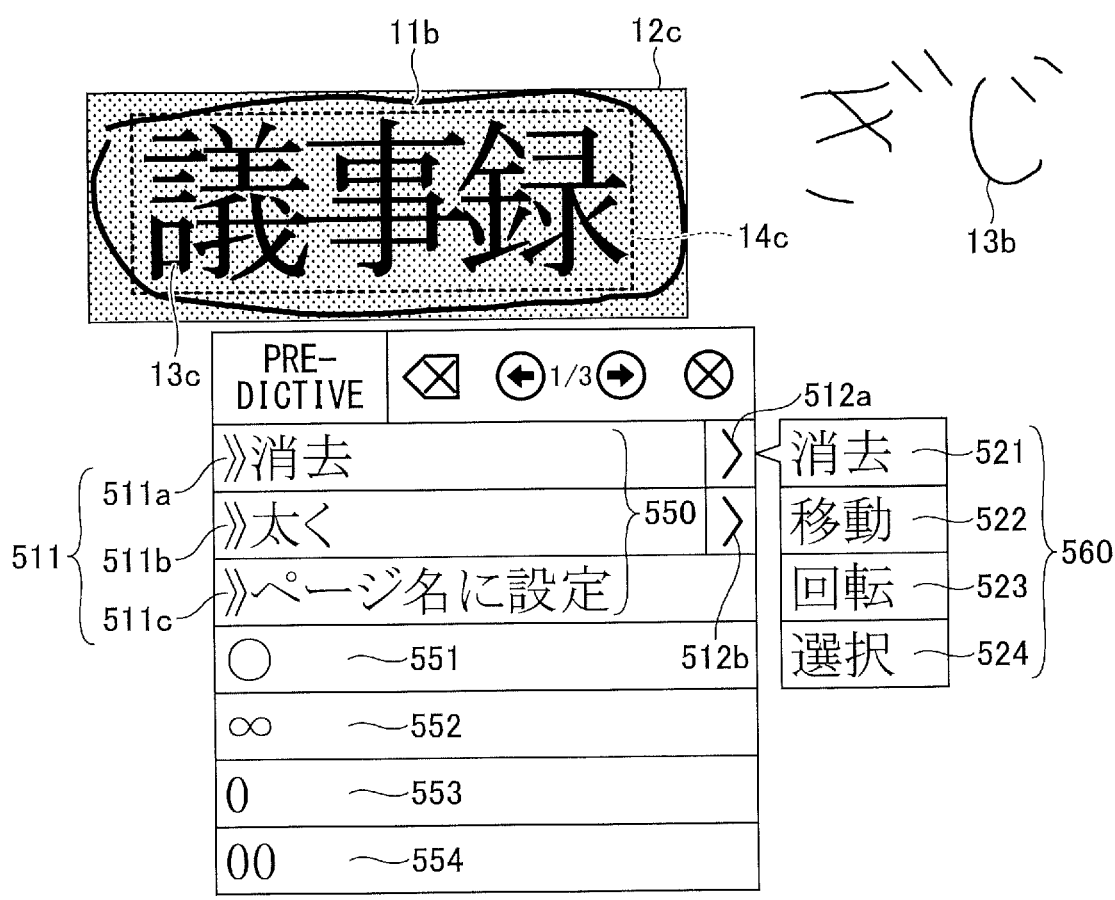
FIG. 20A is a drawing illustrating an example of displaying operation command candidates based on the operation command definition data when there is a handwritten object.
Figure 20B:
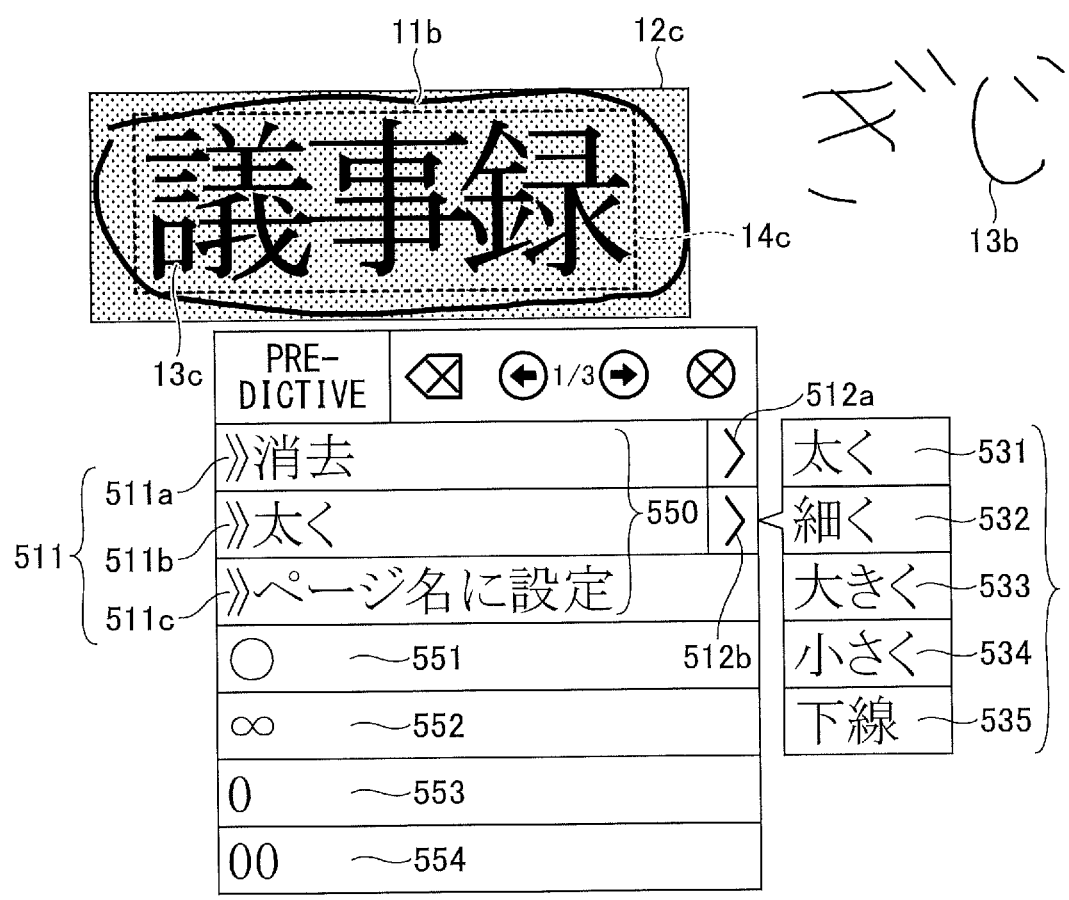
FIG. 20B is a drawing illustrating an example of displaying operation command candidates based on the operation command definition data when there is a handwritten object.

The operation command definition data when there is a handwritten object is omitted, but when a handwritten object is selected, the operation command when there is a handwritten object is displayed (see FIGS. 20A and 20B). In this case, the overlap of an already-displayed handwritten object with the circumscribed rectangle of the user's handwritten stroke results in the display of an operation command when there is a handwritten object.

<User Defined Data>

Next, user defined data will be described with reference to FIG. 12. FIG. 12 illustrates an example of the user defined data retained by the operation command definition unit 33. The user defined data of FIG. 12 is an example of the defined data for a single user. "AccountId" in user defined data 717 is user identification information that is automatically assigned to each user; "AccountUsername" and "AccountPassword" are a user name and a password; "SignatureId" is identification information of handwritten signature data that is automatically assigned at the time of handwritten signature data registration; and "username," "password" and "machinename" are character strings that are set to replace system definition data items 704 to 706, respectively, in operation command definition data items 701 to 703. According to the above, it becomes possible to execute an operation command using user defined data.

If a user handwrites a username or the like to sign in, a character string of user-defined data, whose AccountId is associated with pen ID of a pen 2500 used by the user, is used when executing the operation command, taking advantage of the fact that pen ID and AccountId are associated with the pen ID control data (see FIG. 15A). After the user has signed out, the character string of the system defined data is used when executing the operation command, even if the pen 2500, which the user has used for signing in, is used.

User defined data 718 is the data used in the user defined data change form. "Name" is the item names of "AccountUsername", "AccountPassword", "username", "password", or "machinename" of user defined data 717, and "data" is the change values of "AccountUsername", "AccountPassword", "username", "password", or "machinename". In this example, the data for "名前" ("name") is "% AccountName %", the data for "パスワード" ("password") is "% AccountPassword %", the data for "フォルダー ユーザー名" ("folder user name") is "% username %", the data for "フォルダーパスワード" ("folder password") is "% password", and the data for "フォルダーファイル名" ("folder file name") is "% machinename", which corresponds to the user-defined data 717. These items entered in the user defined data change form are reflected in the user defined data 717.

It is also possible for the user to register the color definition data described below in the user defined data 717, allowing the user to enter with the color definition data as defined by the user.

<Handwritten Signature Data>

Next, handwritten signature data will be described with reference to FIG. 13. FIG. 13 illustrates an example of handwritten signature data retained by the handwritten signature data storage unit 39. The handwritten signature data has data representing the handwritten signature associated with SignatureId. The SignatureId is identification information automatically assigned at the time of handwritten signature data registration, and the Data is data calculated by the handwritten signature authentication algorithm of the handwritten signature authentication control unit 38 from the stroke data received from the handwritten signature authentication control unit 38.

<Handwritten Input Storage Data Saved by Handwritten Input Storage Unit>

Next, the handwritten input storage data will be described with reference to FIG. 14. FIG. 14 illustrates an example of the handwritten input storage data stored in the handwritten input storage unit 25. A line in FIG. 14 represents a stroke, a sentence (text), or an image.

In the case where Type is "stroke", one handwritten input storage data has items of DataId, Type, PenId, ColorId, Angle, StartPoint, StartTime, EndPoint, EndTime, Point, and Pressure. DataId is identification of a stroke. Type is a type of handwritten input storage data. Type includes stroke (Stroke), group (Group), test (Text), and image (Image). The type of handwritten input storage data items 801 and 802 is "Stroke". The type of handwritten input storage data 803 is "Group". The type of handwritten input storage data items 804, 805, and 806 is "Text". The type of handwritten input storage data 807 is "Image".

"Group" means to group other strokes, and the handwritten input storage data with "Group" type specifies a stroke to be grouped with DataId. PenId, ColorId, and Angle are copied from the pen ID control data described below. StartPoint is the starting coordinate of the stroke and StartTime is the starting time of the stroke. EndPoint is the end coordinate of the stroke and EndTime is the end time of the stroke. Point is a sequence of coordinates from the start to the end, and Pressure is pen pressures from the start to the end. As shown in Angle, it is indicated that the handwritten input storage data items 804 and 805 are rotated clockwise by 180 degrees and 270 degrees, respectively, before being handwriting-recognized.

Further, Handwritten input storage data items 804, 805, and 806, whose type is "Text", have Text, FontName, FontSize. FontName is a font name of the text, FontSize is a character size, and Text is a content (character code) of the text.

If there is no FontName in the pen ID control data, the handwritten input storage unit 25 copies the FontStyle of the font data 405 of the defined control data shown in FIG. 7 to the handwritten input storage data. FontSize is copied from the font data 405 of the defined control data of FIG. 7.

Handwritten input storage data 801-805 may be attached as meta-data as handwriting originated data when storing the file. Accordingly, the display apparatus 2 can obtain the handwritten input storage data 801 to 805 when the file is read. When the display apparatus 2 transmits the handwritten input storage data to an external apparatus, the display apparatus 2 may convert the handwritten input storage data to color data when the external apparatus is a color supporting apparatus, and may either convert or not convert the handwritten input storage data to color data when the external apparatus is a black-and-white supporting apparatus. When transmitting to the black and white highlighting supporting apparatus, the display apparatus 2 only needs to transmit the handwritten input storage data. As described above, the handwritten input storage data items 801-805 correspond to both black-and-white highlighting and color conversion.

Handwritten input storage data items 801-805 are handwriting originated data, whereas handwritten input storage data items 806-807 are not handwriting originated data. These are files read by the file reading command. What is described above is determined according to whether or not a color value defined by the color definition data described below is registered or not in ColorId. For example, ColorId of the handwritten input storage data 801 is "Black", while ColorId of the handwritten input storage data 806 is "#e6001200". "#e6001200" is represented by "#" and hexadecimal 8 digits. R (red), G (green), B (blue), and A (transparency) are represented in each of the two digits.

As described above, for handwriting originated text data, ColorId contains a character string that represents color information, but for non-handwriting originated text data, ColorId is "#color value." Thus, whether or not the text data being originated from handwriting is determined by paying attention to ColorId.

The handwritten input storage unit 25 stores the color of the text data of the file read by the file transmission and reception control unit 37 as ColorId="#e6001200". Therefore, the handwritten input storage data 806 does not correspond to black-and-white highlighting, but only corresponds to color conversion.

The handwritten input display control unit 23 determines whether or not the data is originated from the handwriting based on ColorId, and when the data is not originated from the handwriting, calculates and displays the gray scale value from the RGBA. If the display apparatus 2 is a color supporting apparatus, the RGBA is displayed as it is.

The handwritten input storage data 807 is also an image file read from a storage medium by a file reading command. If Type is "Image", the handwritten input storage data 807 has FileId and FileName. FileId is a control number in the handwritten input storage data, and FileName is an original file name.

In FIG. 14, whether or not the data being originated from handwriting is indicated by a value of ColorId. However, whether or not the data being originated from handwriting may be indicated by a dedicated flag or the like. Further, it is limited to handwritten data whose Type is "stroke", but whether or not the data is originated from handwriting may be determined from the shape. In this case, the learning device learns the correspondence between teacher data, which indicates handwriting originated data or non-handwriting originated data, and character shapes, such as in deep learning, and outputs whether the input character shape is handwriting originated data.

In addition, the handwriting originated data may include not only text data converted from the handwritten data based on the character recognition, but also data converted based on the user's operations, such as a stamp displayed as a fixed character or mark such as "済" (completed) or "秘" (secret), a shape such as a circle or a star, and a straight line.

Figure 32:
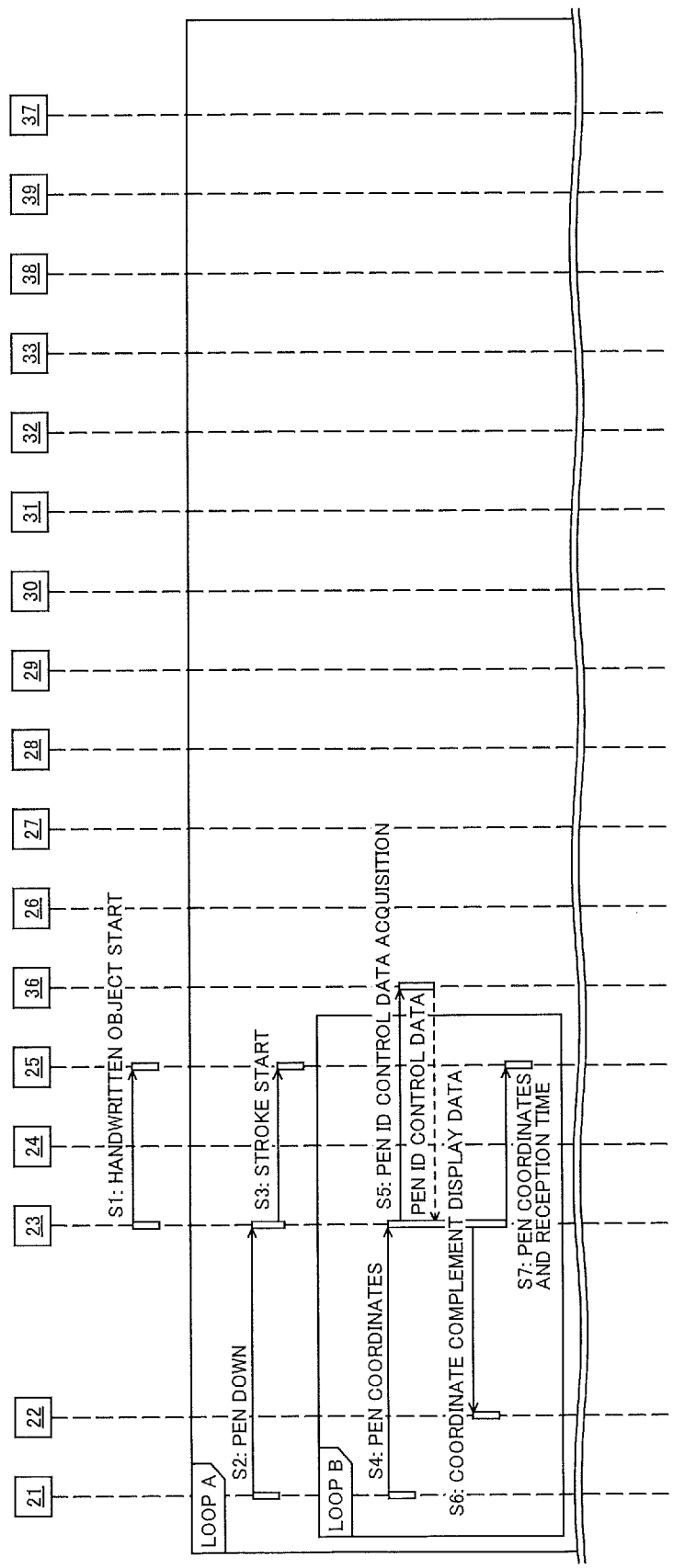
FIG. 32 is an example of a process of displaying a character string candidate and an operation command candidate by the display apparatus (Part 1).
Figure 33:
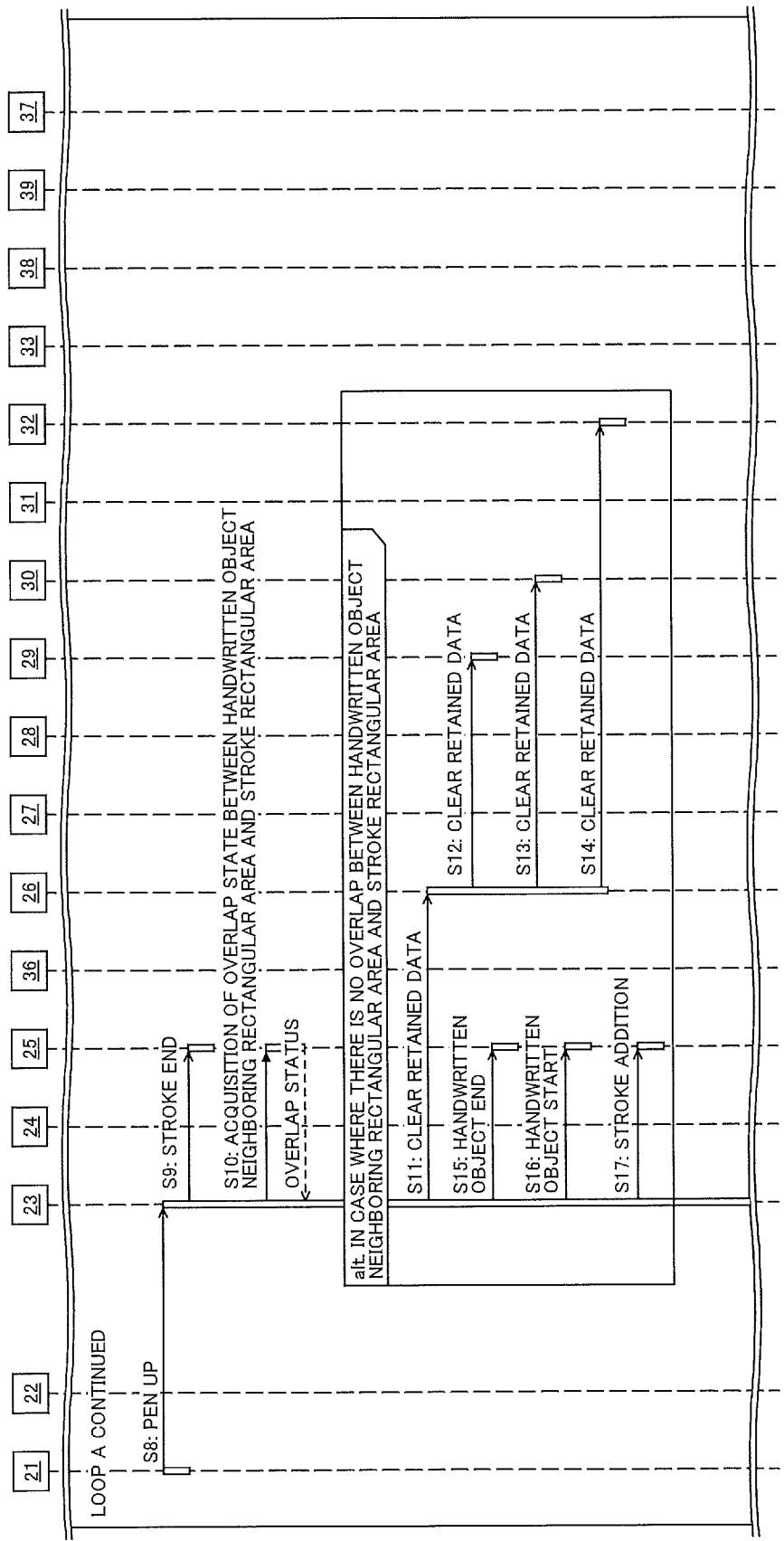
FIG. 33 is an example of a process of displaying a character string candidate and an operation command candidate by the display apparatus (Part 2).
Figure 39:
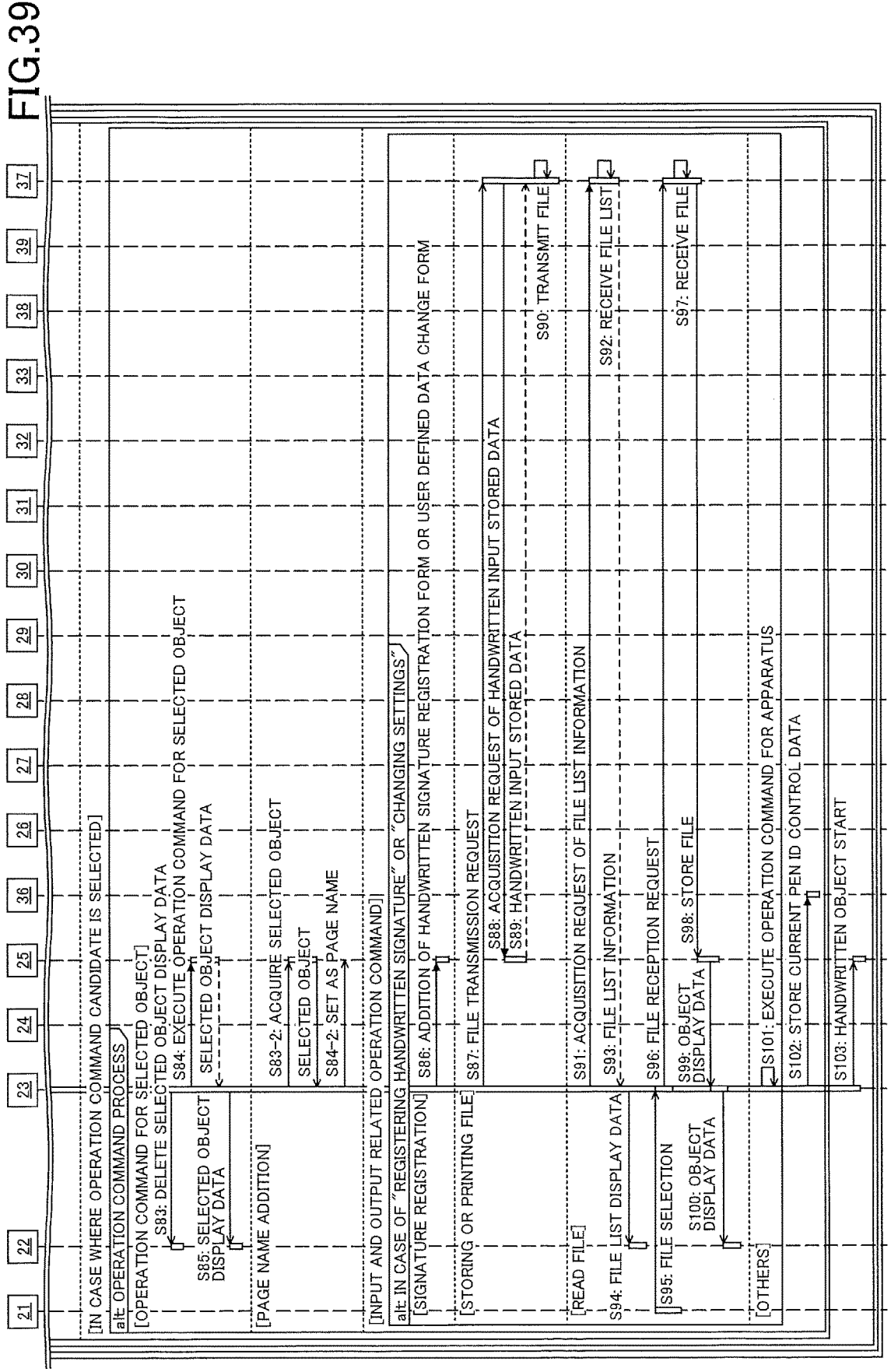
FIG. 39 is an example of a process of displaying a character string candidate and an operation command candidate by the display apparatus (Part 8).

The handwritten input storage data is used in step S7 (pen coordinates and reception time) of FIG. 32, step S88 (acquisition of handwritten input storage data) of FIG. 39, step S96 (file storage) of FIG. 39, and the like.

<Pen ID Control Data Stored in Pen ID Control Data Storage Unit>

Next, the pen ID control data will be described with reference to FIGS. 15A and 15B. FIGS. 15A and 15B are diagrams illustrating pen ID control data items 901 to 904 stored in the pen ID control data storage unit 36. The pen ID control data controls the color, etc. of handwritten input originated data. FIGS. 15A and 15B illustrate that there are four pens 2500. Four is an example. There may be one or more.

A single row of FIG. 15A indicates the pen ID control data of a single pen. Further, FIG. 15B is a diagram illustrating angle information when a user performs handwriting with respect to the display apparatus 2. Angle information corresponds to an operation position, and may be an angle of direction in which the user resides, may be an angle of direction in which the pen is used, or may be an angle related to the rotation of the character handwritten by the user. With the predetermined direction of the display apparatus 2 (e.g., vertical direction) as 0 degrees (reference), the angular information of each user is 45 degrees, 90 degrees, 135 degrees, 180 degrees, 225 degrees, 270 degrees, and 315 degrees counterclockwise.

It should be noted that the angle information is not automatically determined by an operation position of the user. Each user sets the angle information. There are two methods of setting: one is by inputting a line, which will be described later, and the other is by selecting an operation menu. The resolution of the angle information that can be specified by inputting a line (45 degrees in FIGS. 15A and 15B) is only an example, and may be smaller, such as 5 degrees to 30 degrees. It should be noted that it is understood that, if the characters are rotated at about 45 degrees, the user will be able to read them.

The pen ID control data items 901-904 may have PenId, ColorId, Angle, FontName (font specification), handwriting recognition candidate off state (Recommended MenuOff), and AccountId. Except for PenId, it is optional. AccountId is mapped to the pen used by the user for signing in. PenId is identification information stored in the pen 2500. ColorId indicates the color selected by the user using the pen 2500 (can be changed by the user). A color ID of the color definition data described later is set to ColorId. Details (thickness, etc.) of each color are defined in the color definition data.

Angle is angle information of stroke that is set to the pen 2500 (the user can change it arbitrarily). In an example of FIG. 15A, the angle information for each pen is 0 degrees, 90 degrees, 180 degrees, and 270 degrees counterclockwise. AccountId is identification information of the user. By associating the pen ID with AccountId, it is possible to identify AccountId that is associated with the pen ID of the pen 2500 used by the user, and to execute the operation command using the user defined data.

FontName is added when the user presses a pen color selection button of FIG. 18. When FontName is added, in the character string object font acquisition in step S81 of FIG. 38, FontName is acquired instead of FontStyle included in the font data 405 of the defined control data shown in FIG. 7. Character string objects are displayed with the font of FontName.

Pen ID control data 901 is pen ID control data with PenId=1, color is black (Black), angle information is 0 degrees, AccountId=1, no FontName, and no RecommendMenuOff. The user of AccountId=1 is the user of user defined data 717 of FIG. 12. It is indicated that the user has handwritten the user's name with the pen with PenId=1 to sign in, and selected black. Pen ID control data without AccountId indicates a signed out state (not associated with the user). Similarly, the pen ID control data 902 is pen ID control data with PenId=2. The color is red. The angle is 90 degrees. There is no AccountId. FontName is "ポップ体" (Pop typeface). There is no RecommendationMenuOff.

In the pen ID control data 903, a handwriting recognition candidate off state (RecommendedMenuOff) is set. The handwriting recognition candidate off state (RecommendMenuOff) is control data for controlling the operation guide 500 not to display the character string candidate 539 (only the operation command is displayed) or not to display even the operation command candidate 510. In the latter case, the operation guide 500 itself is not displayed. The handwriting recognition candidate off state (RecommendMenuOff) is set by pressing the handwriting recognition candidate ON/OFF button (see FIG. 24) which will be described later. When a user enters handwritten data that does not require character recognition, such as graphics, some users may find the operation guide 500 to be an obstacle. According to an embodiment of the present invention, the handwriting recognition candidate off state can be controlled, so that the operation guide 500 can be hidden from display, and when the display apparatus does not perform character recognition, the processing load can be reduced. Pen ID control data 903 has a Pen ID of 3. The color is blue. The angle is 180 degrees. There is no AccountId. There is no FontName.

Pen ID control data 904 has a Pen ID of 4. The color is green. The angle is 270 degrees. There is no AccountId. There is no FontName. There is no RecommendMenuOff.

When RecommendMenuOff="True" is added to the pen ID control data, the operation command is not executed by adopting a control without displaying the operation command. Therefore, a button operation as shown in FIG. 24 is required to cancel RecommendMenuOff="True".

Figure 24:
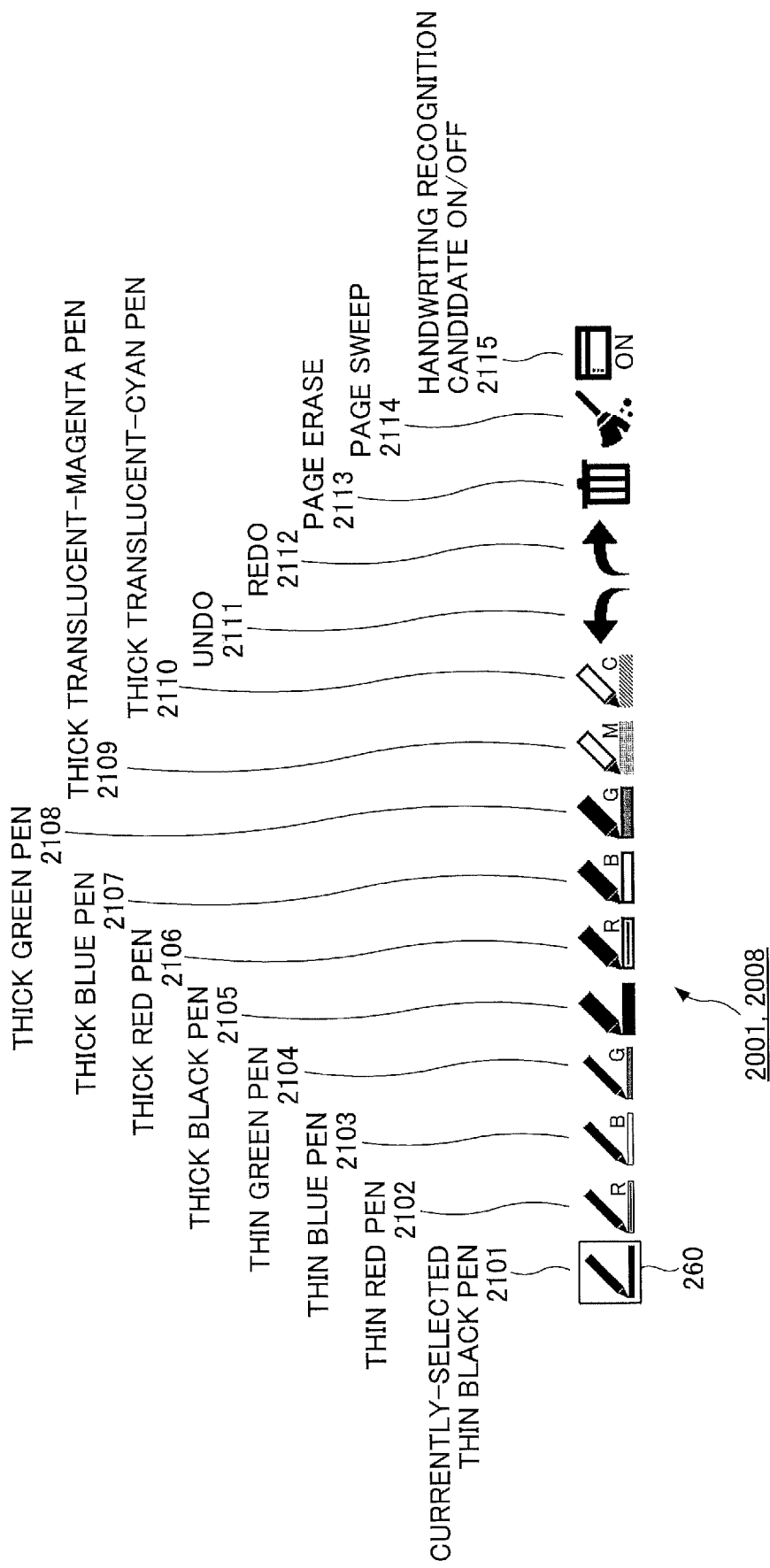
FIG. 24 is a drawing illustrating an example of a pen operation panel.

Further, the pen ID control data, of the pen 2500 with which the user presses the pen color selection button of FIG. 18 or the button of FIG. 24, is updated with the ColorId, Angle, FontName, and RecommendMenuOff defined in the pressed button.

Figure 34:
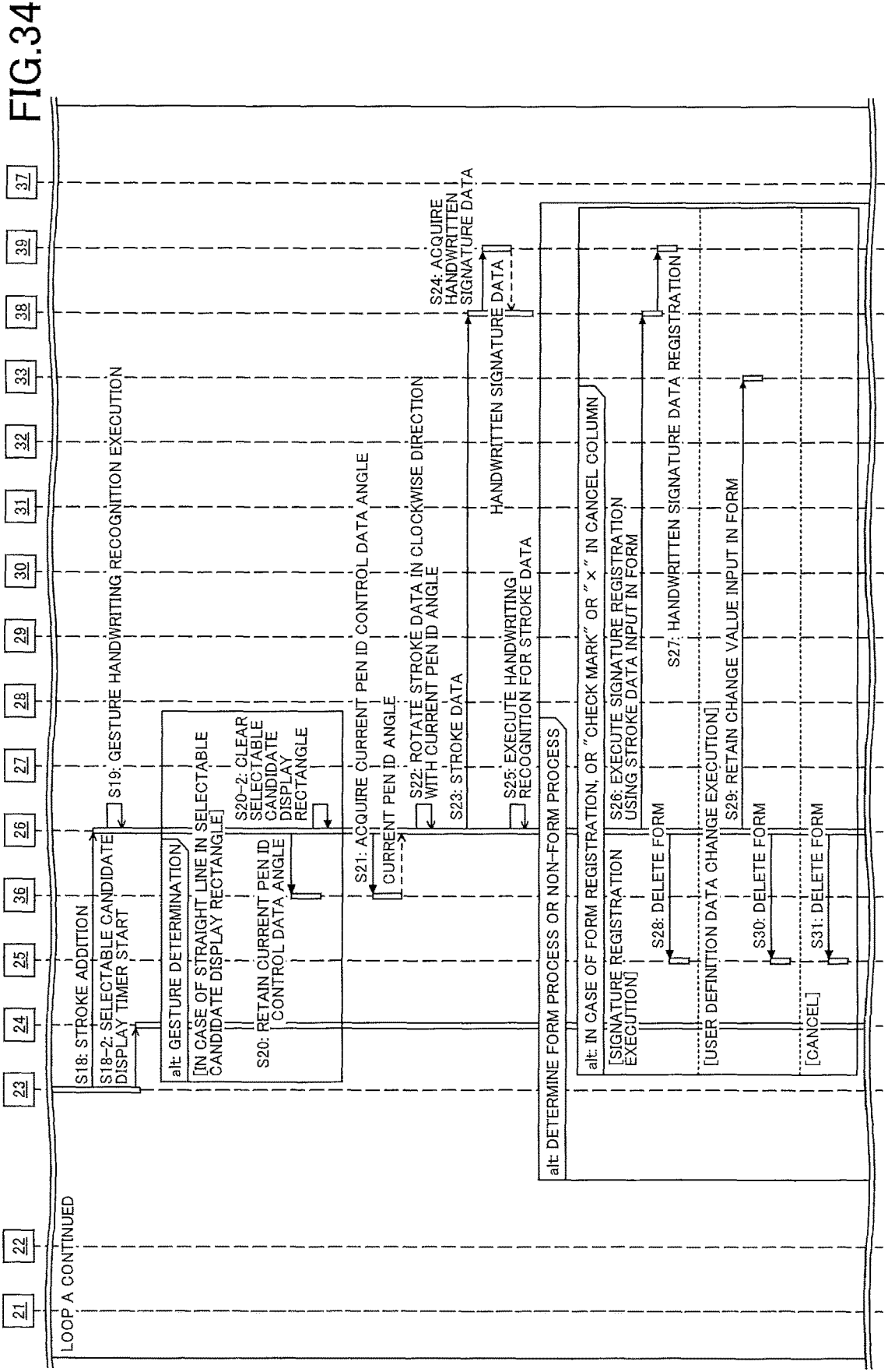
FIG. 34 is an example of a process of displaying a character string candidate and an operation command candidate by the display apparatus (Part 3).
Figure 35:
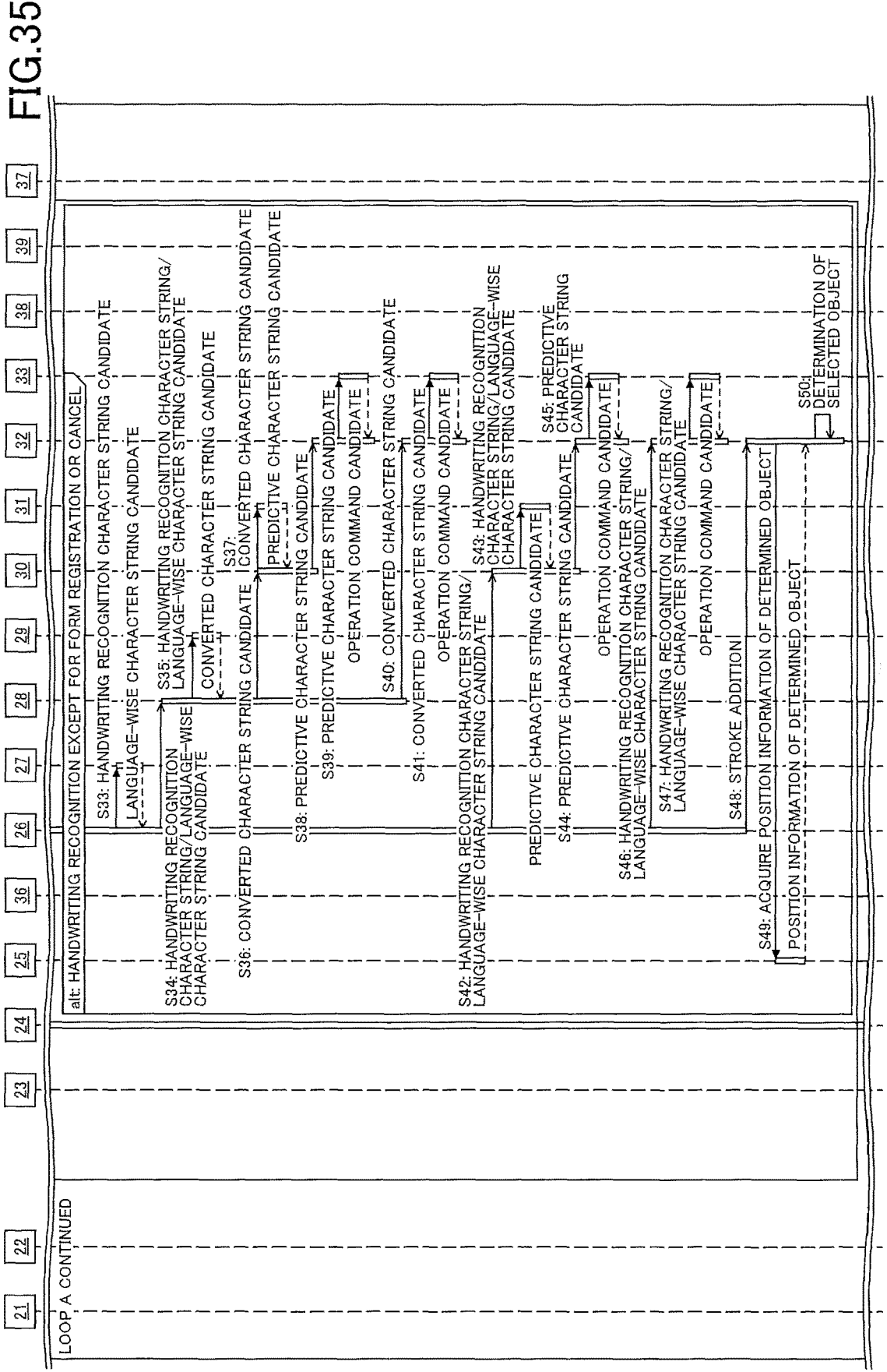
FIG. 35 is an example of a process of displaying a character string candidate and an operation command candidate by the display apparatus (Part 4).
Figure 36:
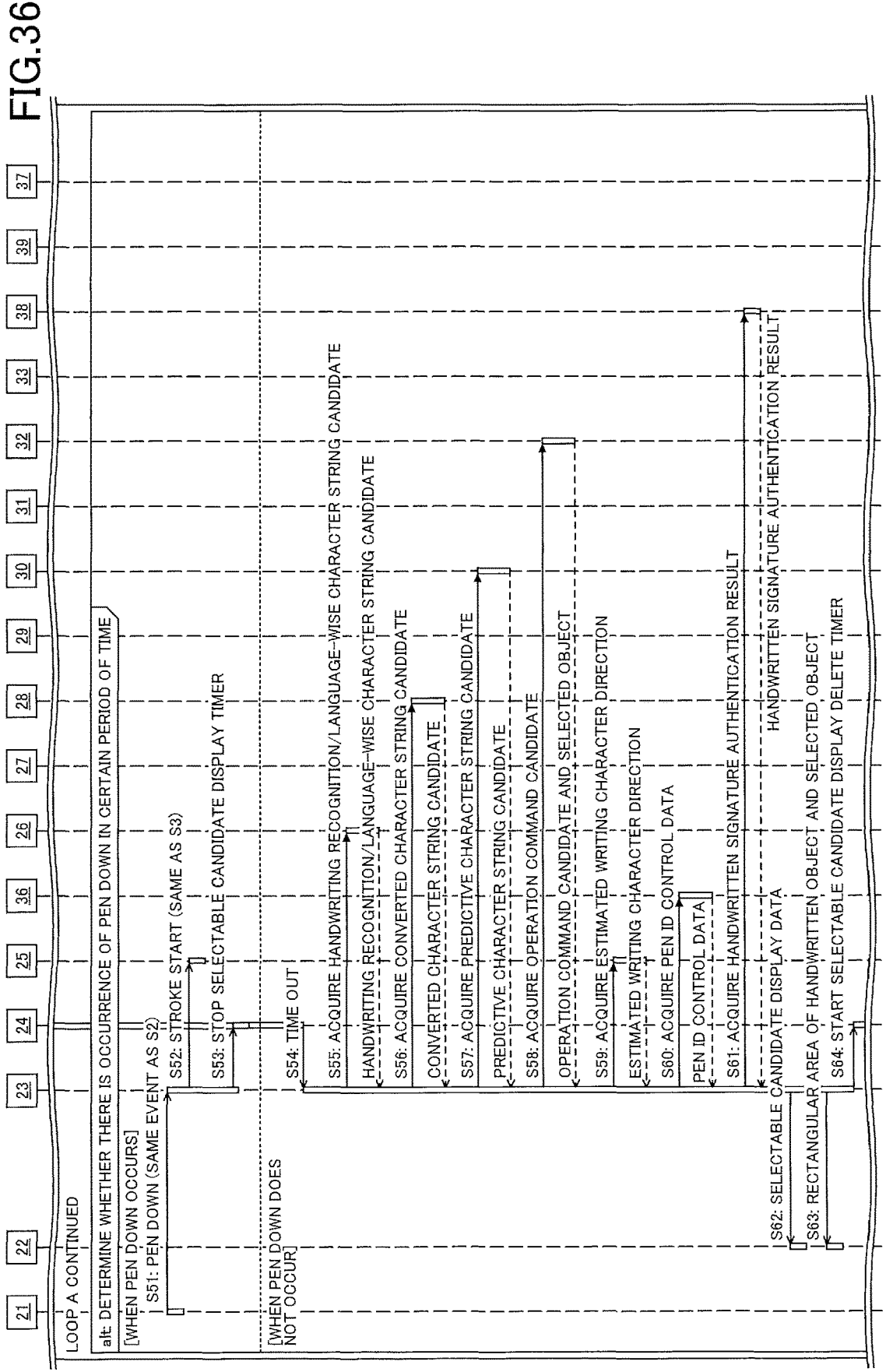
FIG. 36 is an example of a process of displaying a character string candidate and an operation command candidate by the display apparatus (Part 5).
Figure 37:
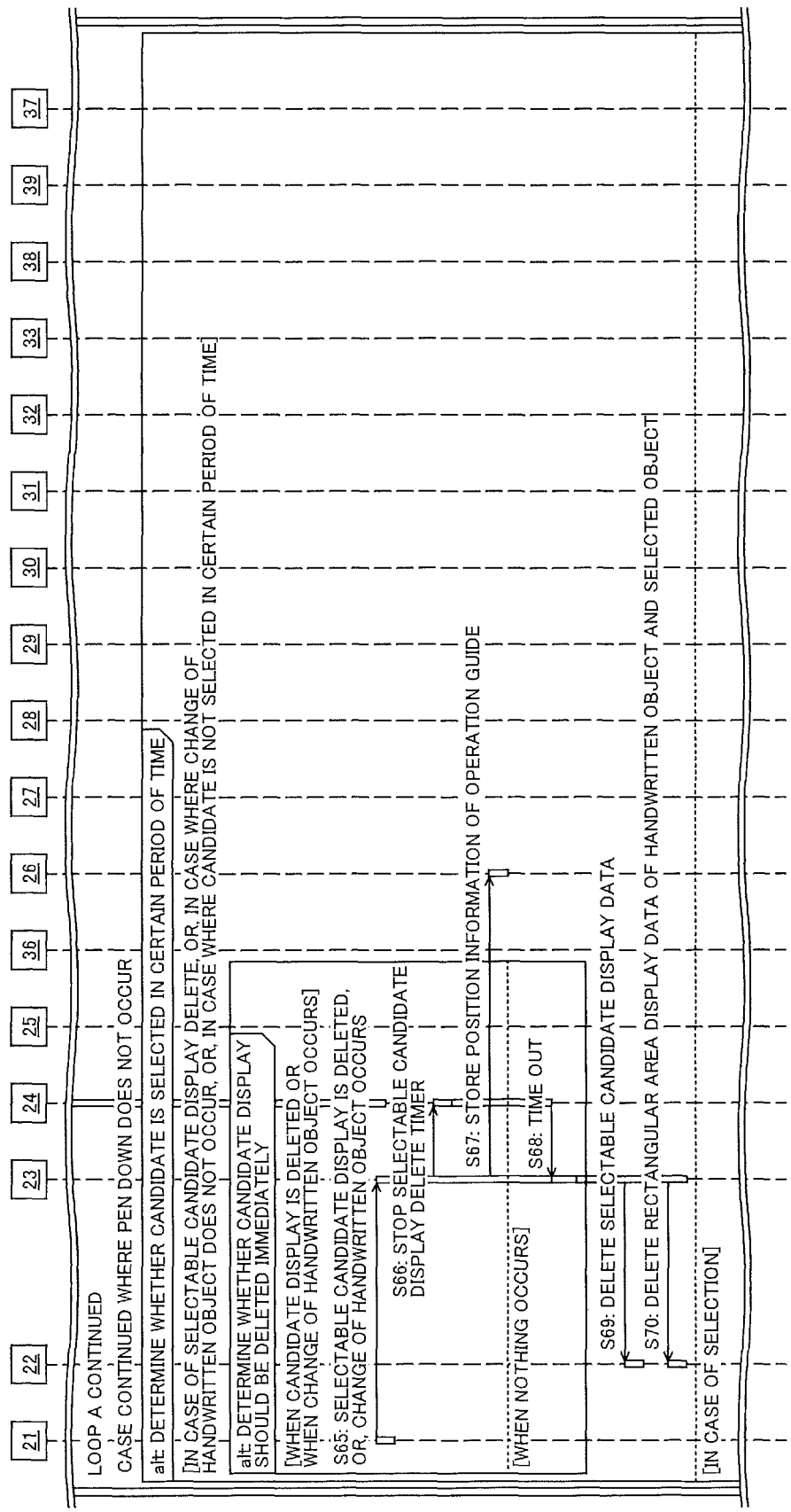
FIG. 37 is an example of a process of displaying a character string candidate and an operation command candidate by the display apparatus (Part 6).

The pen ID control data is used in step S5 (acquiring the pen ID control data) of FIG. 32, step S20 (storing the angle information of the pen ID control data) of FIG. 34, step S21 (acquiring the angle information of the pen ID control data) of FIG. 34, and step S60 (acquiring the pen ID control data) of FIG. 36.

<Color Definition Data>

FIG. 16 illustrates an example of color definition data. A single row of color definition data defines a single color. The color definition data defines the black-and-white highlighting display (the display method of the black-and-white pattern and width (pattern) and border (Edged)) on the black-and-white supporting apparatus with respect to ColorId, and the color conversion method (the display method of the color information (Color) and the width (Width) on the color supporting apparatus). Color information is represented by #and hexadecimal 8 digits. Color information represents #R (red), G (green), B (blue), and A (transparency) for every two digits, and px represents the pixel width. It should be noted that the color definition data is applied only to handwriting originated data.

Color definition data 1001 is an example of a line type or color definition where ColorId is "Black". A device that supports black-and-white highlighting, which cannot perform color displaying, indicates color according to the line type. Pattern indicates the contents of the edge of the stroke or text. Edged indicates the presence or absence of edges. Color indicates RGBA color information. Width indicates line width. The color definition data 1001 indicates that the black-and-white highlighting supporting apparatus displays the handwritten input storage data with a solid black 5 pixel width+no edge, and that the color supporting apparatus displays with the black 0% transparency+5 pixel width. Similarly, color definition data 1002 is an example of a line type or color definition where ColorId is "Red". The color definition data 1002 indicates that the black-and-white supporting apparatus displays handwritten input storage data with the solid black 3 pixel width+the black edge 1 pixel width from the outside to the black edge 1 pixel width+the white edge 2 pixel width, and that the color supporting apparatus displays with the red transparency 0%+5 pixel width of the color chart. The color definition data 1003 is an example of a line type or color definition where ColorId is "Blue", and indicates that the black-and white highlighting supporting apparatus displays with a solid white 4 pixel width+black edge 1 pixel width, and that the color supporting apparatus displays with a blue 0% transparency+5 pixel width of the color chart. Color definition data 1004 is an example of a line type or color definition where ColorId is "Green". Color definition data 1004 indicates that the black-and-white highlighting supporting apparatus displays, with black dot pattern pixel width+black edge 1 pixel width, the handwritten input storage data and that the color supporting apparatus displays with green transparency 0%+5 pixel width of the color chart. Color definition data 1005 is an example of a line type or color definition where ColorId is "Magenta". Color definition data 1005 indicates that the black-and-white highlighting supporting apparatus displays with a black upper right oblique pattern with white transparent 5 pixel width+no border, and that the color supporting apparatus displays with magenta with 60% transparency of the color chart. Color definition data 1006 is an example of a line type or color definition where ColorId is "Cyan". Color definition data 1006 indicates that the black-and-white highlighting supporting apparatus displays with the black horizontal line pattern with white transparent 5 pixel width, and that the color supporting apparatus displays with cyan transparency 60% of the color chart.

Color definition data 1007 defines a line type or color where ColorId is "ThinBlack". The color definition data 1007 indicates that the black-and-white highlighting supporting apparatus displays with a solid black 3 pixel width+no edge, and that the color supporting apparatus displays with the black 0% transparency+3 pixel width. Color definition data 1008 defines a line type or color where ColorId is "ThinRed". The color definition data 1008 indicates that the black-and-white supporting apparatus displays with the solid black 1 pixel width+the black edge 1 pixel width from the outside+the white edge 1 pixel width, and that the color supporting apparatus displays with the red transparency 0%+3 pixel width of the color chart. Color definition data 1009 defines a line type or color where ColorId is "ThinBlue". The color definition data 1009 indicates that the black-and white highlighting supporting apparatus displays with a solid white 2 pixel width+black edge 1 pixel width, and that the color supporting apparatus displays with a blue 0% transparency+3 pixel width of the color chart. Color definition data 1010 defines a line type or color where ColorId is "ThinGreen". Color definition data 1010 indicates that the black-and-white highlighting supporting apparatus displays with black dot pattern 2 pixel width+black edge 1 pixel width, and that the color supporting apparatus displays with green transparency 0%+3 pixel width of the color chart.

As described above, the color definition data includes black-and-white highlighting and color conversion enabled data. The color definition data is retained by the handwritten input storage unit 25 and is used to convert the handwritten input storage data.

After signing in, the user can preferably modify the color definition by defining the color definition data in the system definition data and in the user definition data and by adding a form of changing the color definition data to the user definition data.

<Pen Color Selection Button Definition Data>

Next, a method for selecting a pen color by a user will be described with reference to FIG. 17 and FIG. 18. FIG. 17 is an example of a pen color selection button definition data. The pen color selection button definition data is data that associates the pen button displayed on the display 220 with ColorId. The pen color selection button definition data has a Pen button ID (PenButtonId), an icon file (Icon), a color ID (ColorId), and a font name (FontName).

FIG. 18 is an example of pen color selection buttons 81-86 displayed on a display. Pen color selection buttons 81-86 are displayed using the above-described icon files. It is assumed that the pen color selection buttons 81-86 are displayed from left to right in the ascending order of the pen button ID. When the user presses the pen color selection buttons 81-86 with a pen 2500, ColorId and FontName are added to the pen ID control data, and, thereafter, the handwritten objects or character string objects entered with the pen 2500 are displayed using the ColorId and the FontName.

The pen color selection button definition data 1101 is definition data of the pen color selection button 81 displayed at the left-most. When the user presses the pen color selection button 81 with the pen 2500, ColorId of stroke data, which is handwritten with the pen 2500, is "Black and a font of a text after handwriting recognition is Mincho typeface. The pen color selection button definition data 1102 corresponds to a pen color selection button 82, which is displayed at second from the left. ColorId of the stroke data is "Red" and a font of a text after handwriting recognition is pop typeface. Similarly, pen color selection button definition data items 1103-1106 define display positions, ColorIds, and fonts of text, of the pen color selection buttons 83-86.

Figure 18A:
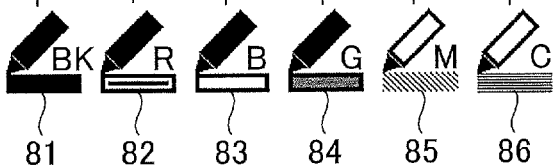
FIG. 18A is a drawing illustrating an example of a pen color selection button displayed on a display.
Figure 18B:
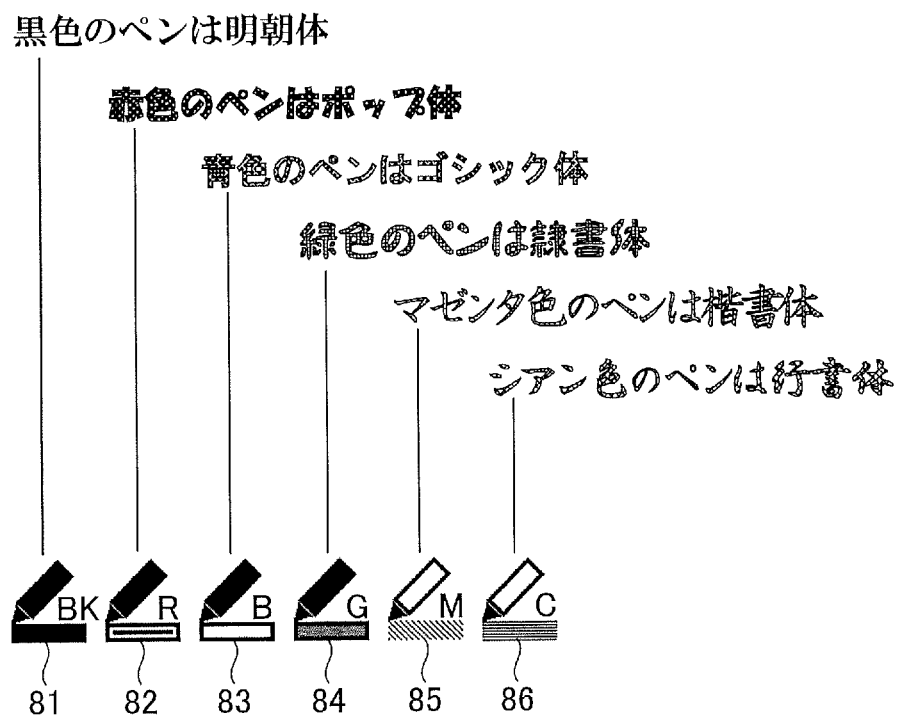
FIG. 18B is a drawing illustrating an example of a pen color selection button displayed on a display.

FIG. 18A illustrates an example of a text font display highlighted in black and white based on the pen color selection button definition data. A text font display example is a descriptive display, but may be displayed when the user hovers the pen 2500. FIG. 18B illustrates an example of a text font displayed in color by a color supporting apparatus based on the pen color selection button definition data (should be displayed in color, but is shown in black and white for the sake of drawing convenience).

As illustrated in FIG. 18A, not only by using black-and-white highlighting but also by using the change of font, the black-and-white highlighting display can be more effective.

After the handwritten signature authentication, the user can preferably modify the pen color selection button by defining the pen color selection button definition data in the system definition data and in the user definition data and by adding a form of changing the pen color selection button definition data to the user definition data. Therefore, the correspondence between ColorId and fonts is only an example.

Figure 38:
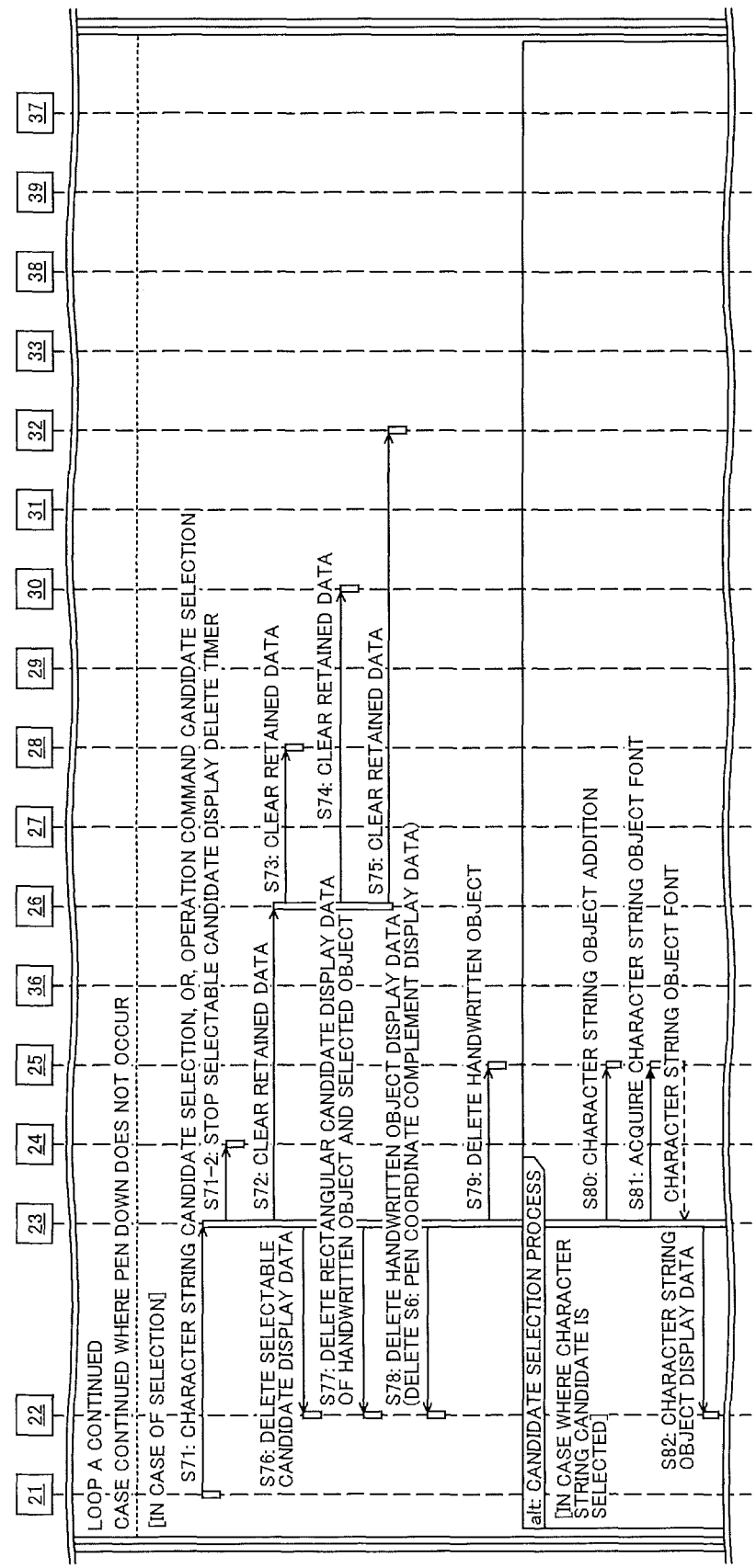
FIG. 38 is an example of a process of displaying a character string candidate and an operation command candidate by the display apparatus (Part 7).

The pen color selection button is used in step S6 (coordinate complement display data) of FIG. 32, step S82 (character string object display data) of FIG. 38, and step S100 (object display data) of FIG. 39.

<Display Example of Selectable Candidates>

Figure 19:
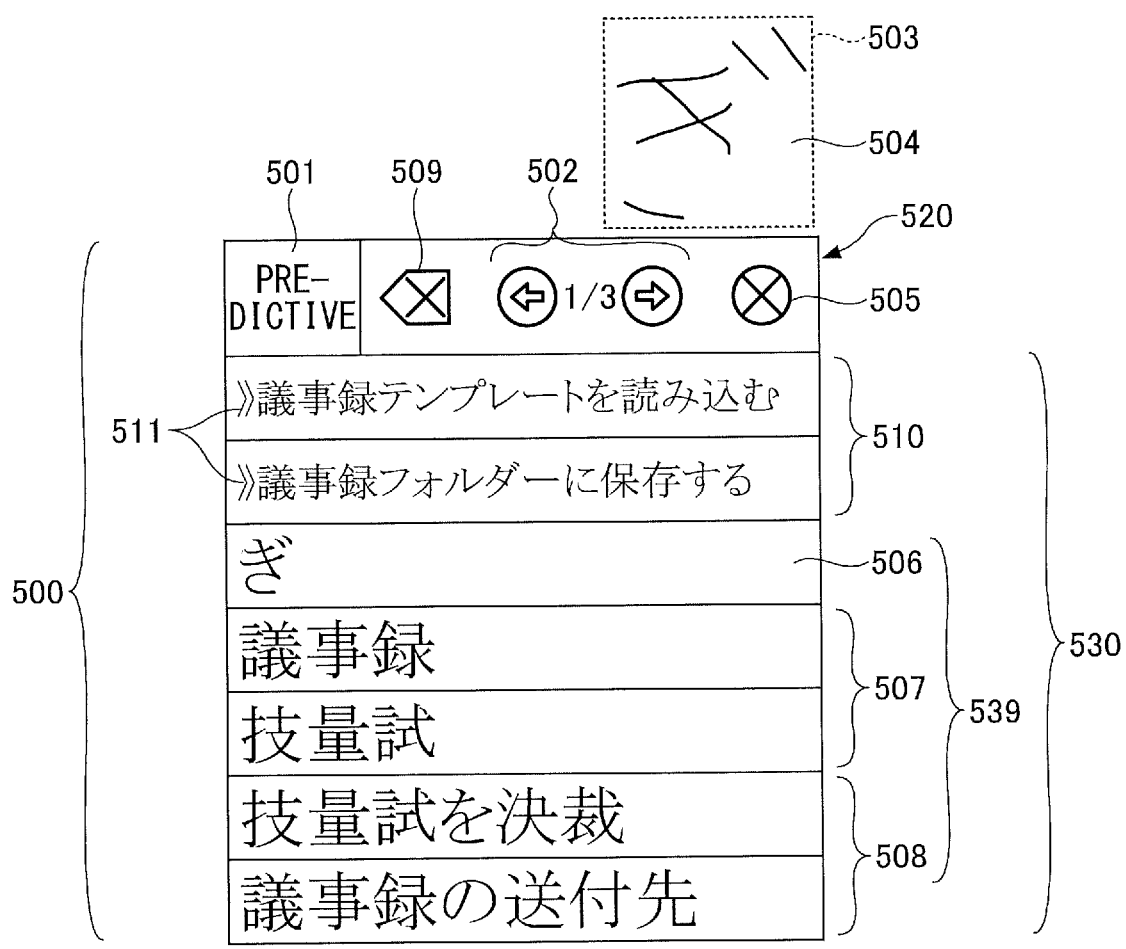
FIG. 19 is a drawing illustrating examples of an operation guide and selectable candidates displayed by the operation guide.

FIG. 19 is an example of an operation guide and a selectable candidate 530 displayed by the operation guide.

The user handwrites the handwritten object 504 (due to the timeout of the selectable candidate display timer) so that the operation guide 500 is displayed. The operation guide 500 includes an operation header 520, an operation command candidate 510, a handwriting recognition character string candidate 506, a converted character string candidate 507, a character string/predictive conversion candidate 508, and a handwritten object rectangular area display 503. The selectable candidate 530 includes the operation command candidate 510, the handwriting recognition character string candidate 506, the character string/predictive conversion candidate 508. In this example, no language-wise converted character string is displayed. However, there is a case in which a language-wise converted character string is displayed. The selectable candidate 530, excluding the operation command candidate 510, is called the character string candidate 539.

The operation header 520 has buttons 501, 509, 502, and 505. The button 501 receives a switching operation between the predictive conversion and "kana conversion". In an example of FIG. 19, when a user presses a button 509 indicating "prediction," the handwritten input unit 21 receives the button and notifies the handwritten input display control unit 23 thereof, and the display unit 22 changes the display to the button 509 indicating "Kana." After recognition of the handwritten object 504, character string candidates 539 are arranged in a probability descending order of "kana conversion".

The button 502 operates the candidate display page. In an example of FIG. 19, the candidate display page has three pages, and currently, the first page is displayed. The button 505 receives "erase" of the operation guide 500. When the user presses the button 505, the handwritten input unit 21 receives the button and notifies the handwritten input display control unit 23 thereof, and the display unit 22 erases the display other than the handwritten object. The button 509 receives a collective display deletion. When the user presses the button 509, the handwritten input unit 21 receives the button. The handwritten input unit 21 notifies the handwritten input display control unit 23 thereof. The display unit 22 deletes all the displays illustrated in FIG. 19, including the handwritten object, allowing the user to rewrite handwriting from the beginning.

The handwritten object 504 is a letter "ぎ" that is handwritten by the user. A handwritten object rectangular area display 503 surrounding the handwritten object 504 is displayed. The displaying procedure will be described with reference to sequence diagrams of FIG. 32 to FIG. 39. In an example of FIG. 19, the handwritten object rectangular area display 503 is displayed in a dotted frame.

In each of the handwriting recognition character string candidate 506, the converted character string candidate 507, and the character string/predictive conversion candidate 508, character string candidates are arranged in probability descending order. The "ぎ" of the handwriting recognition character string candidate 506 is a candidate of the recognition result. In this example, the display apparatus 2 correctly recognizes "ぎ" ("gi").

The converted character string candidate 507 is a converted character string candidate(s) converted from a language-wise character string candidate. In this example, "技量試" is an abbreviation of "技術量産試作" (technical mass production trial). The character string/predictive conversion candidate 508 is a language-wise character string candidate or a predictive character string candidate converted from a converted character string candidate. In this example, "技量試を決裁" (decision on technical mass production trial) and "議事録の送付先" (transmission destination of meeting minutes) are displayed.

Operation command candidates 510 are operation command candidates selected based on the operation command definition data 701-703, 709-716 of FIG. 11A. In an example of FIG. 19, the initial letter of line "》" 511 indicates an operation command candidate. In FIG. 19, with respect to the "ぎ", which is the handwritten object 504, because there is no selected object, and the "議事録", which is a character string candidate of the "ぎ", is partially matched with the operation command definition data items 701 and 702 illustrated in FIG. 11A, they are displayed as operation command candidates 510.

When the user selects "議事録テンプレートを読み込む" (Read the minutes template), the operation command defined by the operation command definition data 701 is executed, and when the user selects "議事録フォルダーに保存する" (Save in the minutes folder), the operation command defined by the operation command definition data 702 is executed. As described above, the operation command candidates are displayed when the operation command definition data items including the converted character string are found. Therefore, they are not always displayed.

As illustrated in FIG. 19, the character string candidates and the operation command candidates are displayed at the same time (together), so that the user can select either the character string candidate or the operation command the user wishes to enter.

<Example of Specifying Selected Object>

In the display apparatus according to an embodiment of the present invention, it is possible for a user to specify an selected object by selecting it by handwriting. The selected object is the object of editing or modification, or the page name.

<Display Example of Operation Command Candidate>

FIGS. 20A and 20B are drawings illustrating an example of displaying operation command candidates based on the operation command definition data when there is a handwritten object. FIG. 20A is an operation command candidate related to editing, and FIG. 20B is an operation command candidate related to modification. Further, FIG. 20A illustrates an example in which a selected object is specified using a handwritten object 11a.

As illustrated in FIG. 20A and FIG. 20B, a main menu 550 includes operation command candidates that are displayed following the initial letter of line "》" 511. The main menu 550 displays the last executed operation command name or the first operation command name in the operation command definition data. The first line's initial character "》" 511a indicates an operation command candidate related to editing, and the second line's initial character "》" 511b indicates an operation command candidate related to modification. The third line's initial letter "》" 511 indicates an operation command candidate of "ページ名に設定" (set as a page name).

"〉" 512 at the end of the line indicates that there is a sub-menu (an example of a sub-menu button). In line 1, "〉" 512a causes a sub-menu (last selected) to be displayed as an operation command candidate related to editing. In line 2, "〉" 512b causes a remaining sub-menu to be displayed as operation command candidates related to modification. When the user presses "〉" 512, a sub-menu 560 appears to the right. The sub-menu 560 displays all the operation commands defined in the operation command definition data. In a display example of FIG. 20A, the sub-menu 560 corresponding to the first line ">" 512a is displayed when the main menu is displayed. The display apparatus 2 may display the sub-menu by pressing ">" 512a in the first line.

With respect to the operation command for page name setting in the third line, operation command candidates are not grouped, and thus, ">" is not displayed at the end of the line.

When the user presses any of the operation command names with a pen, the handwritten input display control unit 23 executes the Command of the operation command definition data associated with the operation command name for the selected object. In other words, "Delete" is executed when "消去" 521 is selected, "Move" is executed when "移動" 522 is selected, "Rotate" is executed when "回転" 523 is selected, and "Select" is executed when "選択" 524 is selected.

For example, if the user presses "消去" ("erase") 521 with a pen, the "議事録" ("minutes") can be erased. If the user presses "移動" 522, "回転" 523, and "選択" 524, a bounding box (circumscribed rectangle of the selected object) is displayed. When "移動" (move) 522 or "回転" (rotate) 523 is pressed, the user can move or rotate the "議事録" (minutes) with a drag operation of a pen. When "選択" (select) 524 is pressed, the user can perform other bounding box operations.

In FIGS. 20A and 20B, "○" 551, "∞" 552, "0" 553, and "00" 554, which are character string candidates other than the operation command candidates, are the recognition results of the enclosing line (handwritten object 11b). If the user intends to enter a character string instead of an operation command, a character string candidate can be selected.

In FIG. 20B, the sub-menu of FIG. 20B is displayed by pressing the second line ">" 512b. In a display example of FIG. 20B, the main menu 550 and the sub-menu 560 are displayed as in FIG. 20A. When "太く" (thick) 531 is selected, the handwritten input display control unit 23 executes "Thick" on the selected object. When "細く" (thin) 532 is selected, the handwritten input display control unit 23 executes "Thin" on the selected object. When "大きく" (large) 533 is selected, the handwritten input display control unit 23 executes "Large" on the selected object. When "小さく" (small) 534 is selected, the handwritten input display control unit 23 executes "Small" on the selected object. When "下線" (underline) 535 is selected, the handwritten input display control unit 23 executes "Underline" on the selected object.

<Example of Input of Angle Information>

Figure 21A:
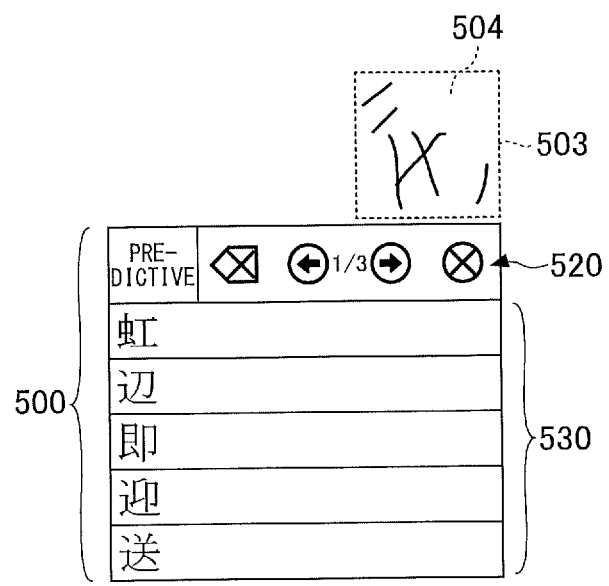
FIG. 21A is a drawing illustrating a method for inputting 90 degree angle information.
Figure 21B:
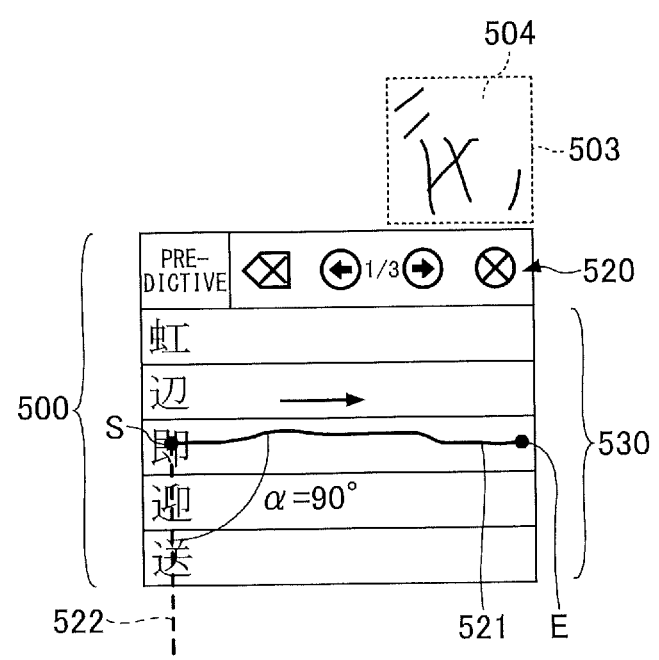
FIG. 21B is a drawing illustrating a method for inputting 90 degree angle information.
Figure 21C:
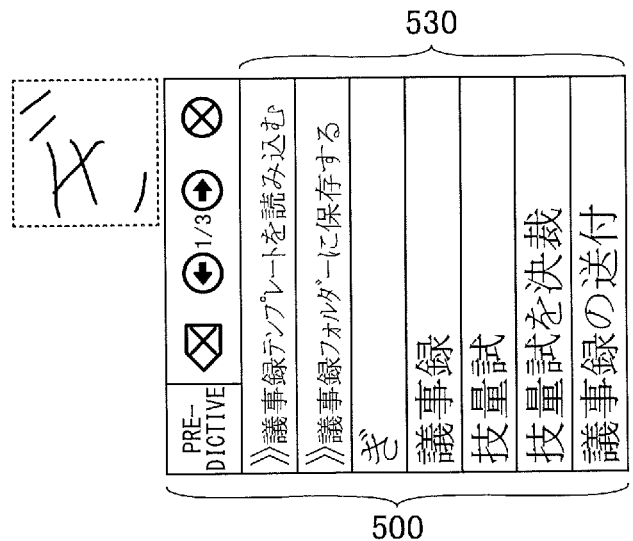
FIG. 21C is a drawing illustrating a method for inputting 90 degree angle information.

Next, a method for entering angle information will be described with reference to FIGS. 21A to 21C. FIGS. 21A to 21C are examples of a drawing illustrating an input method of angle information. FIGS. 21A to 21C illustrate a case in which the user present in the 3 o'clock direction of the display apparatus 2 inputs the angle information. Because characters handwritten from the 3 o'clock direction are correctly recognized when they are rotated 90 degrees clockwise, it is preferable that 90 degrees angle information is entered.

FIG. 21A shows a state in which the operation guide 500 is displayed because a user present in the three o'clock direction of the display apparatus 2 handwrites "ぎ" in a state in which the angle information of the pen ID control data is 0 degrees (initial value). Because the display apparatus 2 recognizes a character "ぎ" that is handwritten from the 3 o'clock direction using angle information remaining at 0 degrees, a selectable candidate 530 that is different from the expectation is displayed.

When entering the angle information, the user handwrites a straight line from top to bottom as seen by the user in the operation guide 500. FIG. 21B illustrates an example of such a straight line 521. A counterclockwise angle α of the straight line 521, which is formed with reference to the 6 o'clock direction corresponding to the angle information of 0 degrees, is the angle information. In other words, a counterclockwise angle α, which is formed between the line 522 that is drawn from a starting point S downwards in the 6 o'clock direction, and the straight line 521 entered by the user, is the angle information. In a simple expression, the direction of the end point of the line 521 is the angular information. Therefore, the angle information entered by the user in FIG. 21B is 90 degrees.

It should be noted that, with respect to a method for detecting a straight line, for example, the coordinates from the starting point S to the end point E are converted into a straight line by the least squares method, and obtained correlation coefficient is compared with a threshold value to determine whether or not the straight line is used.

Immediately after the user starts writing the straight line 521 (immediately after the pen 2500 touches the starting point S of the straight line 521), the display apparatus 2 erases the operation guide 500. Immediately after the writing of the straight line 521 is completed (immediately after the pen 2500 is separated from the end point E of the straight line 521), the display apparatus 2 searches for the closest value of the above-described angle α from 45 degrees, 90 degrees, 135 degrees, 180 degrees, 215 degrees, 270 degrees, 315 degrees, and 360 degrees, and determines the value as the angle information. The angle α itself may be the angle information. The determined angle information is set to "Angle of the pen ID control data. The pen event transmission unit 41 of the pen 2500 transmits the pen ID to the display apparatus 2 when the tip of the pen is pressed for handwriting or the like. Therefore, the display apparatus 2 can associate the angle information with the pen ID control data.

It should be noted that it is only the operation guide 500 that is capable of allowing the user to handwrite a straight line to enter the angle information. Accordingly, when the user handwrites the straight line outside the operation guide 500, the straight line is recognized as "1" or "-" or the like, and when the user handwrites the straight line inside the operation guide 500, the angle information can be entered. In other words, the handwriting recognition control unit 26 detects a straight line from a predetermined range and converts stroke data, which is handwritten outside the predetermined range, into text data.

FIG. 21C illustrates the operation guide 500 immediately after the operation of FIG. 21B. Because 90 degrees are set as the angle information (Angle) in the pen ID control data, the handwritten object (stroke data) is internally rotated in a clockwise direction by 90 degrees, handwriting recognition is performed for the rotated handwritten object, and the operation guide 500 is rotated in a counterclockwise direction by 90 degrees to be displayed. It should be noted that the angle information may be entered manually by the user from a menu.

<Example of Sign-in by Handwriting>

Figure 22:
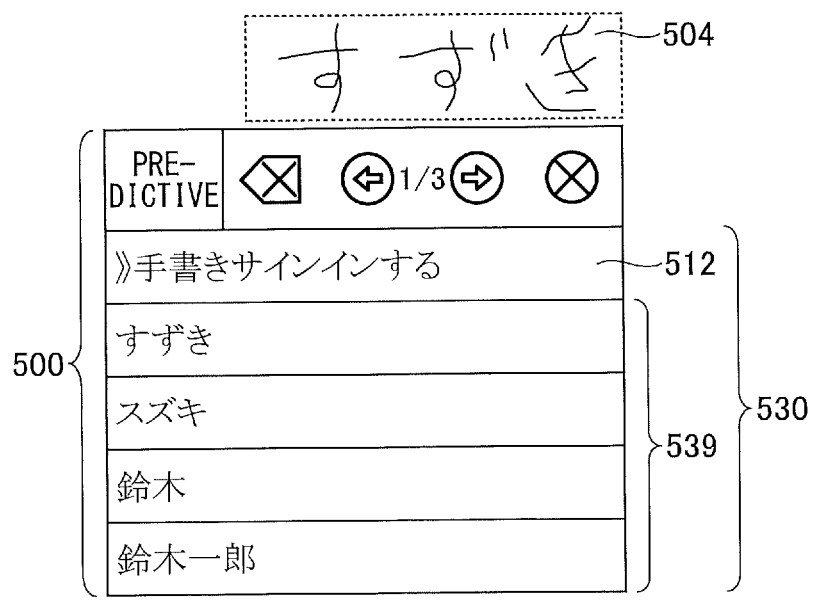
FIG. 22 is a drawing illustrating an example of an operation guide displayed when a user handwrites "suzuki" in Japanese which is handwritten signature data registered by the user.

Next, a method for a user to sign in after the handwritten signature data is registered will be described with reference to FIG. 22. FIG. 22 is a drawing illustrating an example of an operation guide 500 displayed when a user handwrites "すずき" (suzuki) which is the handwritten signature data registered by the user. Because "すずき" (suzuki) is registered in the operation command definition unit 33 as handwritten signature data, the "すずき (suzuki)" matches the handwritten signature data. Accordingly, an operation command 512 of "手書きサインインする" (sign-in with handwriting) is displayed.

In addition, because the handwritten signature data is matched, SignatureId representing "すずき" (suzuki) is identified, and the user defined data with AccountId associated with the SignatureId is identified.

If the user selects the operation command 512, "手書きサインインする" (sign-in with handwriting), the AccountId of "すずき (suzuki)" is associated with the pen ID of the pen 2500 used by the user, and is added to the pen ID control data so that the user defined data of "すずき (suzuki)" can be used when the operation command is used.

<Display Example of Operation Menu>

Figure 23A:
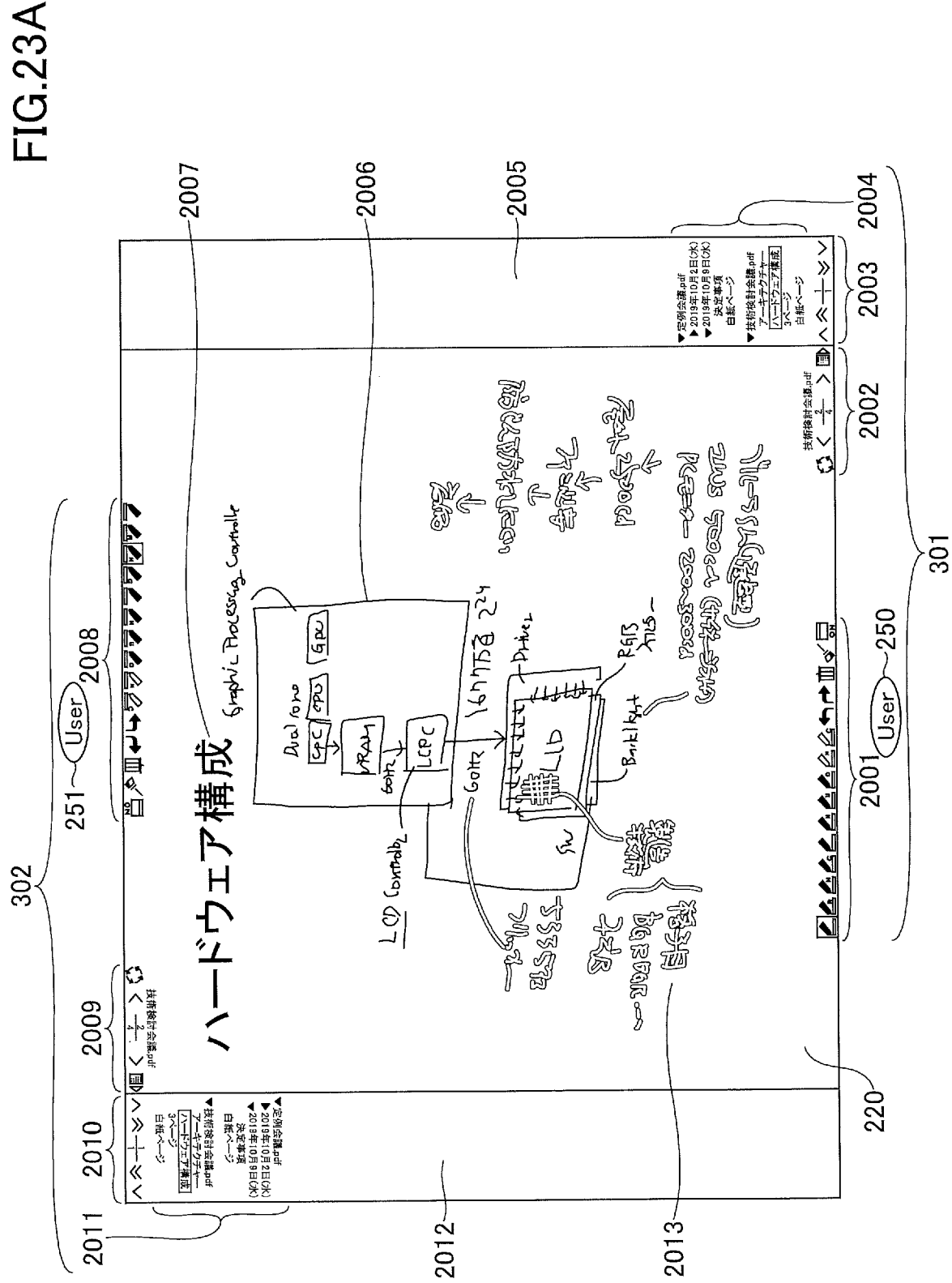
FIG. 23A is an example of a top view of a display apparatus positioned (placed) flat.

Next, an operation menu having information related to data processing according to a display position will be described with reference to FIG. 23A. FIG. 23A is a top view of a display apparatus 2 positioned (placed) flat. In FIG. 23A, there are users 250 and 251 on the upper side and the lower side of the drawing, respectively. The two users can operate operation menus 301 and 302 simultaneously from the lower side and from the upper side. It is noted, however, that there is no problem if there is only one user. The display apparatus 2 displays the operation menus according to the operation button definition data items. The number of operation menus is the same as the number of expected users.

Each of the operation menus 301 and 302 has information related to data processing according to the display position of the operation menu. In an embodiment of the present invention, the operation menus 301 and 302 have rotation angles corresponding to display positions of the operation menus. The designs of the operation menus 301 and 302 (appearance of icons) are the same, but the information related to the data processing corresponds to the display position of the operation menu.

Operation menus 301 and 302 include pen operation panels 2001 and 2008, respectively, with which the users perform pen type selection or pen operation. Operation menus 301 and 302 include page operation panels 2002 and 2009, respectively, with which the users perform page operation. Operation menus 301 and 302 have page navigation operation panels 2003 and 2010, respectively, with which the users operate a list display of file names or pages. Operation menus 301 and 302 include page navigations 2004 and 2011, respectively, for switching pages from the list display of file names or page names. For ease of use by the user, the operation menu 301 for the lower side user is positioned near the screen bottom (positioned along the lower edge of the display 220) and the operation menu 302 for the upper side user is positioned near the screen top (positioned along the upper edge of the display 220).

The operation menu 301 for the upper side user includes a pen operation panel 2001, a page operation panel 2002, a page navigation operation panel 2003 and a page navigation 2004. The page navigation 2004 extends, in a page navigation window area 2005, from top to bottom. The page navigation window area 2005 is sometimes simply referred to as a page navigation window.

Similarly, the operation menu 302 for the upper side user includes a pen operation panel 2008, a page operation panel 2009, a page navigation operation panel 2010, and a page navigation 2011. The page navigation 2011 extends, in a page navigation window area 2012, from top to bottom with respect to the view of the upper side user.

A handwritten object or a character string object is displayed near the center of the display 220. A handwritten object 2006 is written with a black pen (solid black) by the lower side user. A character string object 2007 is a recognized character string written with a black pen by the lower side user. A handwritten object 2013 is handwritten data written by the upper side user with a blue pen (solid white+black edge).

The pen operation panels 2001 and 2008, page operation panels 2002 and 2009, page navigation operation panels 2003 and 2010, and page navigations 2004 and 2011 are included in the operation menu 302, which has two applications for the lower user and the upper user. Icons (buttons), file names, and page names for the upper side user are displayed in a 180 degree rotated state. This rotation angle is set in advance to the operation button definition data (to be described later).

When the user presses any of the button areas of the operation menus 301 and 302, a file name or a page name of the page navigations 2004 and 2011 with a pen 2500, the display apparatus 2 stores the rotation angle, which is set in the operation button definition data, in the pen ID control data of the pen 2500. This rotation angle is information related to data processing.

<<English Expression of FIG. 23A>>

The display apparatus 2 supports languages other than Japanese. Here, as an example, FIG. 23A in a case where the display apparatus 2 is used in the English language environment will be described. It should be noted that the configuration of the display apparatus 2 is the same as that used in the Japanese language environment except that the conversion dictionary or various definition data corresponds to the English language.

Figure 23B:
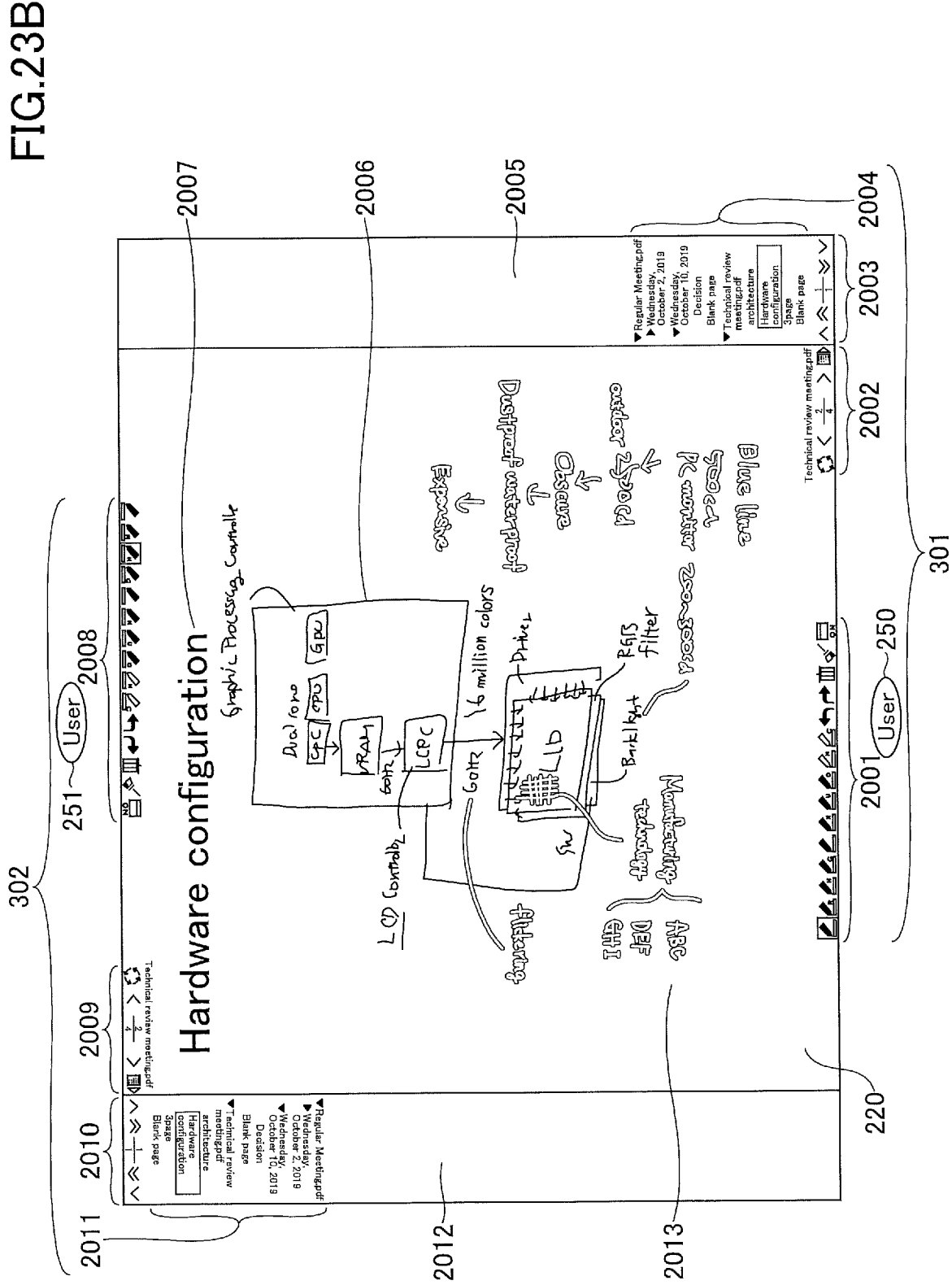
FIG. 23B is a top view of a display apparatus in a case where the display apparatus converts handwritten data into English.

FIG. 23B is a top view of a display apparatus 2 in a case where the display apparatus 2 converts handwritten data into English. Even when handwritten data is converted into English, the display apparatus 2 displays the operation menus 301 and 302. In FIG. 23B, there are users 250 and 251 on the upper side and the lower side of the drawing, respectively. The two users can operate operation menus 301 and 302 simultaneously from the lower side and from the upper side. The display apparatus 2 displays the operation menus according to the operation button definition data items. The number of operation menus is the same as the number of expected users.

Further, in the operation menus 301 and 302, the pen operation panels 2001 and 2008, the page operation panels 2002 and 2009, the page navigation operation panels 2003 and 2010, and the page navigations 2004 and 2011 are written in English.

The contents handwritten on display 3 depends on what the user handwrites, but in FIG. 23B it is handwritten in English. A handwritten object or a string object in English is displayed near the center of the display 220. A handwritten object 2006 is written with a black pen (solid black) by the lower side user. A character string object 2007 is a recognized character string written with a black pen by the lower side user. A handwritten object 2013 is handwritten data written by the upper side user with a blue pen (solid white+black edge).

Although the present embodiment has been described using English language as an example, the same can be applied to languages other than English (Chinese, Hindi, Spanish, Arabic, Portuguese, Russian, etc.).

<<Pen Operation Panel>>

FIG. 24 is an enlarged view of the pen operation panels 2001 and 2008. The pen operation panels 2001 and 2008 have buttons for the user to select colors, etc. Buttons 2101-2108 represent non-translucent black, red, blue, and green thin pens or thick pens, and buttons 2109 and 2110 represent translucent magenta and cyan thick pens.

Buttons 2111 and 2112 indicate undo/redo. Button 2113 represents page erasure, and button 2114 represents a page sweep (a button that cleans and redisplays a degraded screen in a high-speed drawing Mode). Button 2115 receives display ON/OFF of the character string candidate 539 (a button for receiving the setting of the handwriting recognition candidate off state (RecommendMenuOff) of the pen ID control data).

As shown in the operation button definition data of FIGS. 27 to 30, each button defines a button identifier (ButtonId), a button display position (Position), an icon image (Icon) of the button, a rotation angle (Angle) of the button, and a command (Command) to be executed by the display apparatus 2 when the button is pressed. When the user presses one of buttons 2101-2115 with the pen 2500, the display apparatus 2 saves the rotation angle defined in the button in the pen ID control data of the pen 2500 and executes the command defined in the button. It is noted that buttons 2101 to 2115 are assumed to correspond to ButtonId=1 to 15 of the operation button definition data in the order starting from the left.

The commands of the operation button definition data 2401 to 2410, corresponding to buttons 2101 to 2110, specify ColorId of the color definition data in the same ChangePen command as the operation command definition data 709 to 711 and 720 to 726 of FIGS. 11A and 11B. The display unit 22 displays a frame 260 surrounding the last selected button to indicate that the button is the last selected button. In FIG. 24, a black thin pen of button 2101 is selected.

Operation button definition data 2411 and 2412 corresponding to buttons 2111 and 2112 define Undo/Redo commands. The buttons 2111 and 2112 (undo/redo) each receive the execution of Undo/Redo commands. Undo is a command to return to the previous operation state, and Redo is a command to advance the operation state that is undone.

Operation button definition data 2413 corresponding to a button 2113 defines an ErasePage command. The button 2113 (page erase) receives the execution of the ErasePage command. ErasePage deletes all data that is currently entered on the page and redisplays the page.

Operation button definition data 2414 corresponding to a button 2114 defines a command of SweepPage. The button 2114 (Sweep Button) receives an execution of SweepPage command. In display devices such as electronic paper, there is residual fade in the high-speed drawing mode. Display devices clean it up by redisplay.

Operation button definition data 2415 corresponding to a button 2115 defines a command of ToggleRecommendMenu. The button 2115 (handwriting recognition candidate ON/OFF) receives an execution of the ToggleRecommendMenu command. ToggleRecommendMenu turns on and off the display of the character string candidate 539 obtained by handwriting recognition. As a result, the RecommendMenuOff="True" is added to the pen ID control data of the pen 2500 used for pressing when the state becomes OFF. When the display of the character string candidate 539 is ON, all of the character string candidates 539 are displayed, but when it is OFF, only the operation commands are displayed. Without the operation command, the entire selectable candidates will not be displayed, allowing users to focus on handwriting. When the display apparatus 2 executes the ToggleRecommendMenu, the icon is switched according to the current on-off state to return it.

It is noted that the buttons 2101 to 2110 define buttons different from the pen color selection buttons 81 to 86 of FIG. 18. Because the ColorId can be duplicatedly set by the pen color selection buttons 81 to 86, in this case, the pressing result of the buttons 2101 to 2110 is set to the pen ID control data with higher priority.

<<Page Control Panel>>

FIG. 25 shows an example of page operation panels 2002 and 2009. The page operation panels 2002 and 2009 are operation menus related to page operations. A button 2201 is a button for the user to rotate the displayed page by 90 degrees. Buttons 2202 and 2204 are buttons for the user to switch to the previous page and to the next page, respectively. The current page 2203 represents the current page number (numerator) and the total number of pages (denominator). A button 2205 is a button for the user to open or close a page navigation window. A filename 2206 represents the currently displayed file name. Buttons 2201, 2202, 2203, and 2205 are defined in operation button definition data items 2416-2419, and 2440-2443.

A button 2201 (rotational display of the page) receives the execution of the RotatePage command. RotatePage displays the lower side user's handwritten object 2006 and character string object 2007, and only the upper side user's handwritten object 2013 in FIG. 23A by rotating 90 degrees counterclockwise. The operation menu, including page navigation, does not rotate. That is, in an example of FIG. 23A, the upper side user's handwritten object 2013 is difficult to read from the lower side user's viewpoint due to upside-down, so that the display apparatus 2 temporarily rotates the page to make it easier to read by executing the RotatePage command.

Buttons 2202 and 2204 (page switching) receive the execution of PageBack or PageNext command. PageBack or PageNext switches the current page to the previous page or to the next page.

A button 2205 (which opens or closes the page navigation window) receives the execution of the TogglePageNavi command. The TogglePageNavi command opens or closes the page navigation window areas 2005 and 2012 of FIG. 23A.

The current page 2203 and the file name 2206 are display-only and do not receive operations. The current page 2203 displays the current page number (numerator) and the total number of pages (denominator). In this example, the display apparatus 2 displays the second page of a four-page file. A file name 2206 displays the currently displayed file name. In this example, the display apparatus 2 displays "技術検討会議.pdf".

<<Page Navigation Operation Panel>>

FIG. 26 shows an example of a page navigation operation panel 2003 or 2010. The page navigation operation panel 2003 or 2010 displays the page names for each file in the order of the pages. That is, when a page name is selected from a character string object, it is easier for the user to later identify what is described on which page.

Buttons 2301 and 2305 are buttons for the user to switch to the previous page navigation window and to the next page navigation window, respectively. Buttons 2302 and 2304 are buttons for the user to switch to the previous file and to the next file, respectively (the first page of the switched file is displayed on the display 220). The current page navigation 2303 displays the current number (numerator) and the total number (denominator) of the page navigation window. Buttons 2301, 2302, 2304, and 2305 are defined in operation button definition data items 2420-2423, 2444-2447.

The page navigation 2306 displays character strings in file order and page order. The page navigation 2306 displays file names of a plurality of read files and page names in each file in a tree format. When a file name or a page name is pressed, the display apparatus 2 displays the page on the display 220 based on the page navigation data of FIG. 31. For example, if the page navigation is 200 lines and the page navigation window is 50 lines, the current number of the current page 2203 can be a value of 1 to 4 and the total number is 4. When the user presses the button 2301, the display apparatus 2 decrements the current number, and when the button 2305 is pressed, the current number is incremented to re-display the page navigation window. The page navigation 2306 is arranged to be user friendly, with the lower side user positioned near the bottom of the display 220 and with the upper side user positioned near the top of the display 220.

In the page navigation 2306 of FIG. 26, two file names 2310 and 2308 are displayed and pages 2307 and 2309 of each page are displayed in a tree-like manner for each file. A page name is a character string object specified by the user or an automatically extracted character string. The page name is indented by the user's operation.

Buttons 2301 and 2305 (page navigation window switching) receive the execution of the PageNaviWinBack/PageNaviWinNext command. PageNaviWinBack/PageNaviWinNext switches the current page navigation window to the previous or the next page navigation window. If the number of lines that can be displayed in the page navigation window is 50 lines, the display apparatus 2 can switch the page navigation window of 50 lines by pressing the buttons 2301 and 2305.

Buttons 2302 and 2304 (file switching) accept the PageNaviFileBack/PageNaviFileNext command. PageNaviFileBack/PageNaviFileNext switches the currently displayed page to the first page of the previous file or the next file.

The page navigation 2306 is defined by the page navigation data of FIG. 31. The tree-opened icon 2311 indicates, with a downward triangle, that the tree is displayed. The tree-closed icon 2312 indicates, with a lateral triangle, that the tree is closed. When the tree is closed, the page names on the lower row of the tree are not displayed.

When Tree of the page navigation data is "Opened", the display apparatus 2 displays the tree-opened icon 2311, and when it is pressed, the display apparatus 2 changes the Tree to "Closed" and closes the tree. Conversely, when Tree="Closed", the display apparatus 2 displays the tree-closed icon 2312, and when the user presses it, the display apparatus 2 changes to Tree="Opened", and the tree is opened.

The page name 2313 indicates an indented page. The level of indentation is controlled by "Level" of the page navigation data. The initial value of Level for a file name is Level="0" and the initial value of Level for a page name is Level="1". When a user performs indentation to the right by pressing a file name or a page name, the value of the indentation level, "Level" is increased. The page name 2313 indicates indentation of Level="2". To change the Level, the user presses and holds the page name and move it left or right. For example, when a user moves to the right, the display apparatus 2 looks up the current row for the same level (the level before moving) and adds Tree="Opened" to the upper row. The indented row can be hidden, and displaying and hiding of the indented row is controlled by the Tree of a row of the same level as the level of the row before it is indented. The display apparatus 2 increments the Level of the indented row, and re-displays the indented row.

The page name 2314 indicates a blank page and indicates the blank page next to the last page of the file (page name 2313). The blank page is a page on which nothing has been handwritten. Blank pages continue to exist to the maximum page number, but only the first blank page appears in the page navigation. For example, if the maximum page number is 100, and the file contains four pages, pages 5-100 are blank pages, but only the fifth page is displayed as a "blank page" in the page navigation 2306.

The page name 2315 is the page currently displayed on display 220. Here, the page name 2315 is highlighted with a surrounding frame 262.

The page name 2316 is a default page name. When there is no character string recognized by handwriting recognition, the display apparatus 2 displays the page name with "nnnn page" (where nnnn is an integer). It is indicated that there is a character string recognized by handwriting recognition in the page names except for the page names of the default page name of the page name 2316, the blank page of the page name 2314, and the file names 2310 and 2308.

In the case of AutoName="True" in the page navigation data described below, the display apparatus 2 automatically sets the page name if there is a character string recognized by handwriting recognition. In a screen layout example of FIG. 23A, the character string "ハードウェア構成" (hardware configuration) is automatically set as a page name. The logic of determining the page name from a character string recognized by handwriting recognition can vary. For example, a method of connecting character strings together in order of input time and extracting a first fixed number of characters, or a method of determining the order of priorities of the character string position, combining character strings, together in order of priorities, and extracting a first fixed number of characters.

As shown in an example of the display of the operation command in FIGS. 20A and 20B, when a user selects a determined object that has already been recognized by handwriting recognition, using an enclosing line or an extending-over line, "ページ名に設定" (set as a page name) is displayed in the operation command. When this is selected, the command of SetPageName is executed. SetPageName changes the current page name of the page navigation 2306 to the selected character string and changes the AutoName of the page navigation data to "False".

"Angle" is also set to the pen ID control data when a file name or a page name of the page navigation operation panels 2003 and 2010 is selected with (using) the pen 2500. This Angle is an angle with which the page navigation window area is rotated. The display apparatus 2 stores a rotation angle (Angle) of the page navigation window area acquired from the operation button definition data for display and sets the stored rotation angle to "Angle" of the pen ID control data when a file name or a page name is selected by the pen 2500. Thereafter, the data processing is performed with the Angle set in the pen ID control data.

<Operation Button Definition Data>

FIGS. 27 to 30 show an example of operation button definition data items 2401 to 2448. The operation button definition data items 2401-2448 define the buttons of: the pen operation panels 2001 and 2008; the page operation panels 2002 and 2009; and the page navigation operation panels 2003 and 2010. A row of operation button definition data defines a button. Further, FIGS. 27 and 28 define the operation menu 301 for the lower side user, and FIGS. 29 and 30 define the operation menu 302 for the upper side user.

Each of the operation button definition data items 2401 to 2448 defines a button identifier (ButtonId), a button display position (Position), a button icon image (Icon), an angle (Angle) for information related to data processing, and a command (Command) executed by the display apparatus 2 when the button is pressed. The angle (Angle) also represents the user's operation position and the rotation angle of the operation menu 302. When the user presses one of the buttons 2101-2115, 2201, 2202, 2203, 2205, 2301, 2302, 2304, and 2305 with the pen 2500, the display apparatus 2 saves the angle defined in the button (Angle) in the pen ID control data of the pen and executes the command defined in the button.

As described above, the operation menu is associated with data processing according to the display position of the operation menu. In FIGS. 27 to 30, a character string object is rotated in accordance with a display position. Various data processing is possible if the administrator changes the command included in the same button of the operation menu 301 for the lower side user and the operation menu 302 for the upper side user.

Operation button definition data items 2401-2415 define the pen operation panel 2001 for the lower side user. Operation button definition data items 2416-2419 define the page operation panel 2002 for the lower side user. Operation button definition data items 2420-2424 define the page navigation operation panel 2003 for the lower side user. Operation button definition data items 2425-2439 define the pen operation panel 2008 for the upper side user. Operation button definition data items 2440-2443 define the page operation panel 2009 for the upper side user. Operation button definition data items 2444-2448 define the page navigation operation panel 2010 for the upper side user.

Because it is necessary for the operation button definition data items 2415 and 2439 to indicate the current ON/OFF state of the handwriting recognition candidates, an on icon image (IconOn) and an off icon image (IconOff) are defined. Because it is necessary for the operation button definition data items 2419 and 2443 to indicate buttons for opening and closing the page navigation window, an on icon image (Icon On) and an off icon image (Icon Off) are defined. The display apparatus 2 displays the on icon image or the off icon image according to the return value of the execution result of the Command.

The operation button definition data items 2424 and 2448 are the definition data of the page navigation window area, and only a position (Position) and an angle (Angle) of the rectangular area are defined. When the user presses these rectangular areas with the pen 2500, the display apparatus 2 stores the defined angle (Angle) in the pen ID control data of the pen 2500 used for pressing the area.

<Page Navigation Data>

FIG. 31 shows an example of a page navigation data. The page navigation data is an example of information in which page names are recorded for each page of a file. The page navigation data defines the contents of the page navigation window areas 2005 and 2012. A line of the page navigation data defines a line of the page navigation. The page navigation data defines a file name (FileName), a page number (Page), an indent level (Level), a page name (PageName), an automatic name (AutoName), a tree state (Tree), and a current page (CurrentPage). Page="0" and Level="0" are for a file name. As the Level increases, the page name on the page navigation is indented to the right.

The default settings are PageName="nnnn page" (where nnnn is the page number) or "blank page", "AutoName="True", and Tree="Opened". When AutoName="True", the display apparatus 2 automatically sets a character string recognized by handwriting recognition to PageName. When "ページ名に設定" (set as a page name) is selected from the operation command by the user after specifying the determined object recognized by handwriting recognition, the page name is changed to the determined object, and AutoName="False". In other words, the page name set by the user takes precedence. With respect to "Tree" setting, in a case of Tree="Opened" in a certain line, all page names of lines below the certain line where the level is one level lower than the certain line are displayed in a tree format, and, in a case of Tree="Closed", the page names are not displayed. If the page name is displayed, the same process is repeated for the displayed page name. Therefore, when there is a level larger than the line in the next line, the display apparatus 2 sets Tree="Opened" to the line. CurrentPage indicates the page currently displayed on display 220.

<Operation Procedure>

Operations of the display apparatus 2 will be described with reference to the above-described configurations and FIGS. 32 to 39. FIGS. 32 to 39 are sequence diagrams illustrating processes in which the display apparatus 2 displays character string candidates and operation command candidates. The processes illustrated in FIG. 32 start when the display apparatus 2 starts (when the application starts). It should be noted that, in FIGS. 32 to 39, the functions illustrated in FIGS. 6A and 6B are indicated by reference numerals for the sake of space convenience.

Before the entry of handwritten data is started, the user has selected a button of the buttons 2101-2110 of the pen operation panels 2001 and 2008 (PenId has been identified). Therefore, a. The pen button ID, ColorId, and Angle are identified by the operation button definition data.

b. Pen ID control data includes PenId, ColorId, and Angle.

S1: First, the handwritten input display control unit 23 transmits the start of the handwritten object to the handwritten input storage unit 25. The handwritten input storage unit 25 allocates a handwritten object area (a memory area for storing handwritten objects). The handwritten object area may be allocated after a user touches the handwritten input unit 21 with a pen.

S2: Next, the user touches the handwritten input unit 21 with a pen. The handwritten input unit 21 detects the pen-down and transmits it to the handwritten input display control unit 23.

S3: The handwritten input display control unit 23 transmits a stroke start to the handwritten input storage unit 25, and the handwritten input storage unit 25 allocates a stroke area.

S4: When the user moves the pen in contact with the handwritten input unit 21, the handwritten input unit 21 transmits pen coordinates to the handwritten input display control unit 23.

S5: The handwritten input display control unit 23 specifies the pen ID received from the pen 2500 at the same time as a coordinate input, and acquires the current pen ID control data stored in the pen ID control data storage unit 36. Because the pen ID is transmitted at the time of the coordinate input, the stroke and the pen ID are associated with each other. The pen ID control data storage unit 36 transmits the pen ID control data to the handwritten input display control unit 23. It is noted that there is no AccountId because the user has not signed in.

S6: The handwritten input display control unit 23 transmits the pen coordinate complement display data (data interpolating discrete pen coordinates) to the display unit 22.

The display unit 22 interpolates the pen coordinates with the pen coordinate complement display data, and identifies the line type and thickness from the color definition data based on the ColorId to display a stroke.

S7: The handwritten input display control unit 23 transmits pen coordinates, the reception time thereof, ColorId, and the angle information to the handwritten input storage unit 25. The handwritten input storage unit 25 adds the pen coordinates to the stroke. While the user is moving the pen, the handwritten input unit 21 repeats transmissions of the pen coordinates to the handwritten input display control unit 23 periodically. Processing of steps S4 to S7 is repeated until the pen-up.

S8: When the user releases the pen from the handwritten input unit 21, the handwritten input unit 21 transmits the pen-up to the handwritten input display control unit 23.

S9: The handwritten input display control unit 23 transmits the end of the stroke to the handwritten input storage unit 25, and the handwritten input storage unit 25 determines the pen coordinates of the stroke. After the determination of the pen coordinates of the stroke, the pen coordinates cannot be added to the stroke.

S10: Next, the handwritten input display control unit 23 transmits, to the handwritten input storage unit 25, an acquisition request for an overlap status between the handwritten object neighboring rectangular area and the stroke rectangular area based on the handwritten object neighboring rectangular area, The handwritten input storage unit 25 calculates the overlap status, and transmits the overlap status to the handwritten input display control unit 23.

Subsequent steps S11 to S17 are performed when the handwritten object neighboring rectangular area and the stroke rectangular area are not overlapped with each other.

S11: When the handwritten object neighboring rectangular area and the stroke rectangular area are not overlapped with each other, one handwritten object is determined. Therefore, the handwritten input display control unit 23 transmits a retained data clear to the handwriting recognition control unit 26.

S12 to S14: The handwriting recognition control unit 26 transmits the retained data clear to the character string conversion control unit 28, the predictive conversion control unit 30, and the operation command recognition control unit 32, respectively. The handwriting recognition control unit 26, the character string conversion control unit 28, the predictive conversion control unit 30, and the operation command recognition control unit 32 clear the data pertaining to the character string candidates and the operation command candidates that have been retained. It should be noted that, at the time of clearing, the last handwritten stroke is not added to the handwritten object.

S15: The handwritten input display control unit 23 transmits the completion of the handwritten object to the handwritten input storage unit 25. The handwritten input storage unit 25 determines the handwritten object. The determination of a handwritten object means that one handwritten object has been completed (no more strokes are added).

S16: The handwritten input display control unit 23 transmits a start of a handwritten object to the handwritten input storage unit 25. In preparation for the handwriting start (pen down) of the next handwritten object, the handwritten input storage unit 25 allocates a new handwritten object area.

S17: Next, the handwritten input display control unit 23 transmits a stroke addition with respect to the stroke completed in step S9 to the handwritten input storage unit 25. When steps S11 to S17 are executed, the additional stroke is the first stroke of the handwritten object, and the handwritten input storage unit 25 adds the stroke data to the handwritten object being started. If steps S11-S17 have not been performed, the additional strokes are added to the handwritten objects that has been being handwritten.

S18: Subsequently, the handwritten input display control unit 23 transmits the stroke addition to the handwriting recognition control unit 26. The handwriting recognition control unit 26 adds the stroke data to a stroke data retaining area (an area in which stroke data is temporarily stored) in which character string candidates are stored.

S19: The handwriting recognition control unit 26 performs gesture handwriting recognition on the stroke data retaining area. The gesture handwriting recognition refers to recognition of angle information from a straight line. It should be noted that, because the gesture handwriting recognition is performed inside the operation guide 500, the handwriting recognition control unit 26 detects a straight line inside the operation guide 500. The position information of the operation guide 500 is transmitted to the handwriting recognition control unit 26 in step S67, which will be described later.

S20: When a straight line in the operation guide 500 is detected, a counterclockwise angle α, which is formed between the line 522, which is drawn from a starting point of the straight line downwards to the 6 o'clock direction, and the straight line 521, which is entered by the user, is determined in units of 45 degrees. Further, the handwriting recognition control unit 26 stores the determined angle information in the pen ID control data storage unit 36 by associating the determined angle information with the pen ID included in the stroke data of the straight line 521. It should be noted that step S20 is performed when a straight line is detected in the operation guide 500. Thus, a different Angle can be set over the Angle determined by the pressing of the buttons 2101-2115 of the pen operation panels 2001, 2008.

S20-2: The handwriting recognition control unit 26 clears a selectable candidate display rectangle.

S21: Next, the handwriting recognition control unit 26 specifies the pen ID received from the handwritten input unit 21 and acquires the angle information of the current pen ID control data from the pen ID control data storage unit 36.

S22: The handwriting recognition control unit 26 rotates, in a clockwise direction with the acquired angle information, the stroke data in the stroke data retaining area. As described above, the display apparatus 2 can rotate the stroke data in accordance with the information related to the data processing according to the display position, and perform character recognition.

S23: The handwriting recognition control unit 26 transmits the stroke data after rotation to the handwritten signature authentication control unit 38. As described above, the stroke data is always transmitted to the handwritten signature authentication control unit 38 under the condition in which it is unclear whether or not the stroke data is a handwritten signature.

S24: The handwritten signature authentication control unit 38 receives the stroke data and receives the registered handwritten signature data from the handwritten signature data storage unit 39. Further, the handwritten signature authentication control unit 38 compares the stroke data with the handwritten signature data (matching) and retains the handwritten signature authentication result so as to obtain the authentication result of the handwritten signature in step S61 in the later stage. When authentication is successful, AccountId is registered in the pen ID control data.

S25: Next, the handwriting recognition control unit 26 performs handwriting recognition on the stroke data, and performs processing of the form when the registration or cancellation field of the form is "check mark" or "x", and, otherwise, performs processing of the normal handwriting recognition.

S26: When the registration or cancellation field of the handwritten signature data registration form is a "check mark," the handwriting recognition control unit 26 transmits the handwritten signature data (the stroke data) input by the user for the handwritten signature registration form to the handwritten signature authentication control unit 38. The handwritten signature registration form is generated in the handwritten input storage unit 25 by the handwritten input display control unit 23 in step S86, which will be described later.

S27: The handwritten signature authentication control unit 38 registers the received handwritten signature data (stroke data) in the handwritten signature data storage unit 39. According to the above, a number is given to SignatureId. The SignatureId is returned to the handwriting recognition control unit 26. When the SignatureId and the name entered in the name entry field of the handwritten signature registration form are not included in the user defined data, the handwriting recognition control unit 26 newly adds the user defined data. The handwriting recognition control unit 26 assigns a number for AccountId and stores SignatureId in the user defined data. If the name entered in the name field is included in the user defined data, the SignatureId is saved in the user defined data. This process associates AccountId with SignatureId.

S28: The handwriting recognition control unit 26 deletes the handwritten signature registration form from the handwritten input storage unit 25 upon registration of the handwritten signature data.

S29: When the registration or cancellation field of the user defined data change form is "check mark", the handwriting recognition control unit 26 transmits the change values, which are input to the user defined data change form 562, to the operation command definition unit 33. The user defined data change form 562 is generated by the handwritten input display control unit 23 in the handwritten input storage unit 25 in step S86, which will be described later.

S30: Upon execution of the user defined data change, the handwriting recognition control unit 26 deletes the user defined data change form 562 from the handwritten input storage unit 25.

S31: When the registration or cancellation field of the form added in step S86, which will be described later, is "x", the handwriting recognition control unit 26 deletes the form added in step S86 from the handwritten input storage unit 25.

S33: When it is not the form processing, the handwriting recognition control unit 26 transmits the handwriting recognition character string candidates, which is handwritten by the user, to the handwriting recognition dictionary unit 27. The handwriting recognition dictionary unit 27 transmits language-wise character string candidates, which are linguistically assumed to be correct, to the handwriting recognition control unit 26.

It is noted that when "RecommendMenuOff="True" is set in the pen ID control data at present and the operation command is set not to be displayed, the handwriting recognition control unit 26 does not perform the control related to the recognition of steps S33 to S47. In this way, the display apparatus 2 can reduce the processing load.

S34: The handwriting recognition control unit 26 transmits the handwriting recognition character string candidate and the received language-wise character string candidates to the character string conversion control unit 28.

S35: The character string conversion control unit 28 transmits the handwriting recognition character string candidates and the language-wise character string candidates to the character string conversion dictionary unit 29. The character string conversion dictionary unit 29 transmits the converted character string candidates to the character string conversion control unit 28.

S36: The character string conversion control unit 28 transmits the received converted character string candidates to the predictive conversion control unit 30.

S37: The predictive conversion control unit 30 transmits the received converted character string candidates to the predictive conversion dictionary unit 31. The predictive conversion dictionary unit 31 transmits the predictive character string candidates to the predictive conversion control unit 30.

S38: The predictive conversion control unit 30 transmits the received predictive character string candidates to the operation command recognition control unit 32.

S39: The operation command recognition control unit 32 transmits the received predictive character string candidates to the operation command definition unit 33. The operation command definition unit 33 transmits the operation command candidates to the operation command recognition control unit 32. Accordingly, it is possible for the operation command recognition control unit 32 to acquire the operation command candidates corresponding to the operation command definition data having a character string (String) matching the predictive string candidates.

Thereafter, the display apparatus 2 performs processing in the similar manner until the transmission of the operation command candidates indicated in steps S40 to S47.

S40: The character string conversion control unit 28 transmits the received converted character string candidates to the operation command recognition control unit 32.

S41: The operation command recognition control unit 32 transmits the received converted character string candidates to the operation command definition unit 33. The operation command definition unit 33 transmits the operation command candidates to the operation command recognition control unit 32. Accordingly, it is possible for the operation command recognition control unit 32 to acquire the operation command candidates corresponding to the operation command definition data having a character string (String) matching the converted character string candidates.

S42: The handwriting recognition control unit 26 transmits the handwriting recognition character string candidates and the language-wise character string candidates to the predictive conversion control unit 30.

S43: The predictive conversion control unit 30 transmits the handwriting recognition character string candidates and the received language-wise character string candidates to the predictive conversion dictionary unit 31. The predictive conversion dictionary unit 31 transmits the predictive character string candidates to the predictive conversion control unit 30.

S38: The predictive conversion control unit 30 transmits the received predictive character string candidates to the operation command recognition control unit 32.

S39: The operation command recognition control unit 32 transmits the received predictive character string candidates to the operation command definition unit 33. The operation command definition unit 33 transmits the operation command candidates to the operation command recognition control unit 32. Accordingly, it is possible for the operation command recognition control unit 32 to acquire the operation command candidates corresponding to the operation command definition data having a character string (String) matching the predictive string candidates.

S46: The handwriting recognition control unit 26 transmits the handwriting recognition character string candidates and the received language-wise character string candidates to the operation command recognition control unit 32.

S47: The operation command recognition control unit 32 transmits the handwriting recognition character string candidates and the received language-wise character string candidates to the operation command definition unit 33. The operation command definition unit 33 transmits the operation command candidates to the operation command recognition control unit 32. Accordingly, it is possible for the operation command recognition control unit 32 to acquire the operation command candidates corresponding to the operation command definition data having a character string (String) matching the language-wise character string candidates.

S48: Next, the handwriting recognition control unit 26 transmits the stroke addition to the operation command recognition control unit 32.

S49: The operation command recognition control unit 32 transmits a request for position information of the determined object to the handwritten input storage unit 25. The handwritten input storage unit 25 transmits the position information of the determined object to the operation command recognition control unit 32.

S50: The operation command recognition control unit 32 determines a selected object. The operation command recognition control unit 32 determines whether or not the position information of the stroke, which is received from the handwriting recognition control unit 26 in the stroke addition of step S48, is in a predetermined relationship with the position information of the determined object, which is received from the handwritten input storage unit 25, based on the extending-over line determination condition 406 and the enclosing line determination condition 407. When there is a determined object that can be determined to be selected, the operation command recognition control unit 32 stores the determined object as a selected object. Further, in this case, because the selected object is identified, the operation command candidates when the selected object is present is acquired from the operation command definition unit 33.

In addition, the handwriting recognition control unit 26, the character string conversion control unit 28, the predictive conversion control unit 30, and the operation command recognition control unit 32 retain the handwriting recognition character string candidate, the language-wise character string candidate, the converted character string candidate, the predictive character string candidate, the operation command candidate, and the data related to the selected object, so that the data can be acquired in steps S55 to S58 of the subsequent stage.

S18-2: Right after transmitting the stroke addition to the handwriting recognition control unit 26 in step S18, the handwritten input display control unit 23 transmits the start of the selectable candidate display timer to the candidate display timer control unit 24. The candidate display timer control unit 24 starts the timer.

The subsequent steps S51-S53 are performed when a pen-down occurs before a certain period of time elapses (before the timer expires).

S51: When the user contacts the handwritten input unit 21 with a pen before the timer expires, the handwritten input unit 21 transmits a pen-down (the same event as in step S2) to the handwritten input display control unit 23.

S52: The handwritten input display control unit 23 transmits a stroke start (the same as in step S3) to the handwritten input storage unit 25. The subsequent sequence is the same as in step S3 and thereafter.

S53: Further, the handwritten input display control unit 23 transmits the selectable candidate display timer stop to the candidate display timer control unit 24. The candidate display timer control unit 24 stops the timer. This is because a pen-down was detected, and the timer is not necessary.

Steps S54-S103 are performed when there is no pen-down (before the timer times out) before a certain period of time has elapsed. Accordingly, the operation guide 500 illustrated in FIG. 19 is displayed.

S54: The candidate display timer control unit 24 transmits a timeout to the handwritten input display control unit 23 when the user does not contact the handwritten input unit 21 with a pen while the selectable candidate display timer is running.

S55: The handwritten input display control unit 23 transmits an acquisition of the handwriting recognition character string/language-wise character string candidates to the handwriting recognition control unit 26. The handwriting recognition control unit 26 transmits the currently retained handwriting recognition character string/language-wise character string candidates to the handwritten input display control unit 23.

S56: The handwritten input display control unit 23 transmits an acquisition of the converted character string candidates to the character string conversion control unit 28. The character string conversion control unit 28 transmits the currently retained converted character string candidates to the handwritten input display control unit 23.

S57: The handwritten input display control unit 23 transmits an acquisition of the predictive character string candidates to the predictive conversion control unit 30. The predictive conversion control unit 30 transmits the currently retained predictive character string candidates to the handwritten input display control unit 23.

S58: The handwritten input display control unit 23 transmits an acquisition of the operation command candidates to the operation command recognition control unit 32. The operation command recognition control unit 32 transmits the currently retained operation command candidates and the selected object to the handwritten input display control unit 23.

S59: Further, the handwritten input display control unit 23 transmits an acquisition of an estimated writing character direction to the handwritten input storage unit 25. The handwritten input storage unit 25 determines the estimated writing character direction from the stroke addition time, the horizontal distance, and the vertical distance of handwritten object rectangular area, and transmits the estimated writing direction to the handwritten input display control unit 23.

S60: Next, the handwritten input display control unit 23 specifies the pen ID received from the handwritten input unit 21 and acquires ColorId and AccountId (may not be present) of the current pen ID control data from the pen ID control data storage unit 36.

S61: The handwritten input display control unit 23 acquires the authentication result of the handwritten signature from the handwritten signature authentication control unit 38. Accordingly, SignatureId of the user is acquired, and, when the operation command described below is executed, the pen ID control data is registered and associated with AccountId. When the user signs in, the color definition data, which is associated with the user defined data identified by AccountId, is identified. The handwritten input display control unit 23 can display: the handwritten data in which the color information of the user defined data is highlighted in black and white; or the text data converted from the handwritten data.

S62: The handwritten input display control unit 23 determines whether or not "RecommendMenuOff="True" is set to the pen ID control data of the pen 2500 used by the user. When "RecommendMenuOff="True" is set, the character string candidate 539 is not displayed. In this case, only the operation commands are displayed, but even the operation commands may not be displayed. In the case of "Recommended MenuOff="False", the handwritten input display control unit 23 produces the selectable candidate display data as shown in FIG. 19 from: the handwriting recognition character string candidates ("ぎ" in FIG. 19); the language-wise character string candidates (e.g., "議" not displayed in FIG. 19); the converted character string candidates ("議事録" and "technology試" in FIG. 19); the predictive character string candidates ("技量試を決済" and "議事録の送付" in FIG. 19); the operation command candidates ("議事録テンプレートを読み" and "議事録フォルーに保存する" in FIG. 19); each selection probability; and the estimation writing character direction. Further, the handwritten input display control unit 23 rotates counterclockwise the selectable candidate display data (the operation guide 500) based on the Angle acquired in step S60, and transmits the rotated selectable candidate display data (the operation guide 500) to the display unit 22 to be displayed.

S63: Further, the handwritten input display control unit 23 rotates counterclockwise the rectangular area display data (a rectangular frame) (a handwritten object rectangular area display 503 in FIG. 19) of the handwritten object and the selected object with the angle information acquired in step S60 and transmits the rotated data to the display unit 22 to be displayed.

S64: The handwritten input display control unit 23 transmits the start of the selectable candidate display deletion timer to the candidate display timer control unit 24 in order to erase the selectable candidate display data after a certain time from the display. The candidate display timer control unit 24 starts the timer. If the operation guide 500 including the operation command is not displayed because "RecommendMenuOff="True", the selectable candidate display and erase timer is not started.

Steps S65 to S70 are performed when, while the selectable candidate deletion timer is running, the user erases the selectable candidate display that is displayed on the display unit 22, or when a change occurs in the handwritten object (that is, when a stroke of the handwritten object is added, deleted, moved, deformed or divided), or when a candidate is not selected before the timeout.

Further, steps S65-S67 are performed when the candidate display is deleted or a change in the handwritten object occurs.

S65: The handwritten input unit 21 transmits the selectable candidate display deletion or the occurrence of the change of the handwritten object to the handwritten input display control unit 23.

S66: The handwritten input display control unit 23 transmits a selectable candidate delete timer stop. The candidate display timer control unit 24 stops the timer. This is because the timer is not required because the handwritten object is operated within a certain period of time.

S67: The handwritten input display control unit 23 stores the position information of the operation guide 500 in the handwriting recognition control unit 26 so that the position information can be used in gesture determination of the gesture handwriting recognition of step S19. The positional information may be, for example, the coordinates of the upper left corner and the lower right corner or their equivalent coordinates. According to the above, the handwriting recognition control unit 26 can determine whether the straight line used for inputting the angle information is within the operation guide 500.

S69: The handwritten input display control unit 23 transmits the deletion of the selectable candidate display data to the display unit 22 to erase the display. If "RecommendMenuOff="True", only the operation command is erased or it is not necessary to erase anything.

S70: The handwritten input display control unit 23 transmits the deletion of the rectangular area display data of the handwritten object and the selected object to the display unit 22 to erase the display. Therefore, if the display of the operation command candidate is deleted under conditions other than the selection of the operation command candidate, the display of the handwritten object is maintained.

S68: On the other hand, when no selectable candidate display deletion occurs or no handwritten object change occurs while the selectable candidate deletion timer is running (when the user did not perform the pen operation), the candidate display timer control unit 24 transmits the timeout to the handwritten input display control unit 23.

Similarly, after the timeout of the selectable candidate display deletion timer, the handwritten input display control unit 23 executes step S69 and step S70. This is because the display unit 22 may delete the selectable candidate display data and the rectangular area display data of the handwritten object and the selected object after a certain period of time.

When the user selects a selectable candidate while the selectable candidate erase timer is running, steps S71-S103 are executed.

S71: When the user selects the selectable candidate while the selectable candidate erase timer is running, the handwritten input unit 21 transmits the candidate selection of the character string candidates or the operation command to the handwritten input display control unit 23.

S71-2: The handwritten input display control unit 23 transmits a stop of the selectable candidate display delete timer to the candidate display timer control unit 24. The candidate display timer control unit 24 stops the timer.

S72: Next, the handwritten input display control unit 23 transmits the retained data clear to the handwriting recognition control unit 26.

S73: The handwriting recognition control unit 26 transmits the retained data clear to the character string conversion control unit 28.

S74: The handwriting recognition control unit 26 transmits the retained data clear to the predictive conversion control unit 30.

S75: The handwriting recognition control unit 26 transmits the retained data clear to the operation command recognition control unit 32. The handwriting recognition control unit 26, the character string conversion control unit 28, the predictive conversion control unit 30, and the operation command recognition control unit 32 clear the data pertaining to the character string candidates and the operation command candidates that have been retained.

S76: Next, the handwritten input display control unit 23 transmits the deletion of the selectable candidate display data to the display unit 22 to erase the display.

S77: The handwritten input display control unit 23 transmits the deletion of the rectangular area display data of the handwritten object and the selected object to the display unit 22 to erase the display.

S78: The handwritten input display control unit 23 erases the display by transmitting the delete of the handwritten object display data and the delete of the pen coordinate complement display data, which is transmitted in step S6, to the display unit 22. This is because a character string candidate or an operation command candidate has been selected and the handwritten objects, etc., are not needed any more.

S79: The handwritten input display control unit 23 transmits the handwritten object deletion to the handwritten input storage unit 25.

When a character string candidate is selected, steps S80-S82 are executed.

S80: When a character string candidate is selected, the handwritten input display control unit 23 transmits the addition of the character string object to the handwritten input storage unit 25.

S81: Further, the handwritten input display control unit 23 transmits the character string object font acquisition to the handwritten input storage unit 25. The handwritten input storage unit 25 identifies a font name, of the character string object, associated with the PenId of the pen ID control data from the pen color selection button definition data, and transmits the estimated character size of the handwritten object to the handwritten input display control unit 23.

S82: Next, the handwritten input display control unit 23 transmits the character string object display data, which is displayed at the same position as the handwritten object, to the display unit 22 using the defined font received from the handwritten input storage unit 25, to display the character string object display data. The handwritten input display control unit 23 identifies the line type and the thickness from the color definition data based on the Color Id of the pen ID control data, and displays the text (character string object) that is rotated with the angle information. Accordingly, the display apparatus 2 can display a character string object in the vertical direction from the viewpoint of the user's operation position.

When a operation command candidate is selected, steps S83 through S101 are executed. Operation commands for a selected object for editing or modification are executed in steps S83-S85.

S83: When an operation command candidate for the selected object is selected (when the selected object exists), the handwritten input display control unit 23 transmits the deletion of the selected object display data to the display unit 22 to erase the display. This is for deleting the originally selected object.

S84: Next, the handwritten input display control unit 23 transmits the operation command execution for the selected object to the handwritten input storage unit 25. The handwritten input storage unit 25 transmits display data (display data after editing or modification) of a newly selected object to the handwritten input display control unit 23.

S85: Next, the handwritten input display control unit 23 transmits the selected object display data to the display unit 22 so that the selected object after execution of the operation command is displayed again.

The operation command of "ページ名を追加" (add a page name) when a selected object is present is executed in steps S83-2 to S84-2.

S83-2: When the operation command candidate of "ページ名を追加" (add a page name) is selected (when a selected object exists), the handwritten input display control unit 23 requests the handwritten input storage unit 25 to acquire the selected object. The handwritten input storage unit 25 transmits the selected object to the handwritten input display control unit 23.

S84-2: The handwritten input display control unit 23 checks the page number currently being displayed on the display 220 in the page navigation data and adds the selected object as a page name to the handwritten input storage unit 25.

S86: When "手書きサイン登録する" (to register a handwritten signature) of the operation command definition data 713 or "設定変更する" (to change the setting) of the operation command definition data 716 is specified, the handwritten input display control unit 23 adds the handwritten signature registration form or the user defined data change form to the handwritten input storage unit 25.

S87: When the operation command candidate "ファイル保" (file saving) or "印刷" (printing) is selected, the handwritten input display control unit 23 transmits a file transmission request to the file transmission and reception control unit 37.

S88: The file transmission and reception control unit 37 transmits an acquisition request for the handwritten input storage data to be transmitted to the handwritten input storage unit 25.

S89: The handwritten input storage unit 25 determines whether the transmission destination is a color supporting apparatus according to the MIB or the like. The handwritten input storage unit 25 processes files according to whether the transmission destination is a color supporting apparatus, a black-and-white supporting apparatus, or a black-and-white highlighting supporting apparatus.

S90: The file transmission and reception control unit 37 transmits the handwritten input data received from the handwritten input storage unit to a destination or writes it to a file.

S91: When the operation command candidate of "ファイル読み込み" (File reading) is selected, the handwritten input display control unit 23 transmits an acquisition request for the file list information to the file transmission and reception control unit 37.

S92: The file transmission and reception control unit 37 receives the file list information from a storage medium such as a USB memory, a network storage, a web server, or an external apparatus.

S93: The file transmission and reception control unit 37 transmits the file list information to the handwritten input display control unit 23.

S94: The handwritten input display control unit 23 transmits the file list display data to the display unit 22. Accordingly, the display unit 22 displays a list of files on a display.

S95: When the user selects a file and the handwritten input unit 21 receives the selection, the handwritten input unit 21 transmits the file selection to the handwritten input display control unit 23.

S96: The handwritten input display control unit 23 transmits a file reception request for the selected file to the file transmission and reception control unit 37.

S97: The file transmission and reception control unit 37 acquires a file from an external apparatus.

S98: The file transmission and reception control unit 37 stores the file in the handwritten input storage unit 25.

S99: The handwritten input storage unit 25 analyzes the file received from the file transmission and reception control unit 37 and converts the handwriting originated data into the handwritten input storage data (black-and-white highlighting/color conversion enabled data). In other words, the presence or absence of meta-data is determined, and if meta-data is present, it is determined whether it is possible to convert the meta-data to handwritten input storage data (whether there is ColorId, etc.), and the data is stored as handwritten input storage data. Further, the handwritten input storage unit 25 reads the ColorId with respect to the handwriting originated data, and converts the data into a black-and-white highlighting display corresponding to the ColorId by referring to the color definition data. The handwritten input storage unit 25 transmits the display data of the handwriting object to the handwritten input display control unit 23. In a case where data is not handwriting originated, the handwritten input storage unit 25 reads the color information, font, and character size according to the file format and stores the data as the handwritten input storage data.

S100: The handwritten input display control unit 23 displays the display data of the handwritten input data on the display unit 22. According to the above, the display unit 22 displays the handwriting originated data as black-and-white highlighted handwritten data, and displays the data, which is not the handwriting originated data, in black and white using the conventional brightness conversion.

It should be noted that, when the operation command 512 for signing-in is executed, the handwritten input display control unit 23 acquires the pen ID received by the display apparatus 2 when the operation command 512 is executed. The handwritten input display control unit 23 identifies the user defined data including the SignatureId acquired in step S61 and acquires the AccountId from the user defined data. Further, the handwritten input display control unit 23 registers the AccountId in the pen ID control data by associating the Account ID with the pen ID. As a result, the pen 2500 and the user are associated with each other, and the display apparatus 2 can perform processing using the user defined data.

When a user performs handwriting or reads a file after signing in, the handwritten input display control unit 23 acquires the AccountId associated with the pen ID received by the display apparatus 2 from the pen ID control data at the time of execution of the operation command. The handwritten input display control unit 23 identifies the user defined data according to the AccountId and sets the color defined data or the like to "%~%" in the operation command to execute the operation command.

S101: When the operation command related to input and output is selected, the handwritten input display control unit 23 executes the operation command character string (command) of the operation command definition data corresponding to the operation command selected by the user.

S102: When the user enters the angle information manually, the handwritten input display control unit 23 stores the received angle information in the pen ID control data storage unit 36 by associating the angle information with the pen ID received from the pen 2500 when the rotation operation button 511 is pressed.

S103: The handwritten input display control unit 23 transmits the start of the handwritten object to the handwritten input storage unit 25 for the next handwritten object. The handwritten input storage unit 25 allocates a handwritten object area. Thereafter, the process of steps S2 to S103 is repeated.

<Display of Operation Menu>

Hereinafter, details of the processing that are not completely explained in the sequence diagram will be described.

Figure 40:
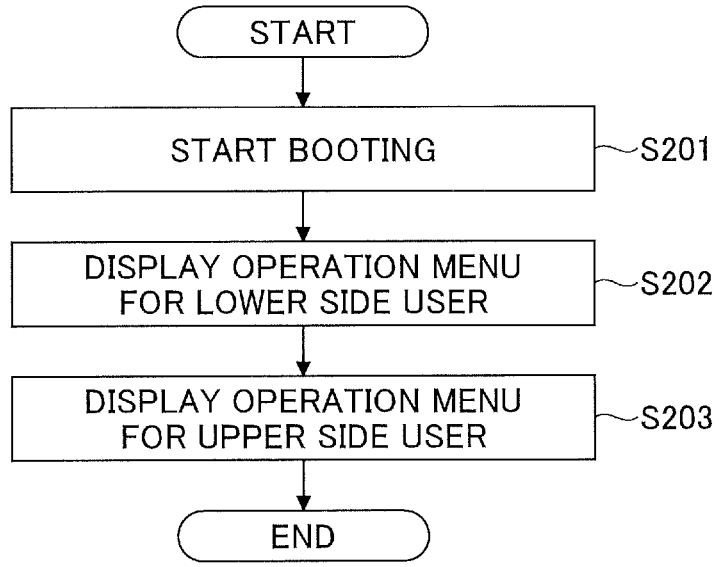
FIG. 40 is an example of a flowchart illustrating a procedure for displaying an operation menu by a display apparatus.

First, FIG. 40 is an example of a flowchart illustrating a procedure in which the display apparatus 2 displays the operation menus 301 and 302.

The display apparatus 2 starts when, for example, the user turns on the power of the display apparatus 2 (S201). The display apparatus 2 reads out and executes the OS (operating system) stored in the SSD 204, and the OS reads out and executes the program of the display apparatus 2 stored in the SSD 204.

The display unit 22 displays the operation menus 301 and 302 having information related to the data processing according to the display position. First, the display unit 22 displays the lower side user's operation menu 301 (S202). The display unit 22 may display the operation menu 302 first or at the same time. The display unit 22 reads out the operation button definition data items 2401 to 2424 and acquires an icon file. The display unit 22 determines the position based on the Position. The display unit 22 determines the rotation angle based on Angle. The display unit 22 displays icons of buttons 2101-2115, 2201, 2202, 2203, 2205, 2301, 2302, 2304, and 2305 on the display 220. Because the lower side user's Angle is 0 degrees, the icons for buttons 2101-2115, 2201, 2202, 2203, 2205, 2301, 2302, 2304, and 2305 are displayed without rotation. It is noted that the file name 2206 is not displayed until the file is read, and the current page 2203 is "1/1."

Next, the display unit 22 displays the upper side user's operation menu 302 (S203). The display unit 22 reads out the operation button definition data items 2425 to 2448 and acquires an icon file. The display unit 22 determines the position based on the Position. The display unit 22 determines the rotation angle based on Angle. The display unit 22 displays icons of buttons 2101-2115, 2201, 2202, 2203, 2205, 2301, 2302, 2304, and 2305 on the display 220. Because the upper side user's Angle is 180 degrees, the buttons 2101-2115, 2201, 2202, 2203, 2205, 2301, 2302, 2304, and 2305 icons are rotated 180 degrees and displayed. This allows each user to view easy-to-see buttons.

<Execution of Command of Operation Button Definition Data>

Figure 41:
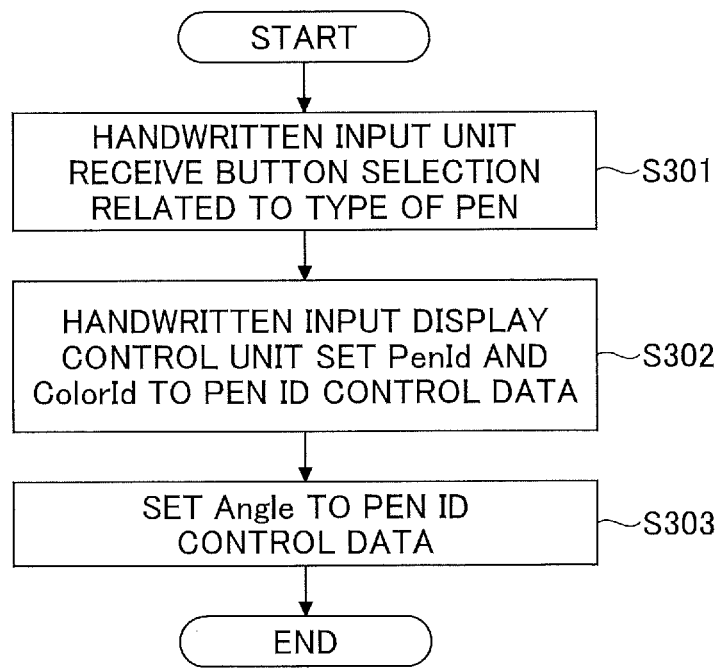
FIG. 41 is an example of a flowchart illustrating a process in a case where a button of the pen operation panel is pressed.

The case where buttons 2101-2115 of the pen operation panels 2001 and 2008 are selected will be described with reference to FIG. 41. FIG. 41 is an example of a flowchart illustrating a process when buttons 2101-2115 of the pen operation panel are pressed.

First, the handwritten input unit 21 receives a selection of one of the buttons 2101 to 2115 (S301). Here, the button 2101 is assumed to have been pressed. Because the coordinates touched by the pen 2500 are detected by the handwritten input unit 21 and the buttons 2101 to 2115 are registered in the operation button definition data items 2401 to 2415, the pressed button 2101 is identified.

Next, the handwritten input display control unit 23 executes "ChangePen ThinBlack" of the operation button definition data 2401 corresponding to the pressed button 2101. Therefore, the handwritten input display control unit 23 sets PenId and ColorId="ThinBlack" of the pen 2500 used by the user in the pen ID control data (S302).

Further, the handwritten input display control unit 23 sets "Angle" of the operation button definition data 2401 corresponding to the pressed button 2101 to the pen ID control data (S303).

Because the color of the pen is set to the pen ID control data, when the display unit 22 displays the handwritten object and the character string object on the display 220, the display is performed using a line type defined in the color definition data. Further, because the angle (Angle) is set to the pen ID control data, the handwritten data can be rotated before the character recognition.

It is noted that, although the buttons of the pen operation panels 2001 and 2008 have been described in FIG. 41, PenId and Angle can be also set to the pen ID control data when the buttons of the page operation panels 2002 and 2009, the page navigation operation panels 2003 and 2010, and the page navigations 2004 and 2011 are pressed.

<Execution of Operation Command "ページ名に設定" (Set as a Page Name)>

Figure 42:
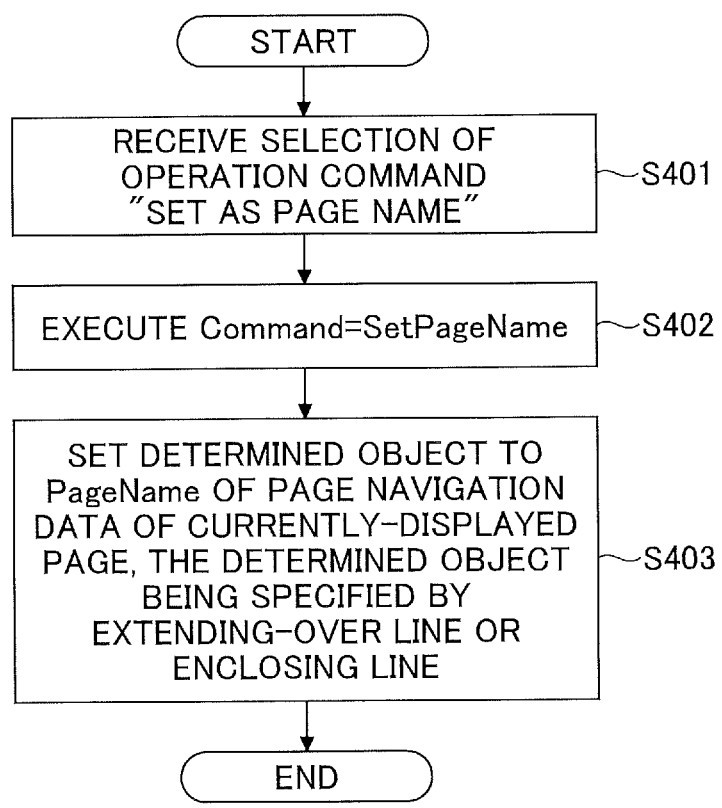
FIG. 42 is an example of a flowchart illustrating a process in a case where the user executes an operation command "set as a page name".

FIG. 42 is an example of a flowchart illustrating a process when the user executes an operation command "ページ名に設定" (set as a page name).

First, the user selects a determined object (text data after handwriting recognition) that is already displayed on the display 220 using an extending-over line or an enclosing line. According to the above, the display unit 22 displays the operation command "ページ名に設定" (set as a page name). When the user presses the operation command, the handwritten input unit 21 receives the selection of the operation command (S401). Because the coordinates of the operation guide 500 are known, the selected operation command is identified by the coordinates contacted by the tip of the pen 2500.

The handwritten input display control unit 23 acquires the operation command definition data of the selected operation command of Name="ページ名に設定" (set as a page name), and executes Command=SetPageName (S402).

The handwritten input display control unit 23 sets the selected object specified by the extending-over line or the enclosing line to the PageName of the page displayed on the display 220 (the page of Current Page-True in the page navigation data) (S403). In this way, the user can set a page name to a page with a simple operation of selecting a determined object.

It is noted that, until the user sets the page name, the default value (e.g., the xx-th page, the blank page, etc.) is set as the page name of the page at the time when the user starts handwriting on the page.

<Display of Page Navigation>

Figure 43:
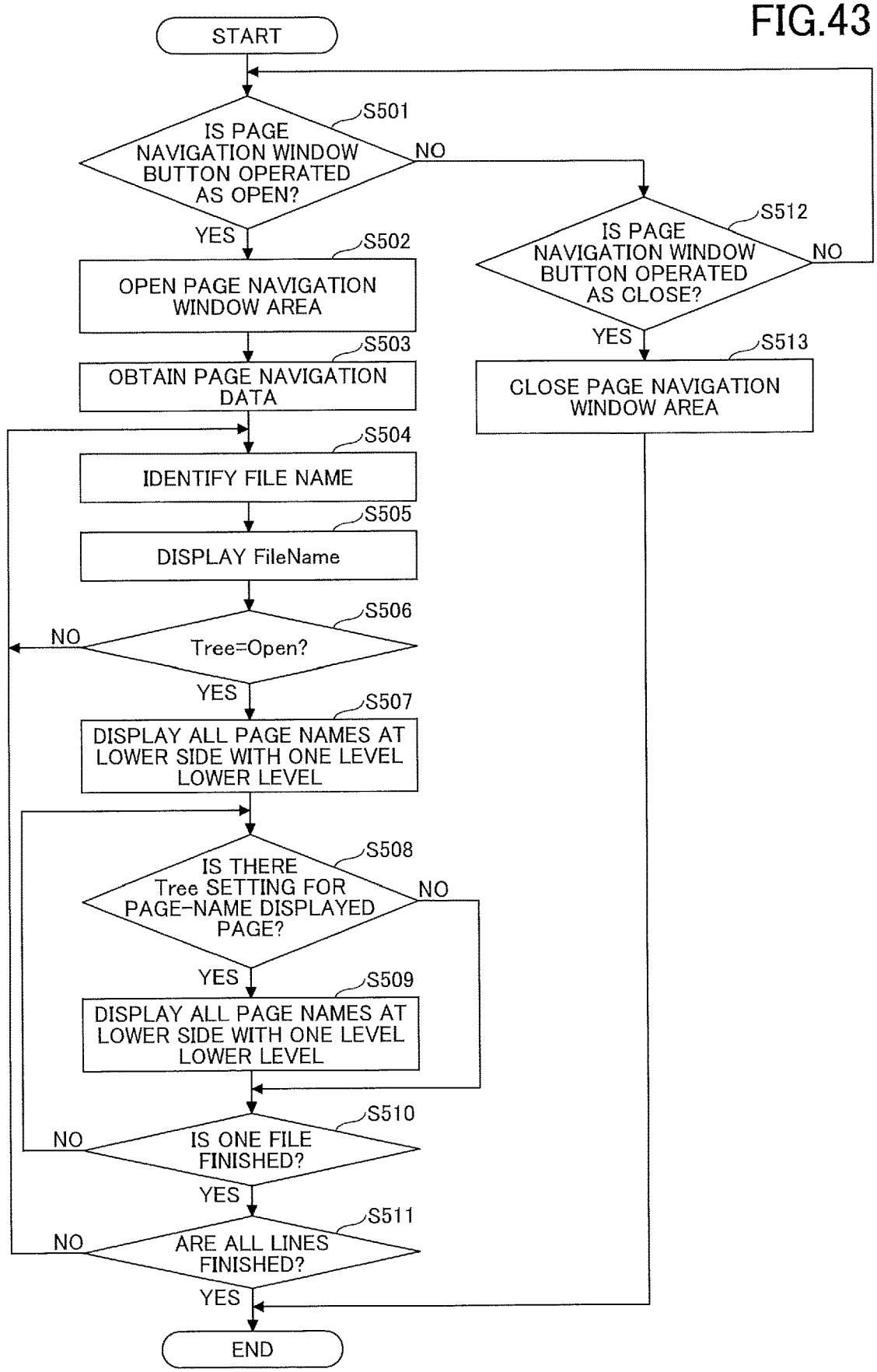
FIG. 43 is an example of a flowchart illustrating a display method of page navigation.

FIG. 43 is an example of a flowchart illustrating a display method of page navigation.

The display unit 22 determines whether or not the page navigation window button (button 2115) is operated to open (S501). Because the coordinates are set in the operation button definition data 2439 of the page navigation window button, the button pressing can be determined from the coordinates touched by the pen 2500.

When an operation to open the page navigation window button is entered, the display unit 22 opens the page navigation window areas 2005 and 2012 (S502). Because the page navigation window area is closed (without the page navigation window area) until the page navigation window area is opened, the display unit 22 shrinks the entire display 220 laterally to create a space on the right hand side of the display 220. It is noted that the display unit 22 opens one of or both of the page navigation window areas 2005 and 2012 operated by the user.

The maximum number of page navigation window areas is the same as the number of operation menus. The number of operation menus may be the number of "Angle" types included in the operation button definition data. Alternatively, the number of operation menus may be directly set to the display apparatus 2. The page navigation window area 2012 is displayed in the position rotated with Angle. Thus, for example, the user's right-hand side is a page navigation window area.

Next, the display unit 22 acquires the page navigation data items 2501 to 2511 (S503). The display unit 22 processes the page navigation data items 2501 to 2511 one line at a time.

First, the display unit 22 identifies the file name (S504). Whether or not the file name is determined by the display unit 22 by determining whether "Page=0" and "Level=0". Because the file name is always displayed, the display unit 22 displays FileName (S505).

Next, the display unit 22 determines whether or not "Tree" of the file of interest is "Open" (S506). If "Tree" is not set, it may be determined to be "No".

When the "Tree" of the file is Open, the page navigation displays the page names in the file. Therefore, the display unit 22 displays all the page names on the lower side with a one-level lower level (S507).

Next, the display unit 22 determines whether or not there is a Tree setting on the page whose page name is displayed (S508).

For the page with Tree setting, the display unit 22 displays all the page names on the lower side with a one-level lower level (S509). This process is performed on all nested pages.

Next, the display unit 22 determines whether or not the processing of one file has been completed (S510).

When the processing of one file is not completed, the processing returns to step S508, and the display unit 22 repeats the processing.

When the processing of one file is completed, the display unit 22 determines whether or not all of the page navigation data has been processed (S511), and when the processing has not been completed, returns to step S504 to process the next file.

When an operation to close the page navigation window button is entered (Yes in S512), the display unit 22 closes the page navigation window area (S513). The display unit 22 erases the page navigation window area, enlarges the entire display 220 laterally, and displays handwritten data or the like on the entire display 220.

As described above, by displaying the page navigation, it is easier to see characters or the like that are not seen with the conventional thumbnail, and the user can determine which page to be opened. Also, the page navigation window area can be opened and closed so that the display 220 can be used extensively. The user can display the page on the display 220 by simply selecting a file name or a page name in the page navigation.

<Example of Pen Holder Arrangement>

Figure 44:
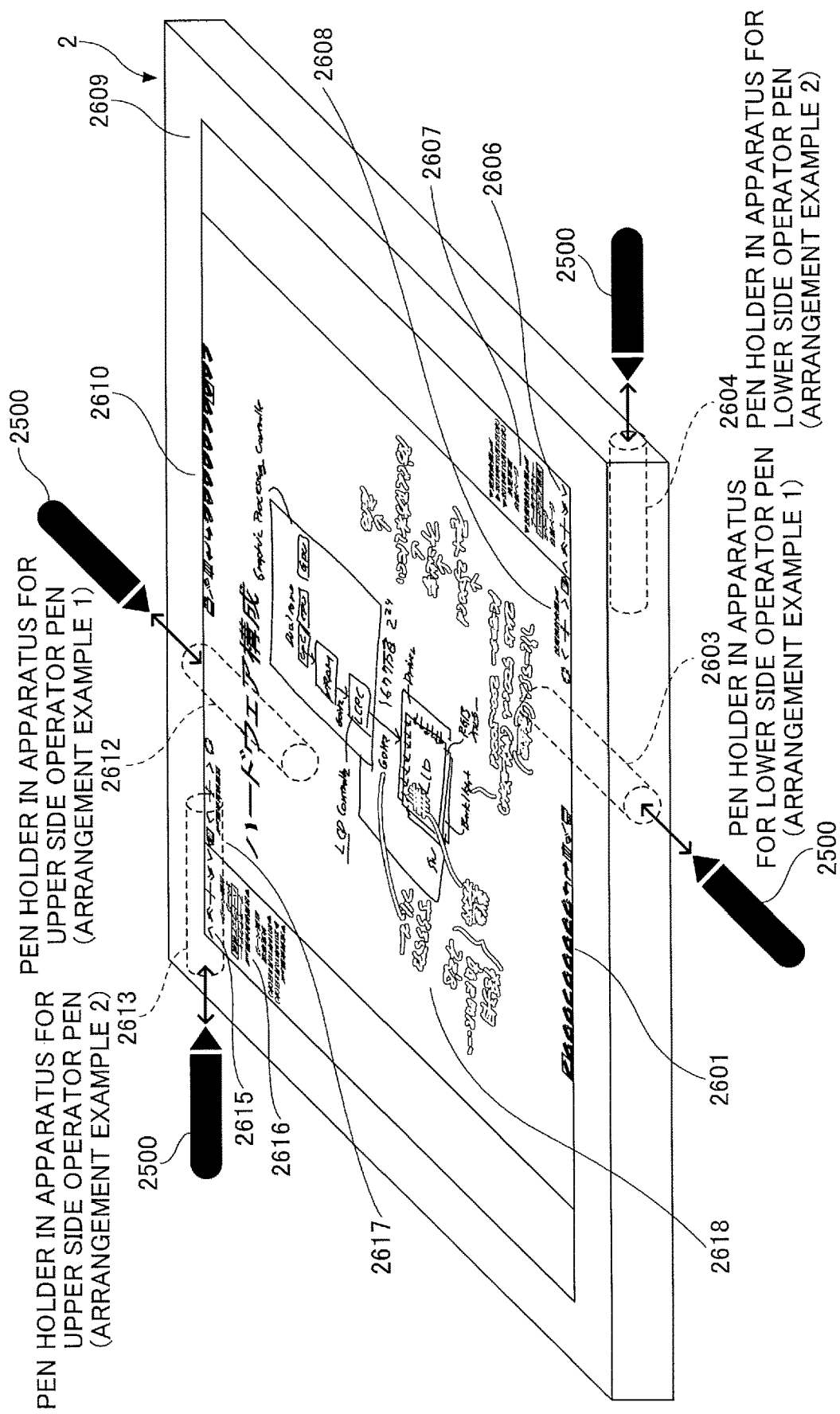
FIG. 44 is a drawing illustrating an arrangement example of a pen holder.

Next, a pen holder containing the pen 2500 will be described with reference to FIG. 44. FIG. 44 is a diagram illustrating an example of a pen holder arrangement. FIG. 44 shows an example of a pen holder arrangement when the display apparatus 2 is positioned flat (arranged horizontally facing upward) on a desk. It is noted that the display 220 displays handwritten data or the like similar to that of FIG. 23A.

The display apparatus 2 has pen holders 2603 and 2604 for the lower side user. The pen holder 2603 is an arrangement example 1 and the pen holder 2604 is an arrangement example 2. That is, either of the pen holders may be present, but both may be present. In addition, the display apparatus 2 includes pen holders 2612 and 2613 for the upper side user. The pen holder 2612 is an arrangement example 1 and the pen holder 2613 is an arrangement example 2.

Each of the pen holders 2603 and 2612 enables a user to take a pen out of the edge of the display 220 along which the operation menu is displayed, and each of the pen holders 2604 and 2613 contains a pen 2500 parallel to the edge.

With respect to the arrangement example 1 and the arrangement example 2, the pen holders are conveniently located from the lower side user or from the upper side user and are located close to the lower side user's or the upper side user's operation menu 301 and 302. Therefore, it is highly likely that information (rotation angle) related to data processing according to the display position is automatically set to the pen ID control data by the users unconsciously using the operation menus 301 and 302.

Once the information (angle) related to the data processing according to the display position is set to the pen ID control data, it is still valid after the next startup. If the user takes out the pen 2500 from the pen holder and starts handwriting without using the operation menus 301 and 302, the information related to the data processing according to the display position has already been set to the pen ID control data. The users may use the pens 2500 as if they were dedicated pens for the lower side user or the upper side user.

<Determination of Operation Menu Arrangement>

The arrangement of the operation menu may be defined in advance by the operation button definition data, or the administrator or the like may set the arrangement.

Figure 45:
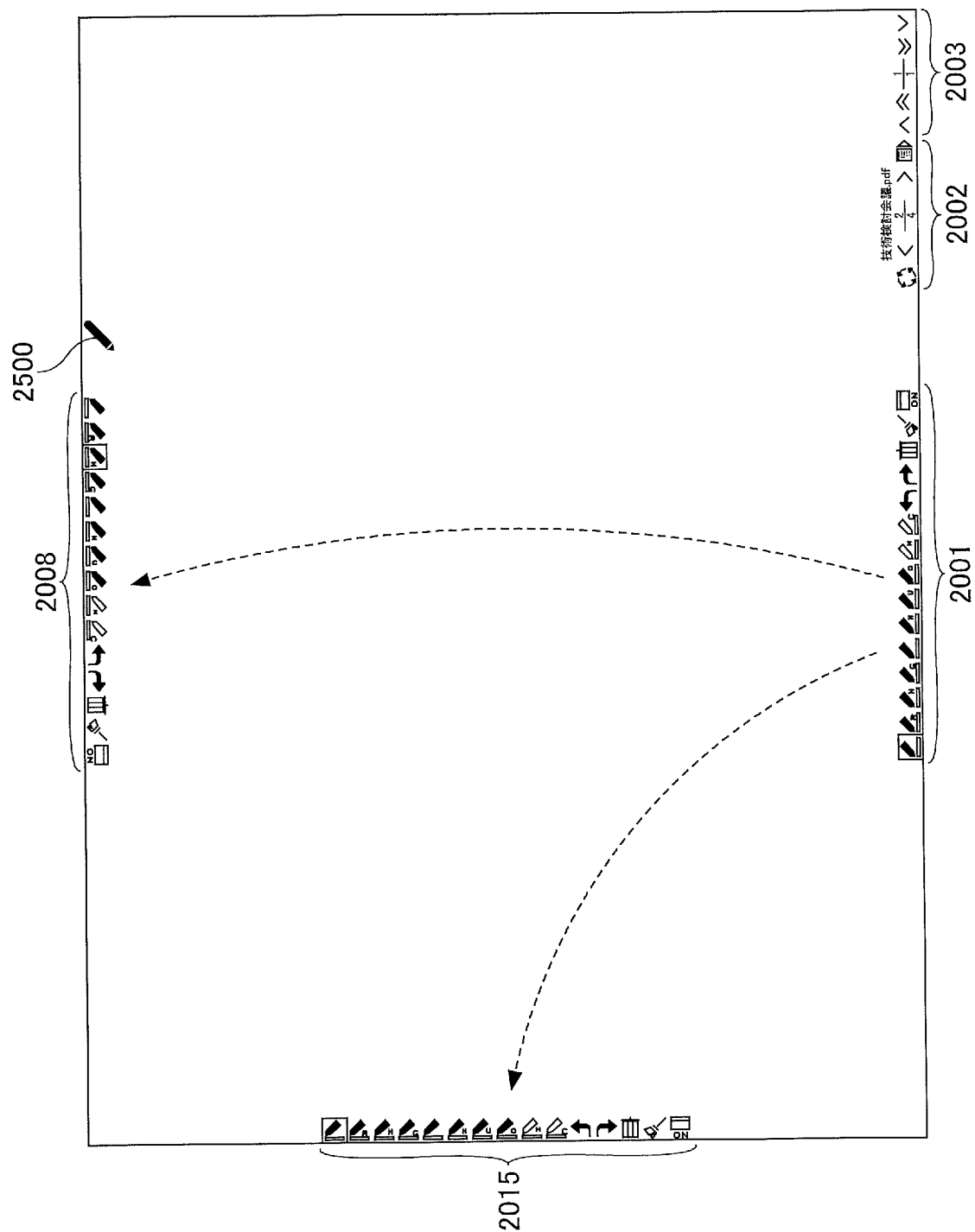
FIG. 45 is an example of an arrangement determination screen.

FIG. 45 is an example of an arrangement determination screen for the administrator to determine the arrangement of the operation menu. The administrator causes the display apparatus 2 to display the arrangement determination screen according to a predetermined operation. The arrangement determination screen displays the operation menus in the default or current setting. In FIG. 45, the lower side user's operation menu (the pen operation panel 2001, the page operation panel 2002 and the page navigation operation panel 2003) is initially displayed. The administrator inputs an operation to duplicate them with a pen 2500 or the like and moves them to any location. In FIG. 45, the pen operation panels 2008 and 2015 are arranged for the left side user and the upper side user. The page operation panel 2002 and the page navigation operation panel 2003 can also be arranged in the similar manner.

When the administrator completes the arrangement, the display apparatus 2 creates the operation button definition data based on the arrangement of the operation menu set by the administrator. According to the above, the operation menus are displayed at the next startup with the arrangement set by the administrator.

Major Effects

As described above, because a display apparatus 2 according to an embodiment of the present invention displays an operation menu having information related to data processing according to the display position, the data processing according to the operation position of the user operating the operation menu is available. In addition, the page navigation is displayed so that users can understand what contents are included in each page. Also, by selecting a page name displayed in the page navigation, the user can easily switch the page displayed on the display 220.

Embodiment 2

In the first embodiment, the display apparatus 2 is described as having a large touch panel, but the display apparatus is not limited to those having a touch panel. In an embodiment of the present invention, a projector-type display apparatus will be described.

<<Another Configuration Example 1 of Display Apparatus>>

Figure 46:
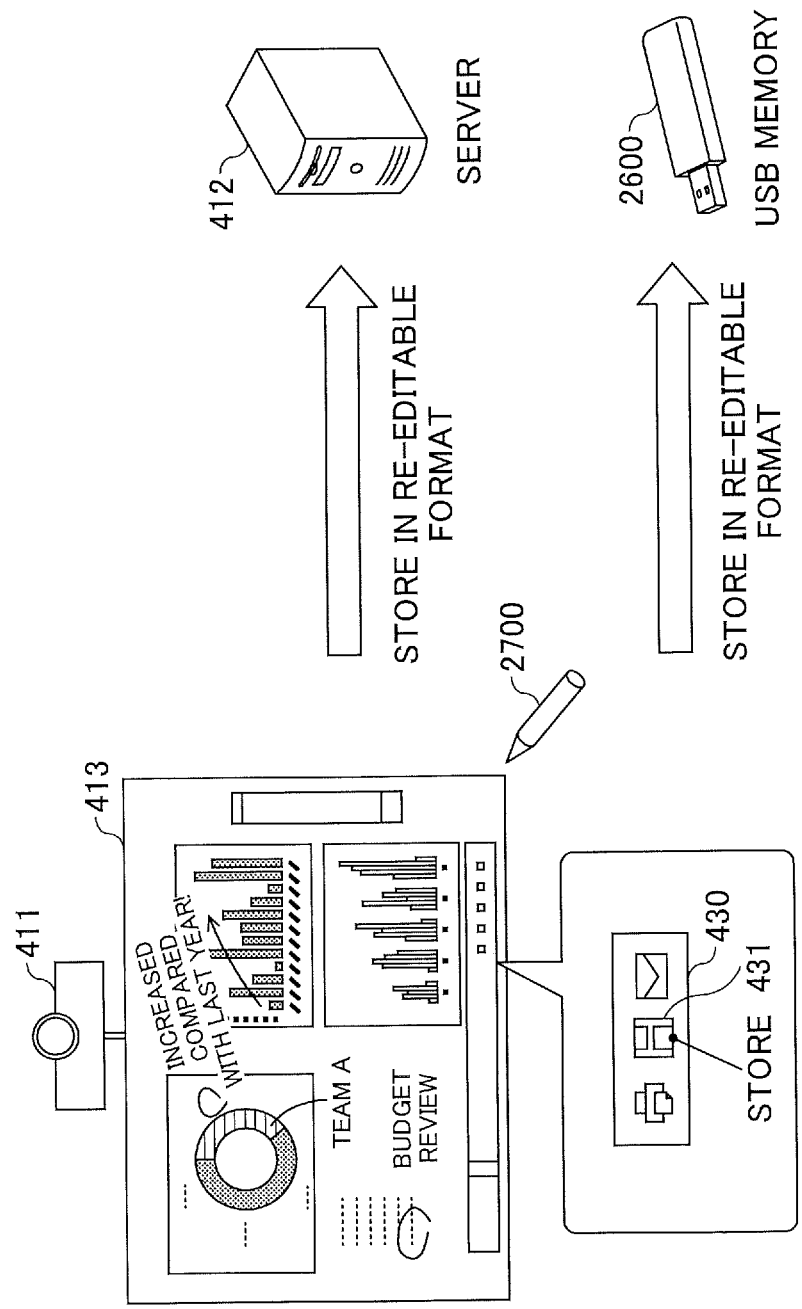
FIG. 46 is a drawing illustrating another configuration example of a display apparatus.

FIG. 46 is a drawing illustrating another configuration example of a display apparatus. In FIG. 46, a projector 411 is located above a typical white board 413. The projector 411 corresponds to a display apparatus. The typical white board 413 is not a flat panel display integrated with a touch panel, but rather a white board that a user writes directly with a marker. It should be noted that the white board may be a blackboard, and only a flat surface large enough to project images.

The projector 411 has an optical system with an ultra-short focal point so that images of less distortion can be projected from about 10 cm onto the white board 413. The images may be transmitted from a wirelessly or wiredly connected PC 400-1 or may be stored by the projector 411.

The user handwrites on a white board 413 using a dedicated electronic pen 2700. The electronic pen 2700 has a light emitting unit at a tip portion, for example, where the light emitting unit is turned on when the user presses against the white board 413 for handwriting. The light wavelength is near-infrared or infrared, so it is invisible to the user. The projector 411 includes a camera that captures the light emitting unit and analyzes the captured image to determine the direction of the electronic pen 2700. Further, the electronic pen 2700 emits a sound wave together with a light emission, and the projector 411 calculates a distance according to the time of arrival of the sound wave. Projector 411 can determine the position of the electronic pen 2700 from the direction and the distance. A stroke is drawn (projected) at the position of the electronic pen 2700.

Projector 411 projects menu 430, so when a user presses a button with the electronic pen 2700, the projector 411 identifies the pressed button from the position of the electronic pen 2700 and the ON signal of a switch. For example, when a save button 431 is pressed, the stroke handwritten by the user (a set of coordinates) is stored by the projector 411. The projector 411 stores handwritten information in a predetermined server 412 or a USB memory 2600 or the like. The handwritten information is stored for each page. The coordinates are saved instead of image data, allowing the user to perform re-editing. It should be noted that the menu 430 may not be displayed because operation commands can be invoked by handwriting in an embodiment of the present invention.

<<Another Configuration Example 2 of Display Apparatus>>

Figure 47:
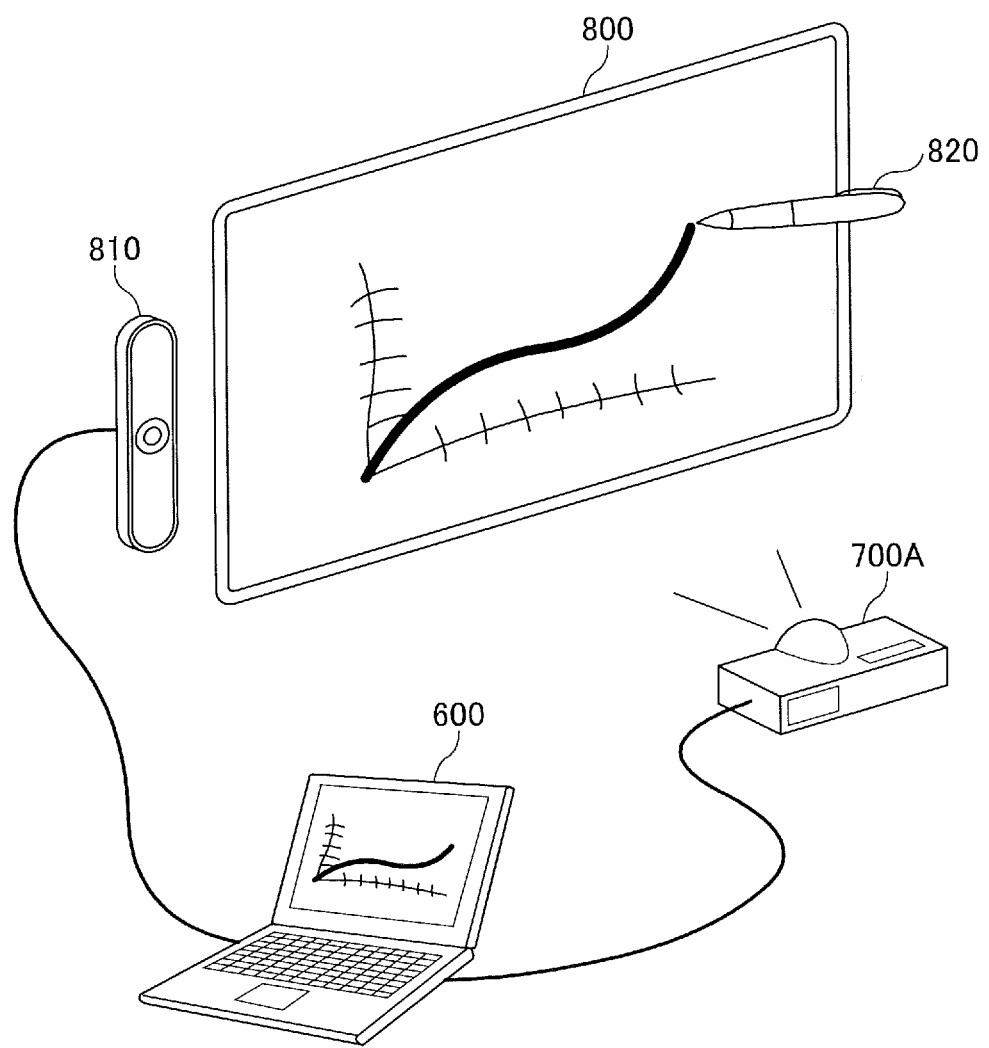
FIG. 47 is a drawing illustrating another configuration example of a display apparatus.

FIG. 47 is a drawing illustrating yet another configuration example of a display apparatus 2. In an example of FIG. 47, the display apparatus 2 includes a terminal apparatus 600, an image projection apparatus 700A, and a pen operation detection apparatus 810.

Terminal apparatus 600 is connected with wire to the image projection apparatus 700A and the pen operation detection apparatus 810. The image projection apparatus 700A causes the image data input by the terminal apparatus 600 to be projected onto a screen 800.

The pen operation detection apparatus p810 is in communication with an electronic pen 820 and detects operations of the electronic pen 820 in the vicinity of the screen 800. Specifically, the electronic pen 820 detects coordinate information indicating a point indicated by the electronic pen 820 on the screen 800, and transmits the detected coordinate information to the terminal apparatus 600.

The terminal apparatus 600 generates the image data of the stroke image input by the electronic pen 820 based on the coordinate information received from the pen operation detection apparatus 810 and causes the image projection apparatus 700A to draw the stroke image on the screen 800.

Further, the terminal apparatus 600 generates superimposed image data representing a superimposed image composed of a background image projected by the image projection apparatus 700A and the stroke image input by the electronic pen 820.

<<Another Configuration Example 3 of Display Apparatus>>

Figure 48:
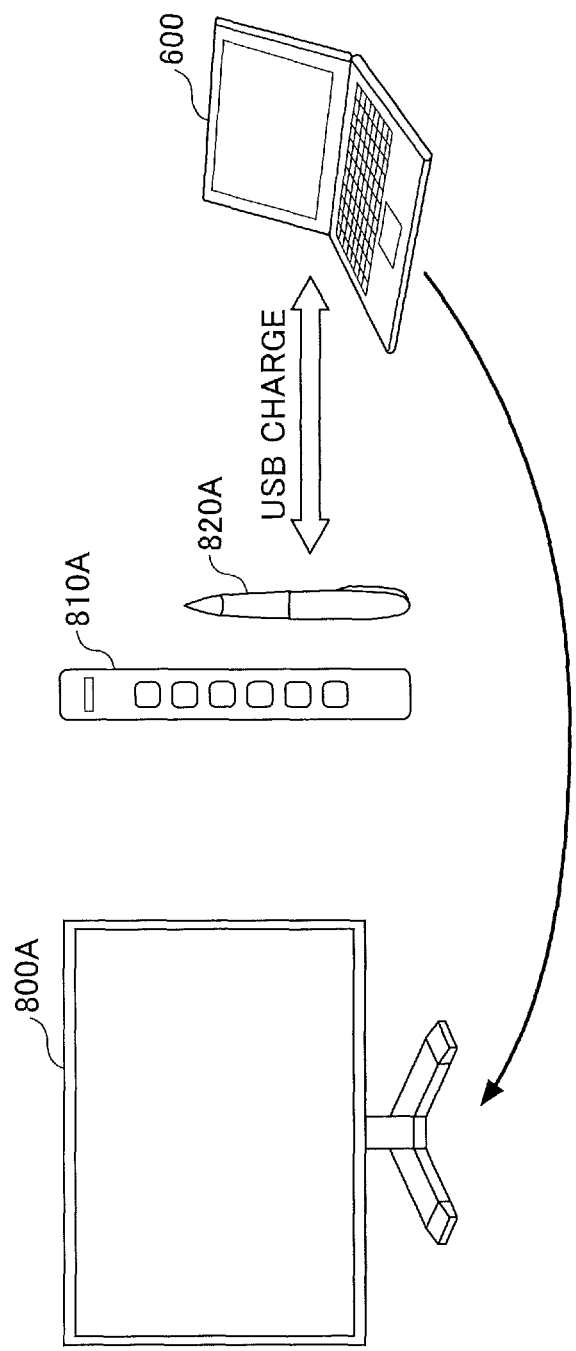
FIG. 48 is a drawing illustrating another configuration example of a display apparatus.

FIG. 48 is a drawing illustrating a configuration example of a display apparatus. In an example of FIG. 48, the display apparatus 2 includes a terminal apparatus 600, a display 800A, and a pen operation detection apparatus 810.

The pen operation detection apparatus 810 is disposed near the display 800A and detects coordinate information indicating a point indicated by the electronic pen 820A on the display 800A and transmits the coordinate information to the terminal apparatus 600. It should be noted that, in an example of FIG. 48, the electronic pen 820A may be charged by the terminal apparatus 600 via a USB connector.

The terminal apparatus 600 generates image data of a stroke image input by the electronic pen 820A based on the coordinate information received from the pen operation detection apparatus 810 and displays the image data on the display 800A.

<<Another Configuration Example 4 of Display Apparatus>>

Figure 49:
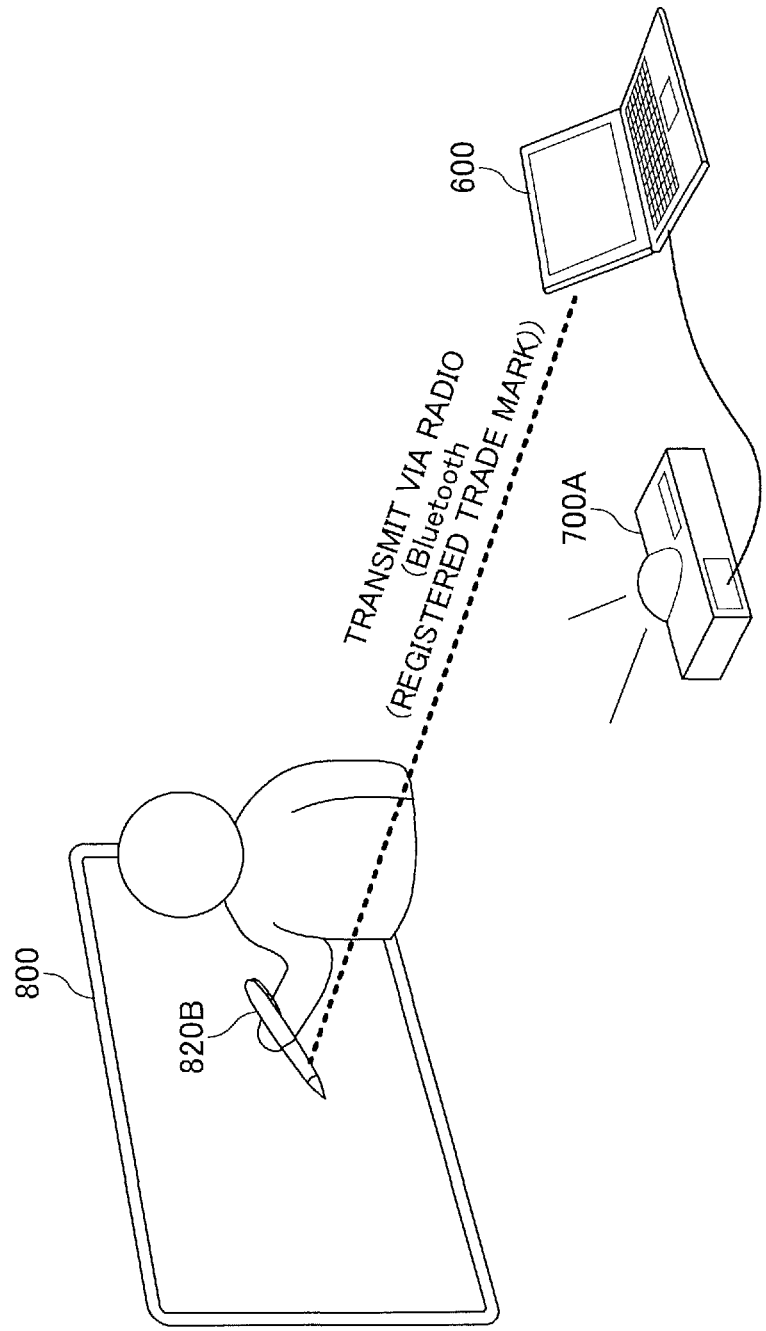
FIG. 49 is a drawing illustrating another configuration example of a display apparatus.

FIG. 49 is a drawing illustrating a configuration example of a display apparatus. In an example of FIG. 49, the display apparatus 2 includes a terminal apparatus 600 and an image projection apparatus 700A.

The terminal apparatus 600 performs wireless communication (such as Bluetooth) with the electronic pen 820B and receives coordinate information of a point indicated by the electronic pen 820B on the screen 800. Further, the terminal apparatus 600 generates image data of a stroke image input by the electronic pen 820B based on the received coordinate information and causes the image projection apparatus 700A to project the stroke image.

Further, the terminal apparatus 600 generates superimposed image data representing a superimposed image composed of a background image projected by the image projection apparatus 700A and the stroke image input by the electronic pen 820.

As described above, each of the above-described embodiments can be applied in various system configurations.

Other Application Examples

As described above, while preferred embodiments of the present invention have been described with reference to examples, various modifications and substitutions may be made thereto without departing from the spirit and scope of the invention.

For example, display methods of the embodiments are suitably applicable to an information processing apparatus having a touch panel. Apparatuses having the same function as the display apparatuses are also referred to as electronic blackboards, electronic whiteboards, electronic information boards, and interactive boards. The information processing apparatus having a touch panel mounted therein may be, for example, an output apparatus such as a PJ (Projector), a digital signage, an HUD (Head Up Display) apparatus, an industrial machine, an imaging apparatus, a sound collector, a medical apparatus, a network home appliance, a personal computer, a cellular phone, a smartphone, a tablet terminal, a game machine, a PDA (Personal Digital Assistant), a digital camera, a wearable PC, or a desktop PC.

Further, according to an embodiment of the present invention, a part of the processing performed by the display apparatus 2 may be performed by a server. For example, the display apparatus transmits stroke information to the server and acquires and displays information to be displayed with the operation guide 500.

Further, coordinates of the pen are detected by the display apparatus 2 by a method of detecting the coordinates of the pen tip by the touch panel in an embodiment of the present invention, but the coordinates of the pen tip may be detected by ultrasonic waves. Further, the pen emits ultrasonic waves together with the light emission, and the display apparatus 2 calculates the distance according to the time of arrival of the ultrasonic waves. The display apparatus 2 can determine the position of the pen according to the direction and the distance. The projector draws (projects) the pen's trajectory as a stroke.

Further, in an embodiment of the present invention, when there is a selected object, operation command candidates related to editing, modification, and "ページ名に設定" (set as a page name) are displayed, and when there is no selected object, operation command candidates related to input and output are displayed. However, the display apparatus 2 may simultaneously display the operation command candidates related to editing, modification, and "ページ名に設定" (set as a page name), and the operation command candidates related to input and output.

Further, the display apparatus 2 may not have the user's handwritten signature data. It may be retained by an information processing apparatus on the cloud or within the company.

Further, a configuration example such as FIGS. 6A and 6B is divided according to a main function in order to facilitate understanding of processing by the display apparatus 2. The present invention is not limited by the dividing way of the processing units or the names of the processing units. The processing of the display apparatus 2 can be divided into more processing units depending on the processing contents. Further, one processing unit may be further divided to include more processes.

Further, the functions of the embodiments described above may also be implemented by one or more processing circuits. Here, it is assumed that "processing circuitry" includes processors programmed to perform each function by software, such as processors implemented in electronic circuits, devices designed to perform each function as described above, such as ASICs (Application Specific Integrated Circuit), DSPs (digital signal processors), FPGAs (field programmable gate arrays), and conventional circuit modules.

Further, in an embodiment of the present invention, a threshold value may be indicated as an example as a comparison target. However, a threshold value is not limited to the indicated threshold value. Accordingly, in an embodiment of the present invention, with respect to all threshold values, "less than a threshold value" and "equal to or less than a threshold value" have an equivalent meaning, and "greater than a threshold value" and "equal to or greater than a threshold value" have an equivalent meaning. For example, in a case where a threshold value is 11, "less than the threshold value" has a meaning equivalent to "equal to or less than a threshold value" in a case where the threshold value is 10. In addition, in a case where a threshold value is 10, "greater than the threshold value" has a meaning equivalent to "equal to or greater than a threshold" in a case where the threshold value is 11.

Numerous additional modifications and variations are possible in light of the above teachings. It is therefore to be understood that, within the scope of the appended claims, the disclosure of this patent specification may be practiced otherwise than as specifically described herein. As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor. A processing circuit also includes devices such as an application specific integrated circuit (ASIC) and conventional circuit components arranged to perform the recited functions. The processing circuitry is implemented as at least a portion of a microprocessor. The processing circuitry may be implemented using one or more circuits, one or more microprocessors, microcontrollers, application specific integrated circuits, dedicated hardware, digital signal processors, microcomputers, central processing units, field programmable gate arrays, programmable logic devices, state machines, super computers, or any combination thereof. Also, the processing circuitry may include one or more software modules executable within one or more processing circuits. The processing circuitry may further include memory configured to store instructions and/or code that causes the processing circuitry to execute functions. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

The present application is based on and claims the benefit of priority of Japanese Priority Application No. 2019-209914 filed on Nov. 20, 2019, and Japanese Priority Application No. 2020-192210 filed on Nov. 19, 2020, the entire contents of which are hereby incorporated by reference.

What is claimed is:

1. A display apparatus for displaying an operation menu associated with a data processing performed on handwritten data,
   wherein the operation menu includes information related to the data processing, the information being a rotational angle determined based on a straight line that is input by a user,
   wherein the straight line input inside an operation guide is used to determine the rotational angle, and the straight line input outside the operation guide is recognized as the handwritten data and is not used to determine the rotational angle, selections being displayed for the user in response to the user inputting the handwritten data in the operation guide, and
   wherein the display apparatus comprises a display configured to rotate the operation menu by using the rotational angle to display the rotated operation menu.

2. The display apparatus according to claim 1, wherein a plurality of same operation menus are displayed, and the same operation menus include information related to the data processing corresponding to display positions of the operation menus.

3. The display apparatus according to claim 1, wherein the display apparatus
   receives, from a pen used for entering the handwritten data, identification information of the pen,
   in a case where the operation menu is pressed, stores the identification information of the pen and the information related to the data processing, the identification of the pen and the information related to the data processing being associated with each other, and
   displays the handwritten data handwritten by the pen by processing the handwritten data using the information related to the data processing associated with the identification information of the pen.

4. The display apparatus according to claim 3, wherein the information related to the data processing is a rotational angle for rotating the handwritten data, and
   the display apparatus displays a character string obtained by recognizing the handwritten data, by rotating the character string using the rotational angle.

5. The display apparatus according to claim 1, wherein the operation menu is arranged along an edge of the display apparatus, and
   the display apparatus further comprising:
   a pen holder arranged along the edge of the display apparatus from which a pen is taken out, or a pen holder in which a pen is stored in parallel with the edge.

6. The display apparatus according to claim 1, wherein the display apparatus displays, when one or more files are acquired, file names of the files and a page name of each page included in the files.

7. The display apparatus according to claim 6, wherein the display apparatus displays, when a selection of a page name is received, the selected page by using information in which the page name is recorded for each page of the file.

8. The display apparatus according to claim 6, wherein the display apparatus displays a character string obtained by recognizing the handwritten data, as a page name of a page on which the character string is displayed.

9. The display apparatus according to claim 6, wherein the display apparatus displays, in a case where a selection of the character string obtained by recognizing the handwritten data is received, the character string as a page name of a page on which the character string is displayed.

10. The display apparatus according to claim 6, wherein the file name and the page name are displayed as many instances as a same number as the operation menus.

11. The display apparatus according to claim 6, wherein the information related to the data processing is a rotational angle for rotating the handwritten data, the display apparatus displays the file name and the page name by rotating the file name and the page name using the rotational angle.

12. The display apparatus according to claim 11, wherein the display apparatus
receives, from a pen used for entering the handwritten data, identification information of the pen,
in a case where the file name or the page name is pressed, stores the identification information of the pen and the information related to the data processing, the identification information of the pen and the information related to the data processing being associated with each other, and
displays a character string obtained by recognizing the handwritten data by rotating the character string with the rotational angle.

13. The display apparatus according to claim 1, wherein the display apparatus displays a button used for receiving a setting whether a character string candidate obtained by recognizing the handwritten data is to be displayed.

14. The display apparatus according to claim 13, wherein in a case where a press of the button is received, even if the handwritten data is entered, the display apparatus does not display the character string candidate obtained by recognizing the handwritten data and displays an operation command candidate to be executed by the display apparatus.

15. The display apparatus according to claim 1, wherein the display apparatus displays an arrangement determination screen used for receiving an arrangement of the operation menu.

16. The display apparatus according to claim 1, wherein the rotational angle is determined as an angle formed between a 6 o'clock direction of the operation guide and the angle information straight line, the 6 o'clock direction being a vertical direction of the display apparatus.

17. The display apparatus according to claim 1, wherein the display apparatus perfoinis handwritten recognition on the handwritten data by rotating the handwritten data at the rotational angle.

18. A display method executed by a display apparatus displaying an operation menu associated with data processing performed for handwritten data, the display method comprising
displaying the operation menu including information related to the data processing, the information being a rotational angle determined based on a straight line that is input by a user,
wherein the straight line input inside an operation guide is used to determine the rotational angle, and the straight line input outside the operation guide is recognized as the handwritten data and is not used to determine the rotational angle, selections being displayed for the user in response to the user inputting the handwritten data in the operation guide, and
wherein the displaying includes rotating the operation menu by using the rotational angle to display the rotated operation menu.

19. The display method according to claim 18, wherein handwritten recognition is performed on the handwritten data by rotating the handwritten data at the rotational angle.

20. A non-transitory computer readable recording medium including a program that causes a display apparatus displaying an operation menu associated with data processing performed for handwritten data to perform:
displaying the operation menu including information related to the data processing, the information being a rotational angle determined based on a straight line that is input by a user,
wherein the straight line input inside an operation guide is used to determine the rotational angle, and the straight line input outside the operation guide is recognized as the handwritten data and is not used to determine the rotational angle, selections being displayed for the user in response to the user inputting the handwritten data in the operation guide, and
wherein the displaying includes rotating the operation menu by using the rotational angle to display the rotated operation menu.

21. The non-transitory computer readable recording medium according to claim 20, wherein handwritten recognition is performed on the handwritten data by rotating the handwritten data at the rotational angle.

* * * * *